(12) United States Patent
Jones et al.

(10) Patent No.: US 7,460,991 B2
(45) Date of Patent: Dec. 2, 2008

(54) SYSTEM AND METHOD FOR SHAPING A DATA SIGNAL FOR EMBEDDING WITHIN AN AUDIO SIGNAL

(75) Inventors: Aled Wynne Jones, Harston (GB); Michael Raymond Reynolds, Harston (GB); David Bartlett, Harston (GB); Ian Michael Hosking, Harston (GB); Donald Glenn Guy, Harston (GB); Peter John Kelly, Harston (GB); Daniel Reginald Ewart Timson, Harston (GB); Nicolas Vasilopolous, Harston (GB); Alan Michael Hart, Harston (GB); Robert John Morland, Harston (GB)

(73) Assignee: Intrasonics Limited, Harston, Cambridge (GB)

( * ) Notice: Subject to any disclaimer, the term of this patent is extended or adjusted under 35 U.S.C. 154(b) by 380 days.

(21) Appl. No.: 10/432,889
(22) PCT Filed: Nov. 30, 2001
(86) PCT No.: PCT/GB01/05300
§ 371 (c)(1), (2), (4) Date: Apr. 22, 2005
(87) PCT Pub. No.: WO02/45286
PCT Pub. Date: Jun. 6, 2002

(65) Prior Publication Data
US 2005/0219068 A1 Oct. 6, 2005

(30) Foreign Application Priority Data

| Nov. 30, 2000 | (GB) | 0029273.0 |
|---|---|---|
| Jan. 25, 2001 | (GB) | 0101947.0 |
| Jan. 25, 2001 | (GB) | 0101950.4 |
| Jan. 25, 2001 | (GB) | 0101952.0 |
| Jan. 25, 2001 | (GB) | 0101953.8 |
| Feb. 13, 2001 | (GB) | 0103623.5 |
| Mar. 16, 2001 | (GB) | 0106587.9 |
| Mar. 19, 2001 | (GB) | 0106778.4 |
| Mar. 21, 2001 | (GB) | 0107124.0 |
| Apr. 2, 2001 | (GB) | 0108205.6 |
| Jun. 15, 2001 | (GB) | 0114715.6 |
| Nov. 9, 2001 | (GB) | 0127013.1 |

(51) Int. Cl.
*G10L 19/14* (2006.01)
*G10L 21/00* (2006.01)
(52) U.S. Cl. .................. 704/211; 704/219
(58) Field of Classification Search ............... None
See application file for complete search history.

(56) References Cited

U.S. PATENT DOCUMENTS 2,660,662 A 11/1953 Scherbatskoy (Continued)

FOREIGN PATENT DOCUMENTS

CA 2129925 2/1996

(Continued)

OTHER PUBLICATIONS

Swanson et al., "Robust Audio Watermarking Using Perceptual Masking", Elsevier Signal Processing, vol. 66, No. 3, May 1998, pp. 337-355.

(Continued)

*Primary Examiner*—David R. Hudspeth
*Assistant Examiner*—Matthew J. Sked
(74) *Attorney, Agent, or Firm*—Alston & Bird LLP

(57) ABSTRACT

There is described a number of encoders for encoding a data signal within an audio signal. In some of the encoders, the audio signal is separated into a tonal part and a residual part, and the data signal is shaped based on the residual part. In other encoders, the data signal is separated into a tonal part and a residual part, and the data signal is combined with the audio signal independence upon the residual part. In other encoders, the rate at which the data is encoded within the audio signal is varied in dependence upon the audio signal. There are also described various decoders associated with the described encoders.

49 Claims, 36 Drawing Sheets

U.S. PATENT DOCUMENTS

| | | |
|---|---|---|
| 3,651,471 A | 3/1972 | Haselwood et al. |
| 3,732,536 A | 5/1973 | Larka et al. |
| 3,742,463 A | 6/1973 | Haselwood et al. |
| 3,845,391 A | 10/1974 | Crosby |
| 4,025,851 A | 5/1977 | Haselwood et al. |
| 4,237,449 A | 12/1980 | Zibell |
| 4,425,642 A | 1/1984 | Moses et al. |
| 4,514,725 A | 4/1985 | Bristley |
| 4,642,685 A | 2/1987 | Roberts et al. |
| 4,718,106 A | 1/1988 | Weinblatt |
| 4,750,034 A | 6/1988 | Lem |
| 4,807,031 A | 2/1989 | Broughton et al. |
| 4,840,602 A | 6/1989 | Rose |
| 4,846,693 A | 7/1989 | Baer |
| 4,923,428 A | 5/1990 | Curran |
| 4,945,412 A | 7/1990 | Kramer |
| 5,085,610 A | 2/1992 | Engel et al. |
| 5,090,936 A | 2/1992 | Satoh et al. |
| 5,108,341 A | 4/1992 | DeSmet |
| 5,113,437 A | 5/1992 | Best et al. |
| 5,136,613 A | 8/1992 | Dumestre, III |
| 5,191,615 A | 3/1993 | Aldava et al. |
| 5,301,167 A | 4/1994 | Proakis et al. |
| 5,305,348 A | 4/1994 | Izumi |
| 5,314,336 A | 5/1994 | Diamond et al. |
| 5,319,735 A | 6/1994 | Preuss et al. |
| 5,353,352 A | 10/1994 | Dent et al. |
| 5,412,620 A | 5/1995 | Cafarella et al. |
| 5,436,941 A | 7/1995 | Dixon et al. |
| 5,442,343 A | 8/1995 | Cato et al. |
| 5,446,756 A | 8/1995 | Mallinckrodt |
| 5,450,490 A | 9/1995 | Jensen et al. |
| 5,479,442 A | 12/1995 | Yamamoto |
| 5,499,265 A | 3/1996 | Dixon et al. |
| 5,519,779 A | 5/1996 | Proctor et al. |
| 5,539,705 A | 7/1996 | Akerman et al. |
| 5,555,258 A | 9/1996 | Snelling et al. |
| 5,574,773 A | 11/1996 | Grob et al. |
| 5,579,124 A | 11/1996 | Aijala et al. |
| 5,604,767 A | 2/1997 | Dixon et al. |
| 5,657,379 A | 8/1997 | Honda et al. |
| 5,663,766 A | 9/1997 | Sizer, II |
| 5,687,191 A | 11/1997 | Lee et al. |
| 5,719,937 A | 2/1998 | Warren et al. |
| 5,734,639 A * | 3/1998 | Bustamante et al. ......... 370/208 |
| 5,752,880 A | 5/1998 | Gabai et al. |
| 5,774,452 A | 6/1998 | Wolosewicz |
| 5,822,360 A * | 10/1998 | Lee et al. .................... 375/140 |
| 5,828,325 A | 10/1998 | Wolosewicz et al. |
| 5,848,155 A | 12/1998 | Cox |
| 5,918,223 A | 6/1999 | Blum et al. |
| 5,930,369 A | 7/1999 | Cox et al. |
| 5,937,000 A | 8/1999 | Lee et al. |
| 5,945,932 A * | 8/1999 | Smith et al. .................... 341/51 |
| 5,960,398 A | 9/1999 | Fuchigami et al. |
| 5,963,909 A | 10/1999 | Warren et al. |
| 5,978,413 A | 11/1999 | Bender |
| 5,999,899 A * | 12/1999 | Robinson .................... 704/222 |
| 6,021,432 A | 2/2000 | Sizer, II et al. |
| 6,022,273 A | 2/2000 | Gabai et al. |
| 6,035,177 A | 3/2000 | Moses et al. |
| 6,061,793 A * | 5/2000 | Tewfik et al. ............... 713/176 |
| 6,125,172 A | 9/2000 | August et al. |
| 6,290,566 B1 | 9/2001 | Gabai et al. |
| 6,298,322 B1 * | 10/2001 | Lindemann .................... 704/222 |
| 6,309,275 B1 | 10/2001 | Fong et al. |
| 6,370,666 B1 | 4/2002 | Lou et al. |
| 6,389,055 B1 | 5/2002 | August et al. |
| 6,434,253 B1 * | 8/2002 | Hayashi et al. ............. 382/100 |
| 6,438,117 B1 | 8/2002 | Grilli et al. |
| 6,442,283 B1 * | 8/2002 | Tewfik et al. ............... 382/100 |
| 6,584,138 B1 * | 6/2003 | Neubauer et al. ........... 375/130 |
| 6,636,551 B1 | 10/2003 | Ikeda et al. |
| 6,650,877 B1 | 11/2003 | Tarbouriech et al. |
| 6,708,214 B1 | 3/2004 | La Fleur |
| 6,737,957 B1 | 5/2004 | Petrovic et al. |
| 6,765,950 B1 | 7/2004 | Nuytkens et al. |
| 6,773,344 B1 | 8/2004 | Gabai et al. |
| 6,782,253 B1 | 8/2004 | Shteyn et al. |
| 6,832,093 B1 | 12/2004 | Ranta |
| 6,850,555 B1 | 2/2005 | Barclay |
| 6,876,623 B1 | 4/2005 | Lou et al. |
| 6,892,175 B1 * | 5/2005 | Cheng et al. ................. 704/205 |
| 7,031,271 B1 | 4/2006 | LaRosa et al. |
| 7,158,676 B1 * | 1/2007 | Rainsford .................... 382/190 |
| 2001/0030710 A1 | 10/2001 | Werner |
| 2002/0069263 A1 | 6/2002 | Sears et al. |
| 2004/0169581 A1 | 9/2004 | Petrovic et al. |

FOREIGN PATENT DOCUMENTS

| | | |
|---|---|---|
| DE | 32 29 405 A1 | 2/1984 |
| EP | 0 135 192 | 3/1985 |
| EP | 0 172 095 | 2/1988 |
| EP | 0 347 401 A3 | 12/1989 |
| EP | 0 631 226 A1 | 12/1994 |
| EP | 0 766 468 A2 | 4/1997 |
| EP | 0 822 550 A1 | 2/1998 |
| EP | 0 828 372 A2 | 3/1998 |
| EP | 0 863 631 A2 | 9/1998 |
| EP | 0 674 405 B1 | 10/1998 |
| EP | 0 872 995 A2 | 10/1998 |
| EP | 0 606 703 B1 | 12/1998 |
| EP | 1 158 800 A1 | 11/2001 |
| FR | 2 626 731 | 4/1989 |
| GB | 2 135 536 A | 8/1984 |
| GB | 2 192 743 A | 1/1988 |
| GB | 2 196 167 A | 4/1988 |
| GB | 2 256 113 A | 11/1992 |
| GB | 2 294 619 A | 5/1996 |
| GB | 2 334 133 A | 8/1999 |
| GB | 2 343 774 A | 5/2000 |
| GB | 2 345 779 A | 7/2000 |
| JP | 58-69536 A | 4/1958 |
| JP | 63-147738 U | 9/1963 |
| JP | 59-166545 U | 11/1984 |
| JP | 63-272134 A | 11/1988 |
| JP | 04-092518 | 3/1992 |
| JP | 5252578 A | 9/1993 |
| JP | 05-316598 | 11/1993 |
| JP | 10-021259 | 1/1998 |
| JP | 2000 152217 | 5/2000 |
| JP | 2000-207170 | 7/2000 |
| JP | 2000-236576 | 8/2000 |
| JP | 2000-267952 | 9/2000 |
| JP | 2000-308130 | 11/2000 |
| WO | WO 91/10490 | 7/1991 |
| WO | WO 91/10491 | 7/1991 |
| WO | WO 93/07689 | 4/1993 |
| WO | WO 94/08677 | 4/1994 |
| WO | WO 96/19274 | 7/1996 |
| WO | WO 97/21279 | 6/1997 |
| WO | WO 97/31440 | 8/1997 |
| WO | WO 97/33391 | 9/1997 |
| WO | WO 97/41936 | 11/1997 |
| WO | WO 98/20411 | 5/1998 |
| WO | WO 98/32248 | 7/1998 |
| WO | WO 98/51077 | 11/1998 |
| WO | WO 99/00979 | 1/1999 |
| WO | WO 99/46720 | 9/1999 |
| WO | WO 00/15316 | 3/2000 |
| WO | WO 00/44168 A1 | 7/2000 |
| WO | WO 00/57586 | 9/2000 |

| | | |
|---|---|---|
| WO | WO 00/60484 | 10/2000 |
| WO | WO 01/10065 A1 | 2/2001 |
| WO | WO 01/57619 | 8/2001 |
| WO | WO 01/75629 | 10/2001 |

OTHER PUBLICATIONS

Seok et al., "Prediction-Based Audio Watermark Detection Algorithm," 109th AES Convention, Sep. 22-25, 2000, pp. 1-11.

*Simultaneous Subliminal Signalling in Conventional Sound Circuits: A Feasibility Study*, BBC and the ITA, Research Department Report No. 1971/1, Jan. 1971, pp. 1-12.

Bender, W. et al., Techniques for Data Hiding, SPIE vol. 2420, pp. 164-173, 1995.

Neubauer et al., *Continuous Steganographic Data Transmission Using Uncompressed Audio*, David Aucsmith (Ed.): Information Hiding (1998), LNCS 1525, pp. 208-217.

Iwakiri et al., *Digital Watermark Scheme for High Quality Audio Data for Spectrum Spreading and Modified Discrete Cosine Transform*, Information processing Society of Japan, vol. 39, No. 9, pp. 2631-2637 (1998).

Chung et al., *Digital Watermarking for Copyright Protection of MPEG2 Compressed Video, IEEE Transactions on Consumer Electronics*, vol. 44, No. 3, pp. 895-901 (1998).

Cox et al., *A Secure, Robust Watermark for Multimedia*, Ross Anderson (Ed.) Information Hiding (1996), LNCS 1174 pp. 185-206.

Cox et al., *Secure Spread Spectrum Watermarking for Multimedia*, IEEE Transactions on Image Processing, vol. 6, No. 12, pp. 1673-1687 (1997).

Sundaram et al., *An Embedded Cryptosystem for Digital Broadcasting*, IEEE Conference on Universal Personal Communications Record, vol. 2, pp. 401-405 (1997).

Cox et al., *Secure Spread Spectrum Watermarking for Images, Audio and Video*, IEEE Conference on Image Processing, vol. 3, pp. 243-246 (1996).

Bender et al., *Techniques for Data Hiding*, IBM Systems Journal, vol. 35, No. 3 & 4 (1996).

Cox et al., *A Secure, Imperceptable Yet Perceptually Salient, Spread Spectrum Watermark for Multimedia*, Southcon/96 Orange County Convention Center (1996).

Pohlmann, *Fundamentals of Digital Audio, Principles of Digital Audio*, pp. 47-48, 255-256, and 323 (1989).

Iwakiri et al., "Digital Watermark Scheme for High Quality Audio Data by Spectrum Spreading and Modified Discrete Cosine Transform," Information Processing Society of Japan, vol. 39, No. 9, pp. 2631-2637, Sept. 1998.*

Chung et al., "Digital Watermarking for Copyright Protection of MPEG2 Cojpressed Video," IEEE Transactions on Consumer Electronics, vol. 44, No. 3, pp. 895-901, Aug. 1998.*

Neubauer et al., "Continuous Steganorgraphic Data Transmission Using Uncompressed Audio," Lecture Notes in Computer Science 1525, Information Hiding, 2nd International Workshop, IH '98, Portland, Oregon USA, Apr. 1998 Proceedings, pp. 208-217.*

Cox et al., "Secure Spread Spectrum Watermarking for Multimedia," IEEE Transactions Image Processing, vol. 6, No. 12, pp. 1673-1687, Dec. 1997.*

Sundaram et al., "An Embedded Cryptosystem for Digital Braodcasting," 1997 IEEE th International Conference on Universal Personal Communications Record, vol. 2 of 2, Oct. 12-16, 1997, San Diego, CA, pp. 401-405.*

Cox et al., "Secure Spread Spectrum Watermarking for Images, Audio and Video," International Conference on Image Processing, vol. III of III, Sep. 16-19, 1996, Lausanne, Switzerland, pp. 243-246.*

Bender et al., "Techniques for Data Hiding," IBM Systems Journal, MIT Media Lab, vol. 35, Nos. 3 and 4, 1995, pp. 313 and 323-336.*

Cox et al., "A Secure, Robust Watermark for Multimedia," 1st International Workshop Cambridge, UK, May/Jun. 1996 Proceedings, pp. 185-206.*

Cox et al., "A Secure, Imperceptible Yet Perceptually Salient, Spread Spectrum Watermark for Multimedia," SouthCon 96, Conference Record, Orlando, Florida, pp. 192-197, Jun. 25-27, 1996.*

Pohlmann, "Fundamentals of Digital Audio", pp. 47-48 and "Digital Audio Tape (DAT)," pp. 255-256 and "The Compact Disc," p. 323, Principles of Digital Audio, Second Edition.*

* cited by examiner

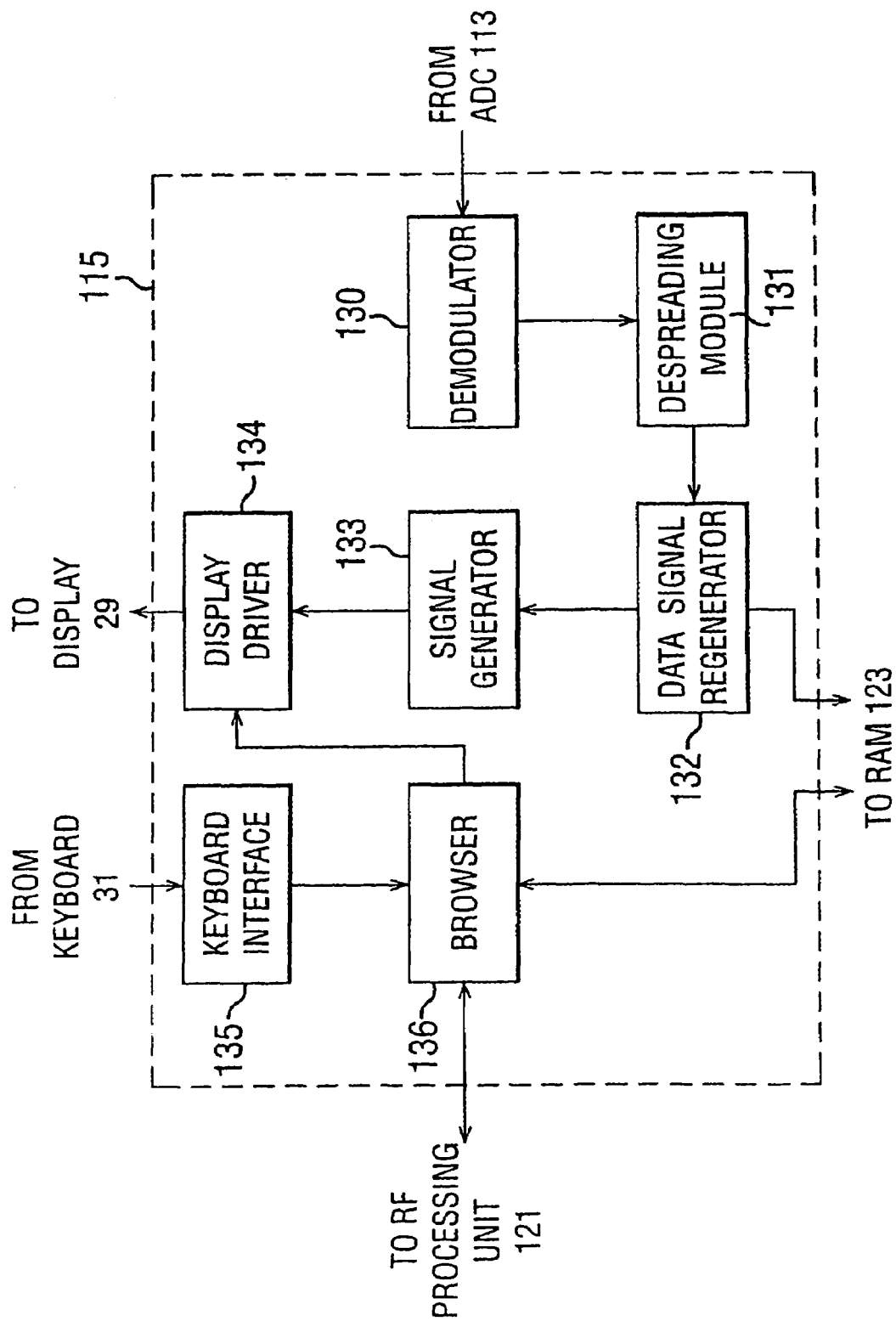

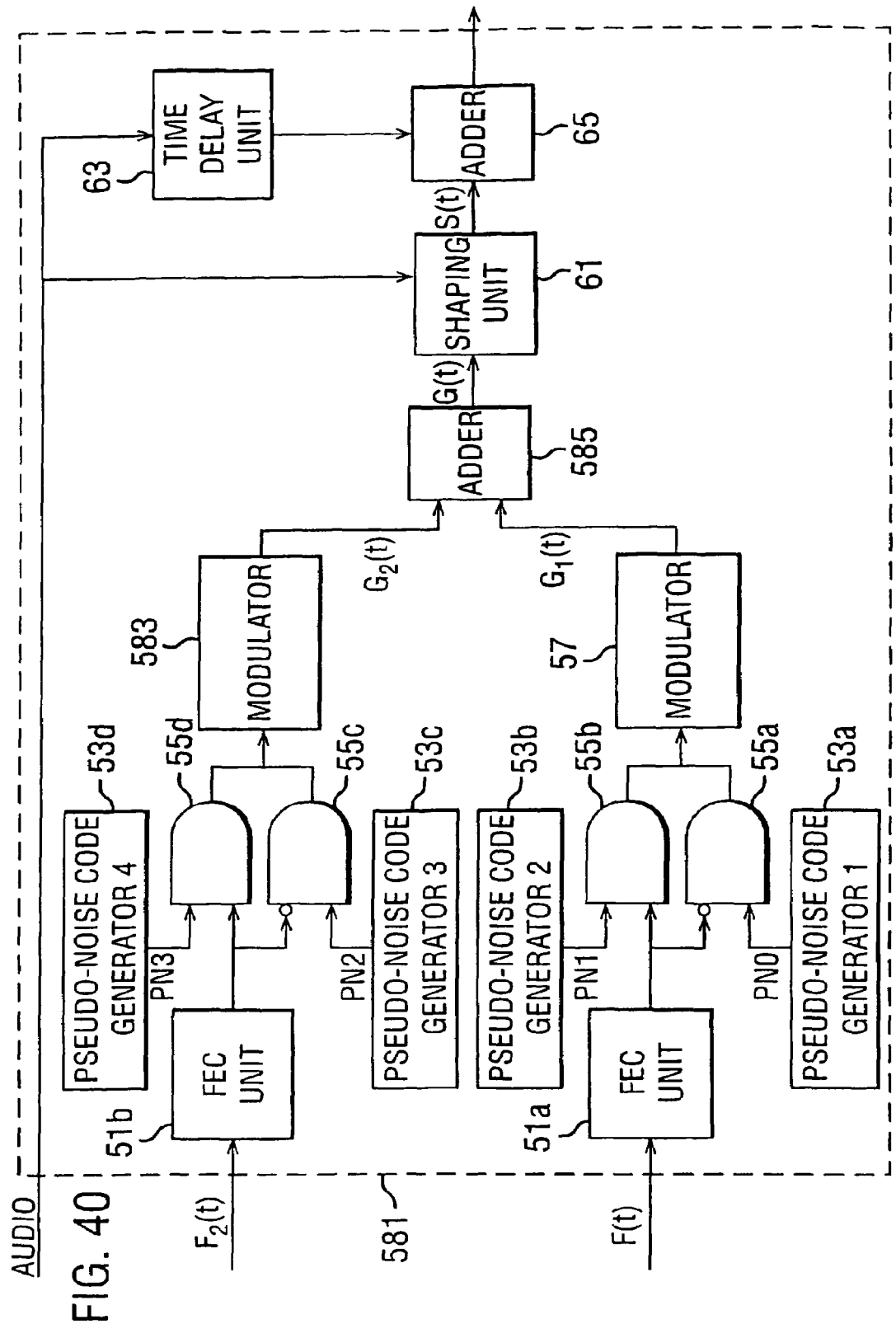

SYSTEM AND METHOD FOR SHAPING A DATA SIGNAL FOR EMBEDDING WITHIN AN AUDIO SIGNAL

This invention relates to an acoustic communication system in which a data signal is conveyed by acoustic waves.

International patent publication WO 98/32248 describes an acoustic communication system for updating price data displayed on supermarket shelves. In this communication system, acoustic signals are transmitted within the audible frequency range at a power level at which the acoustic signals are virtually inaudible to people within the supermarket.

An embodiment of the present invention provides a novel encoding technique for encoding a data signal within an electrical signal which is subsequently converted into a corresponding acoustic signal.

Another embodiment of the present invention provides an alternative application for an acoustic communication system in which data is transmitted using acoustic waves and components for the application.

Exemplary embodiments of the invention will now be described with reference to the accompanying drawings, in which:

FIG. 1 schematically shows a signalling system for communicating a data signal to a cellular phone via the audio track of a television signal and for downloading information from the internet to the cellular phone in accordance with the data signal;

FIG. 2 schematically shows an encoder which forms part of the signalling system illustrated in FIG. 1;

FIG. 3 is a plot comparing the power spectrum of a typical audio track of a television signal with that of a modulated data signal with and without spread spectrum encoding;

FIG. 4 schematically shows a shaping unit which forms part of the encoder illustrated in FIG. 2;

FIG. 5 is a plot of a power spectrum corresponding to the sensitivity of a human ear with and without the presence of a narrowband tone;

FIG. 6 schematically shows a cellular phone which forms part of the signalling system illustrated in FIG. 1;

FIG. 7A is a schematic block diagram showing the functional configuration of a processor which forms part of the cellular phone illustrated in FIG. 6 when receiving and processing a data signal;

Figure 1:
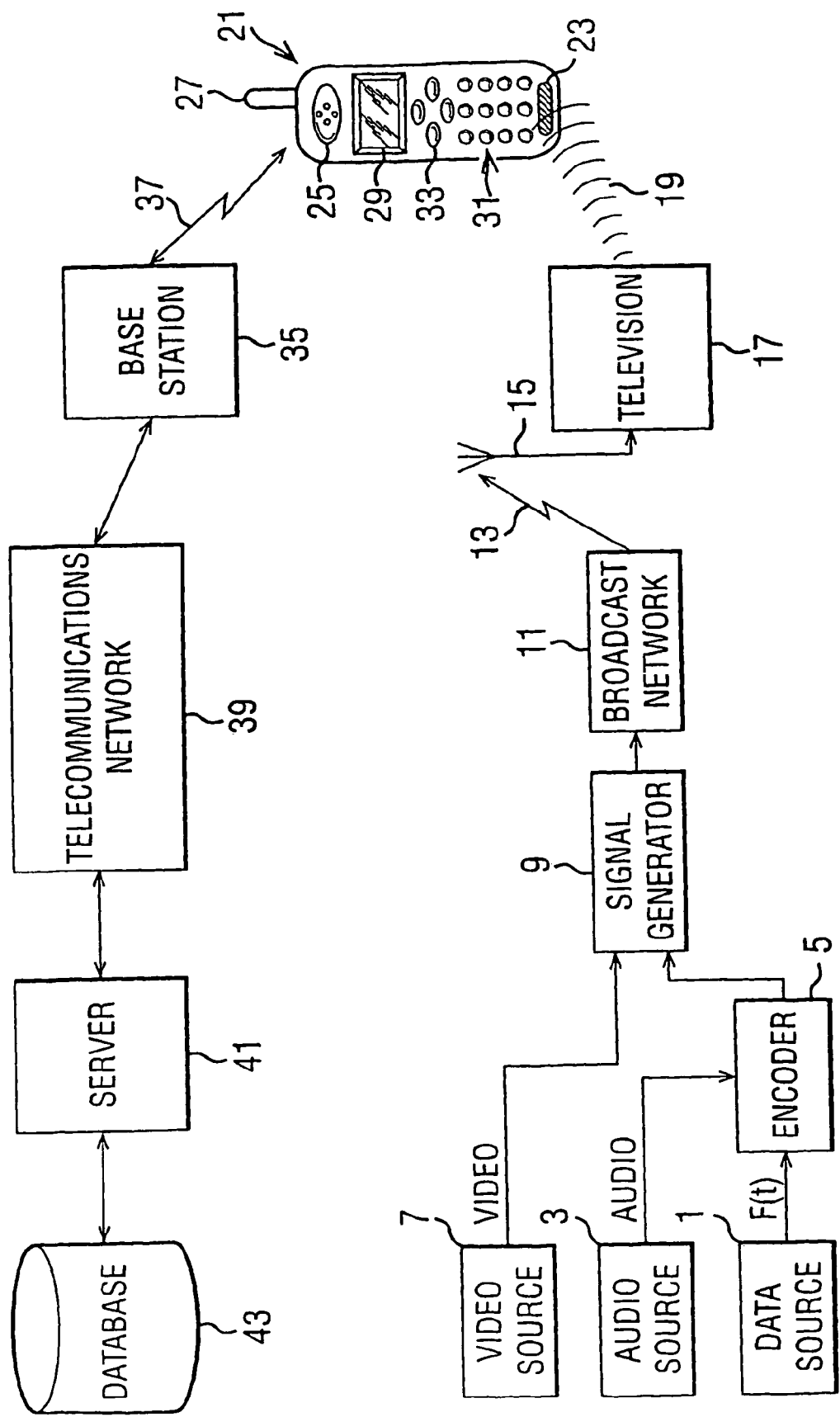
Figure 2:
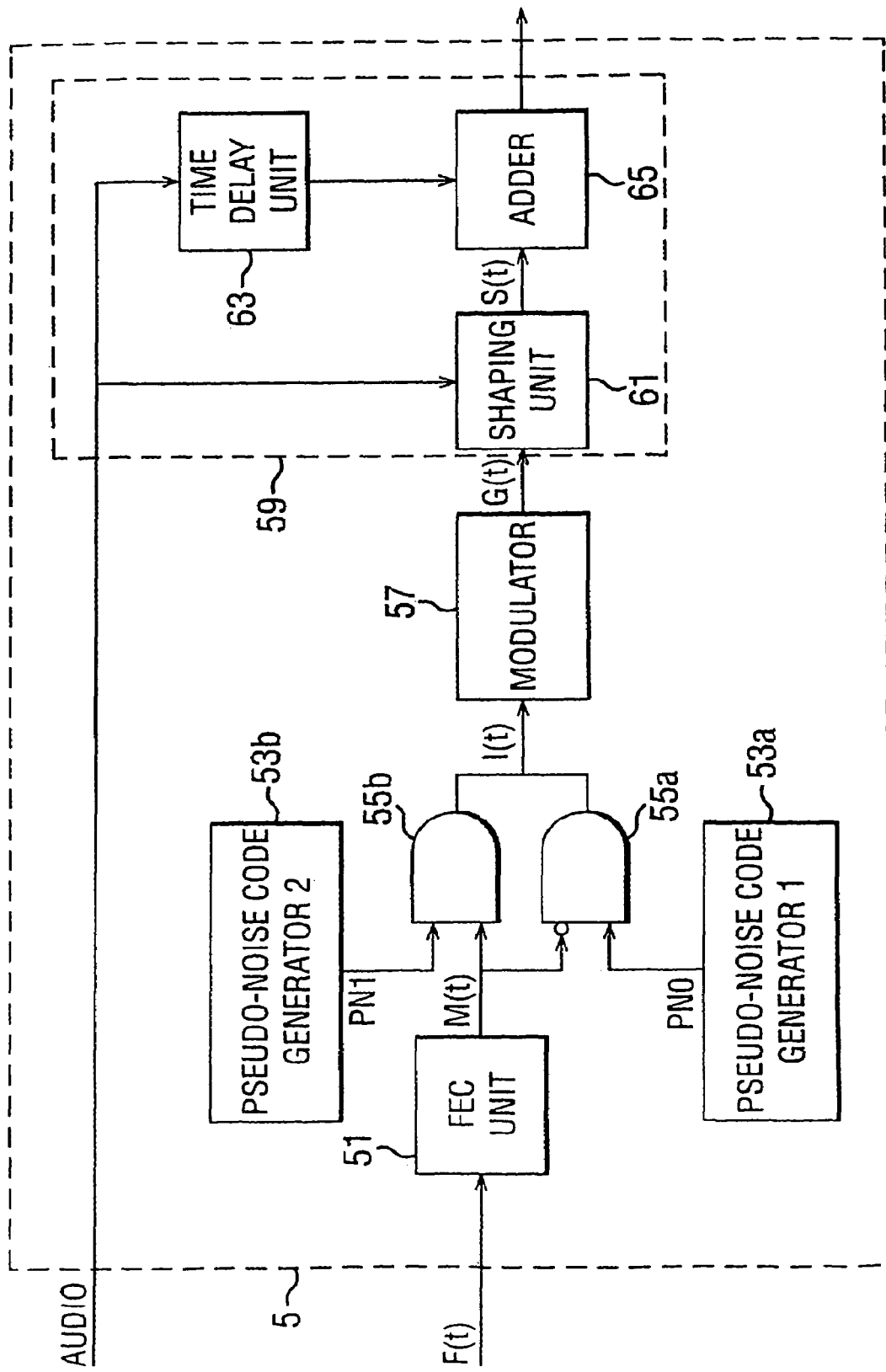
Figure 4:
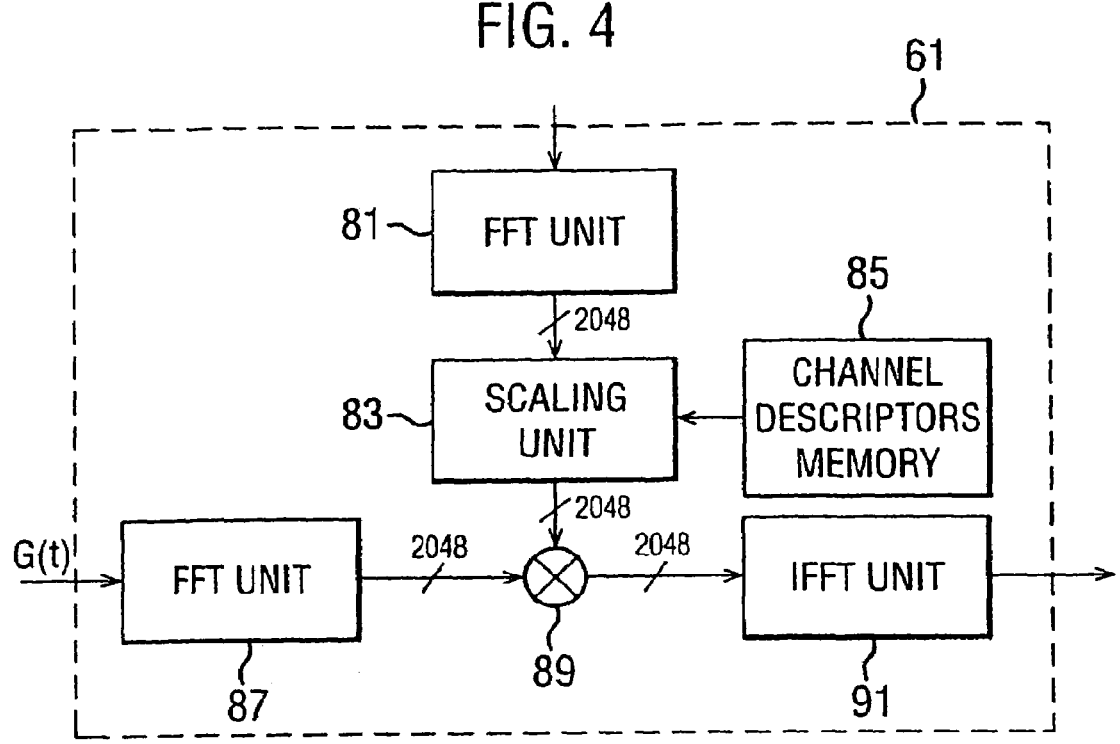
Figure 6:
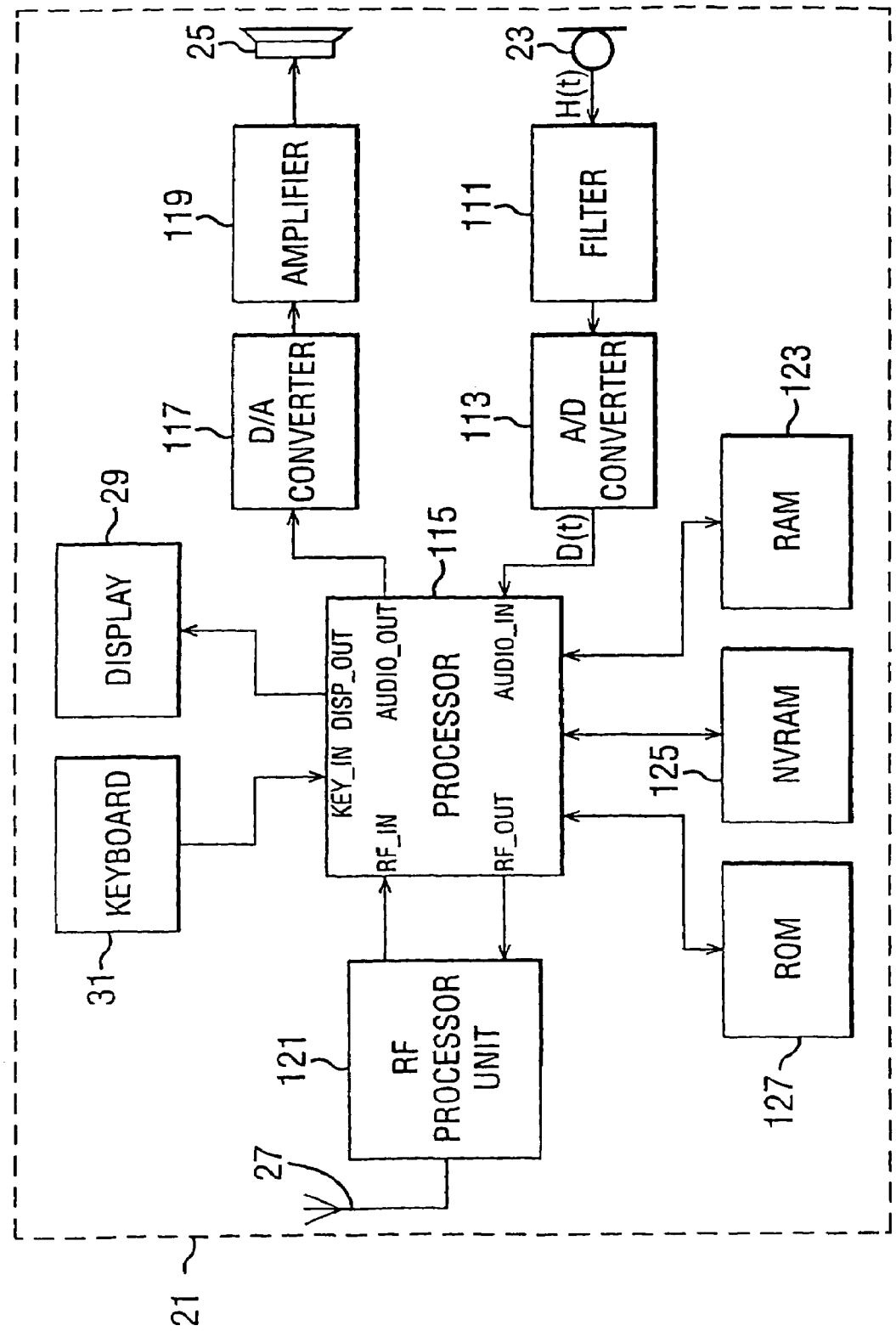
Figure 8:
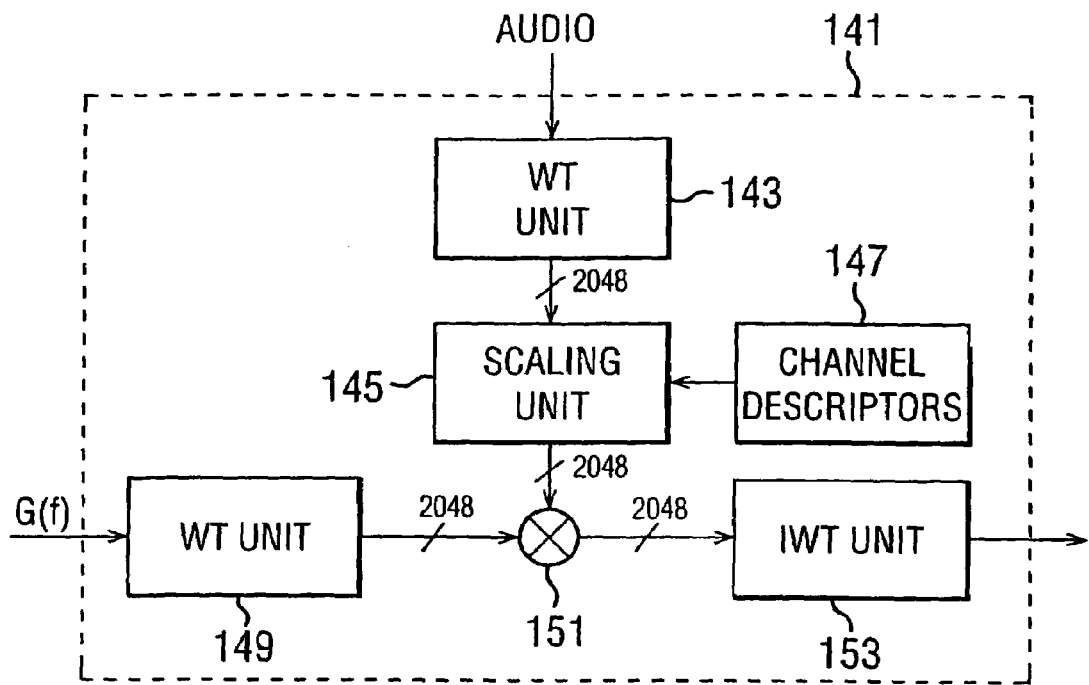
Figure 9:
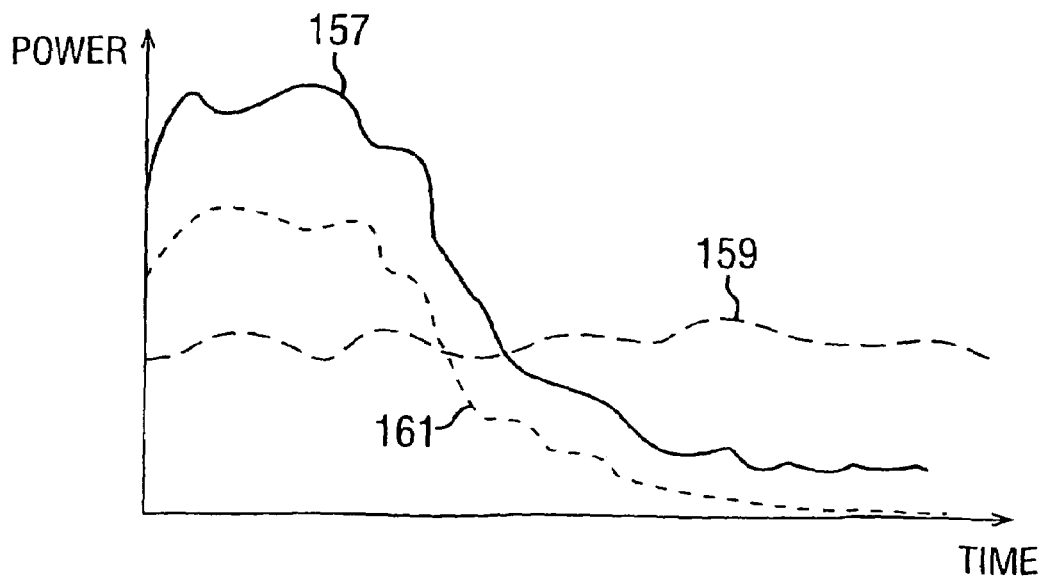
Figure 10:
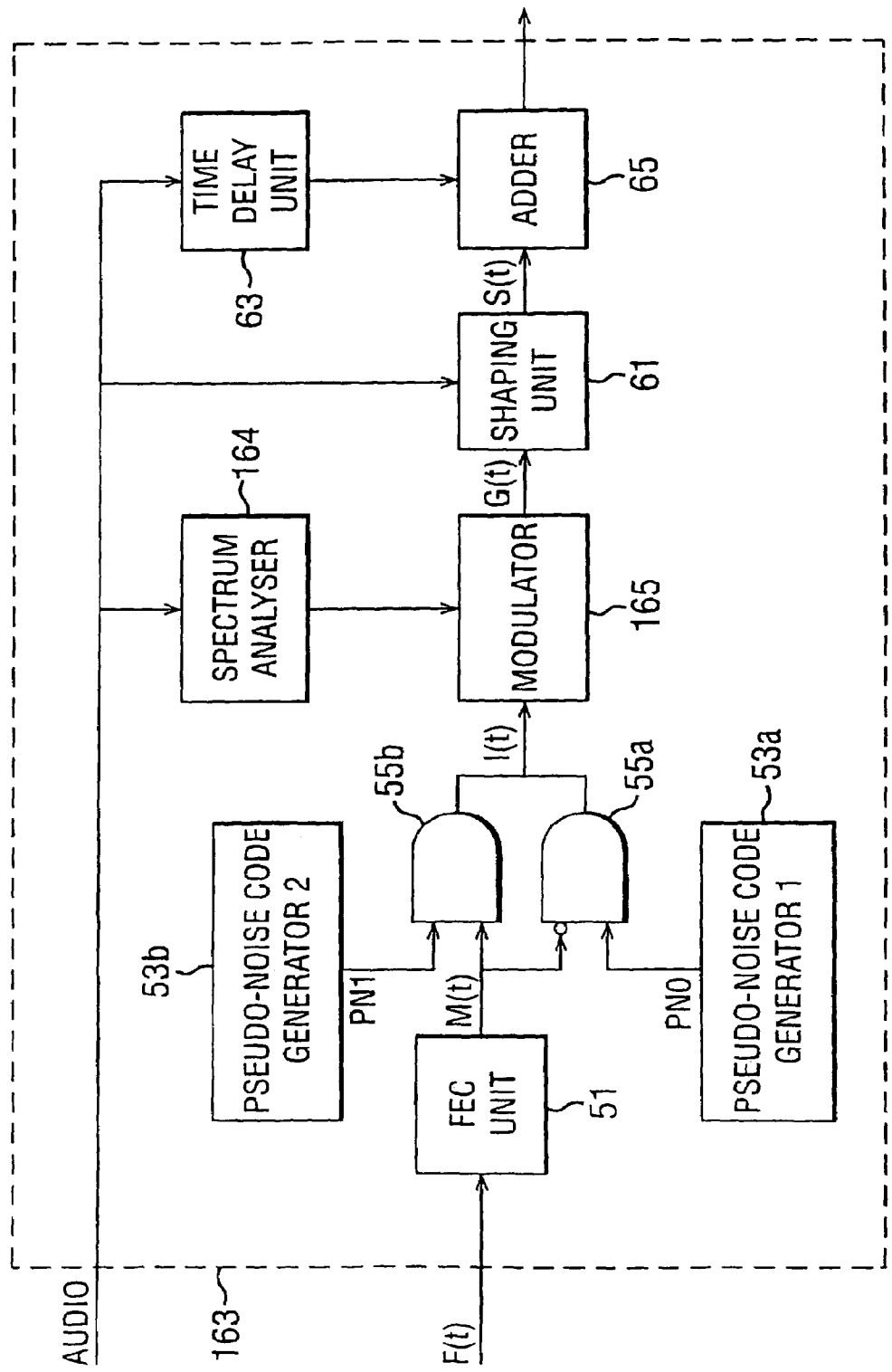
Figure 11:
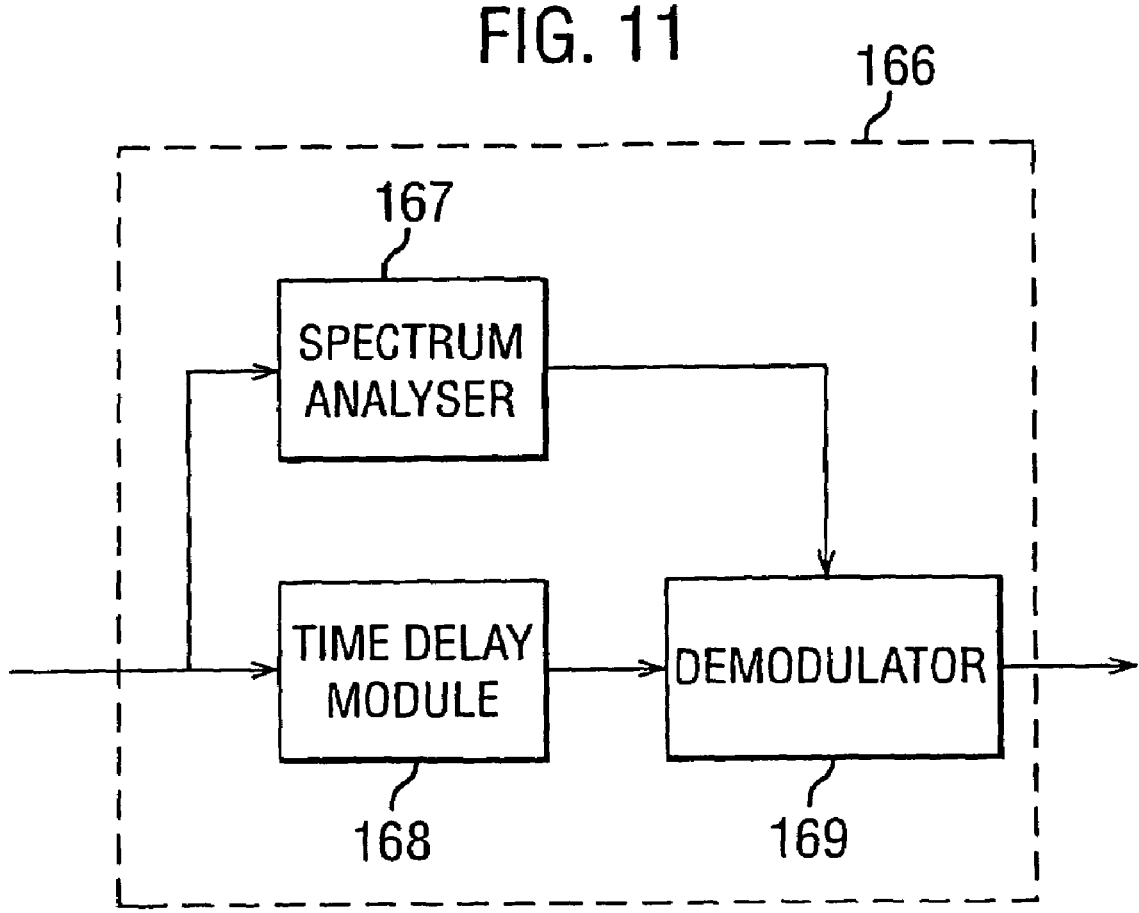
Figure 12:
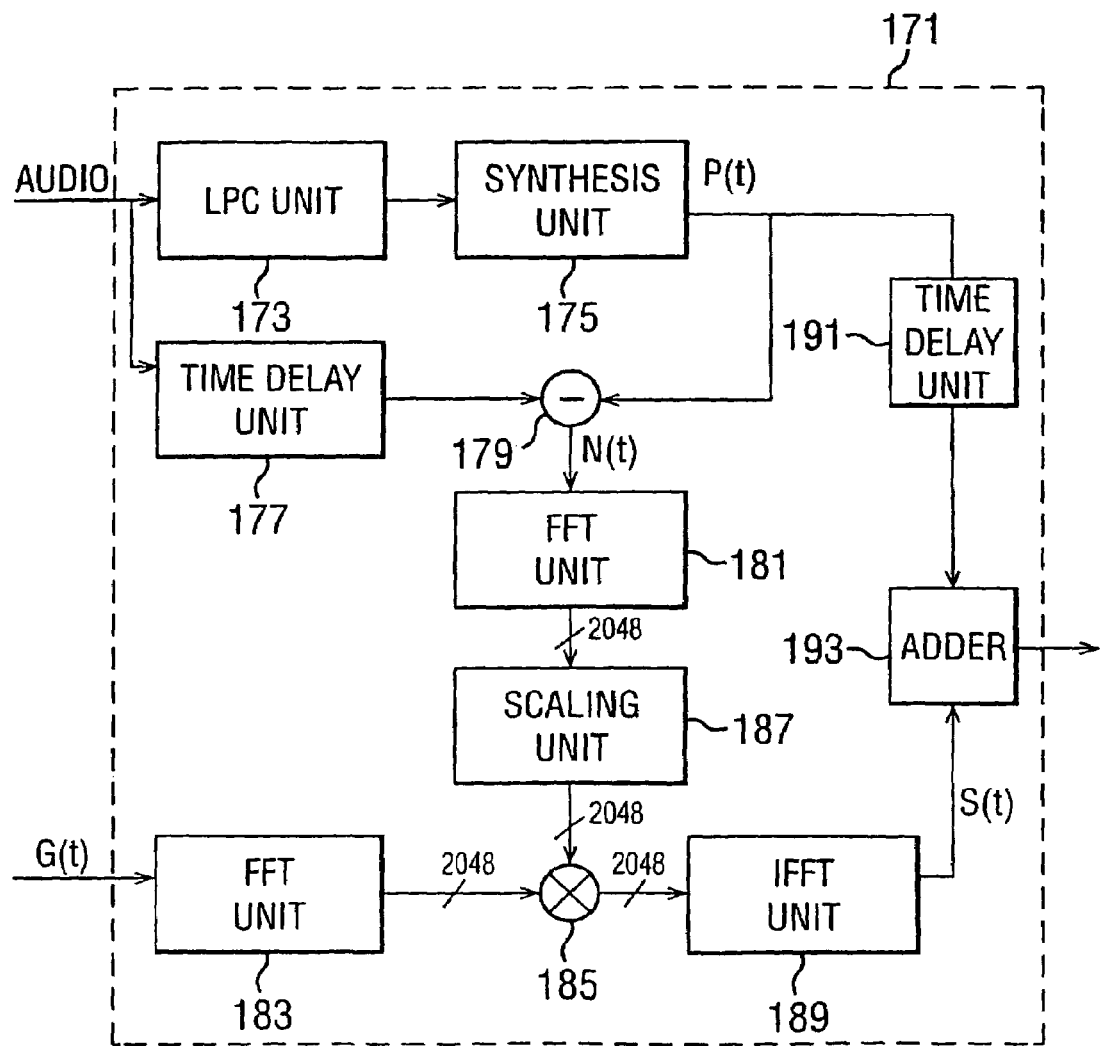
Figure 13A:
Figure 13B:
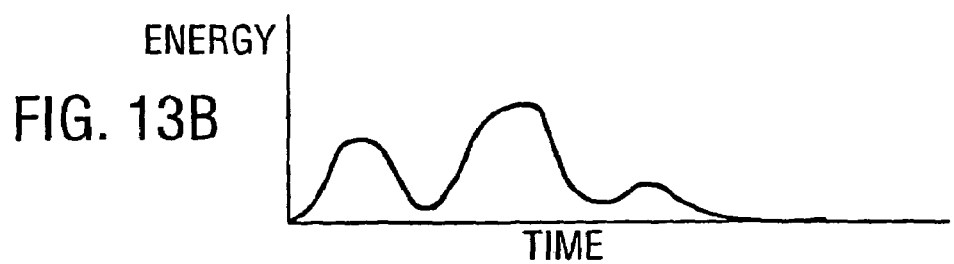
Figure 13C:
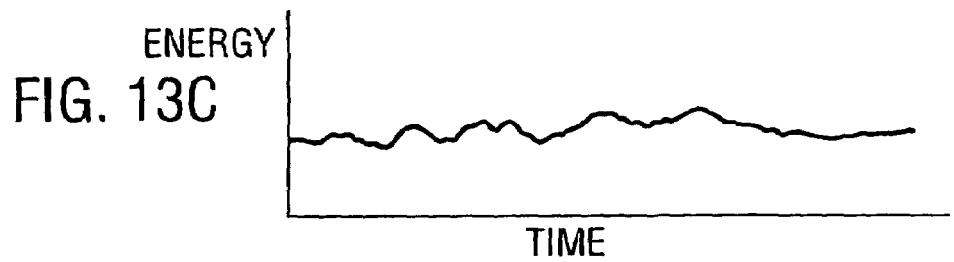
Figure 13D:
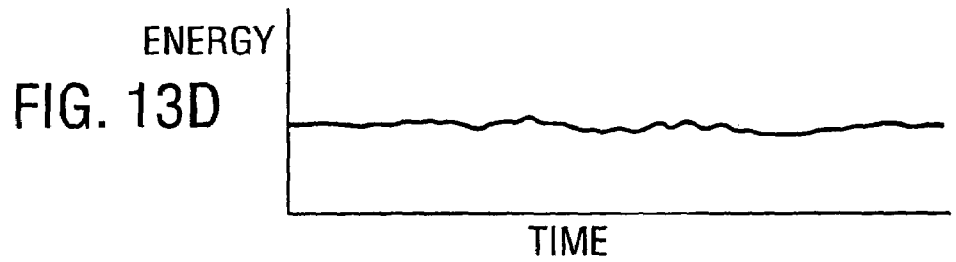
Figure 13E:
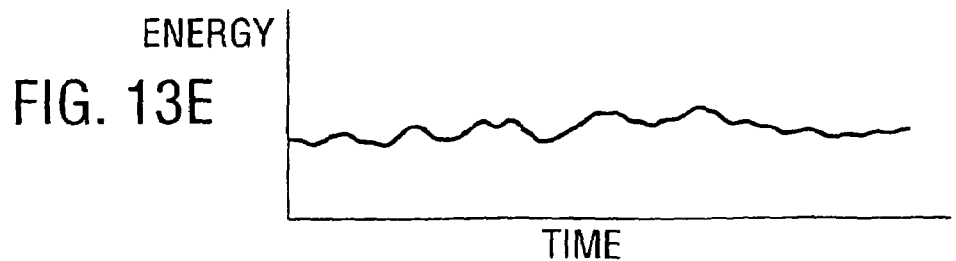
Figure 13F:
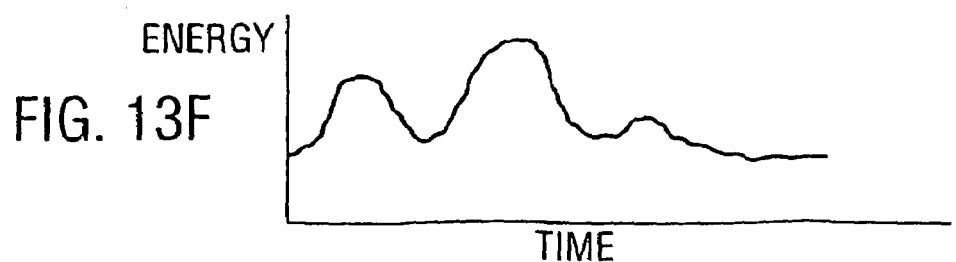
Figure 14:
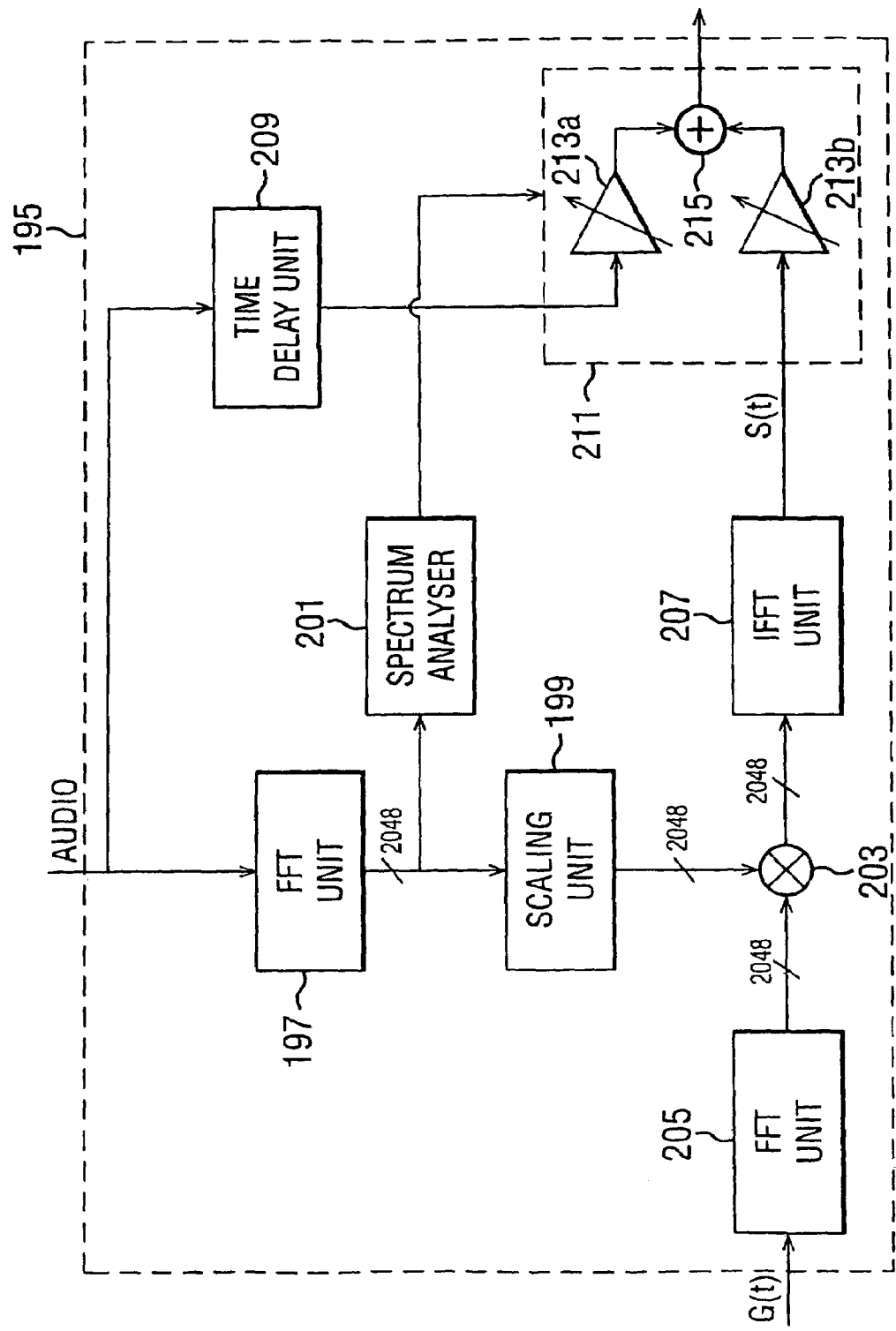
Figure 15:
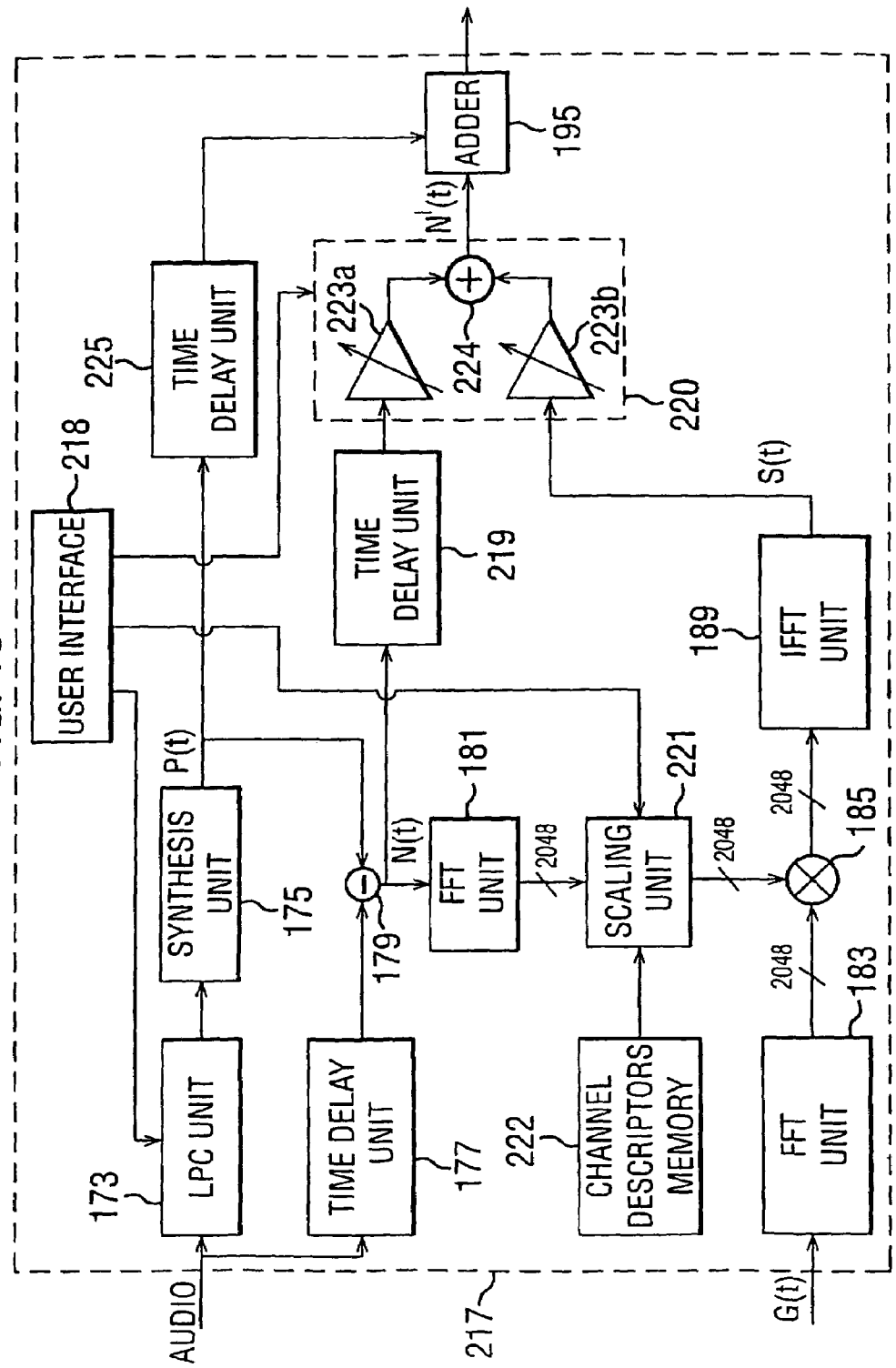
Figure 16:
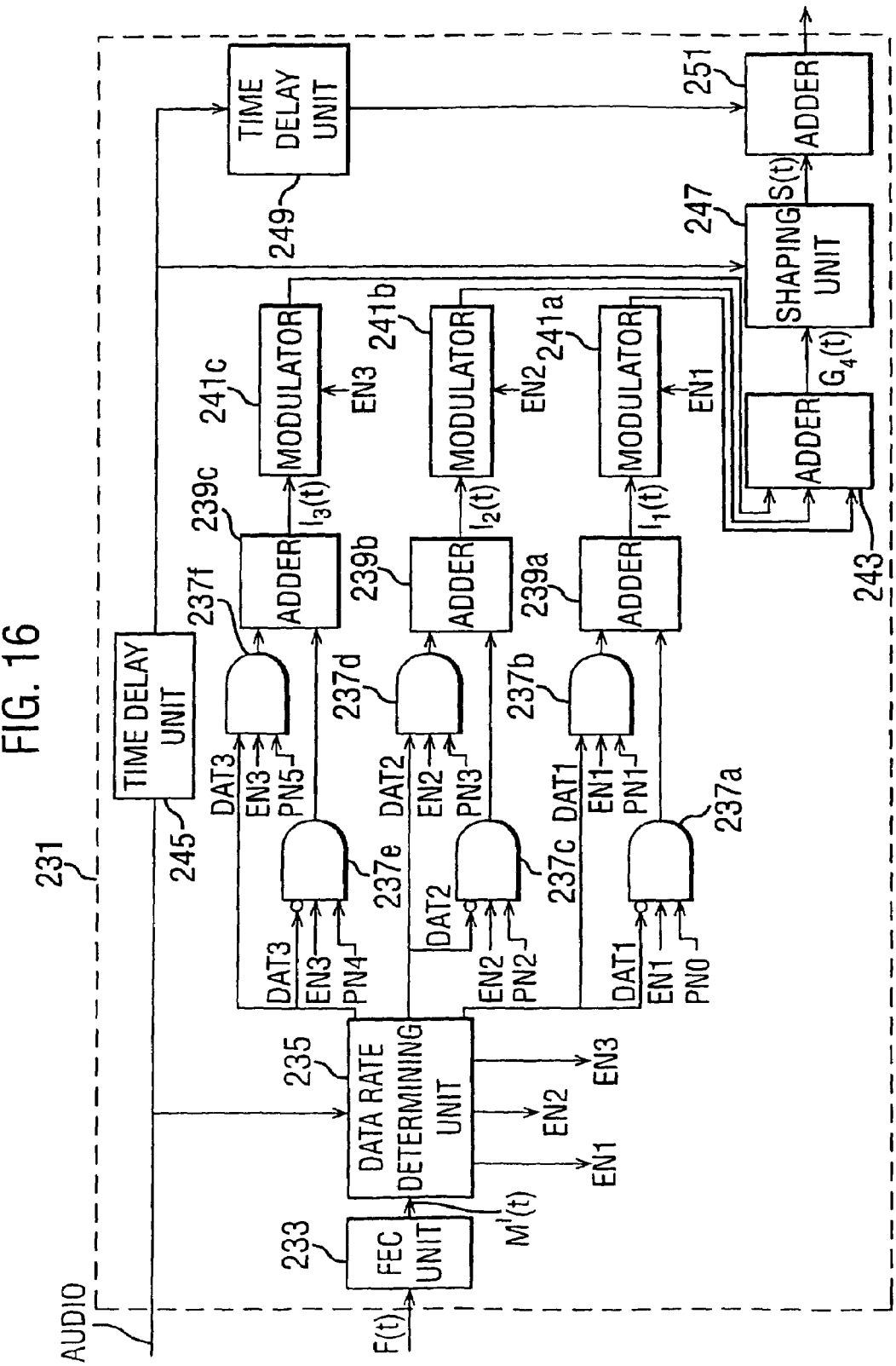
Figure 17:
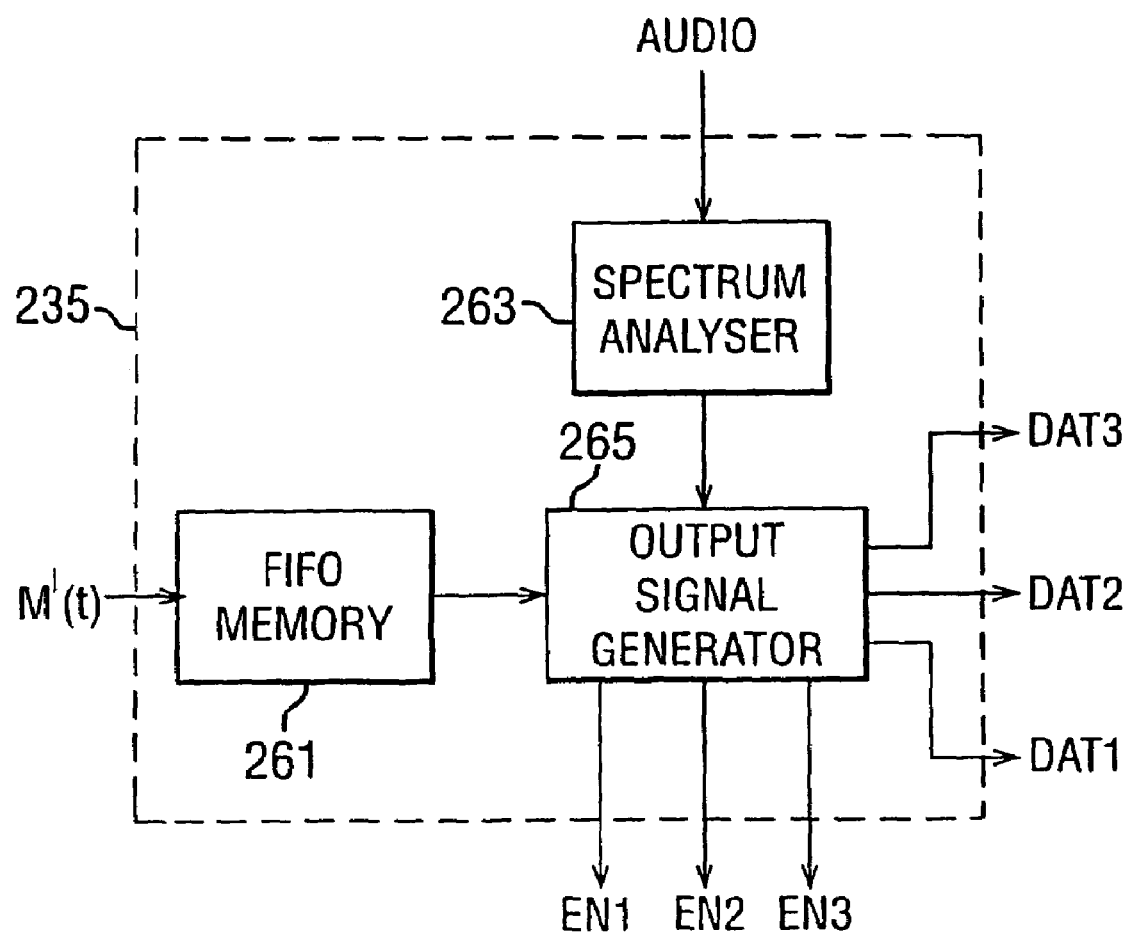
Figure 18:
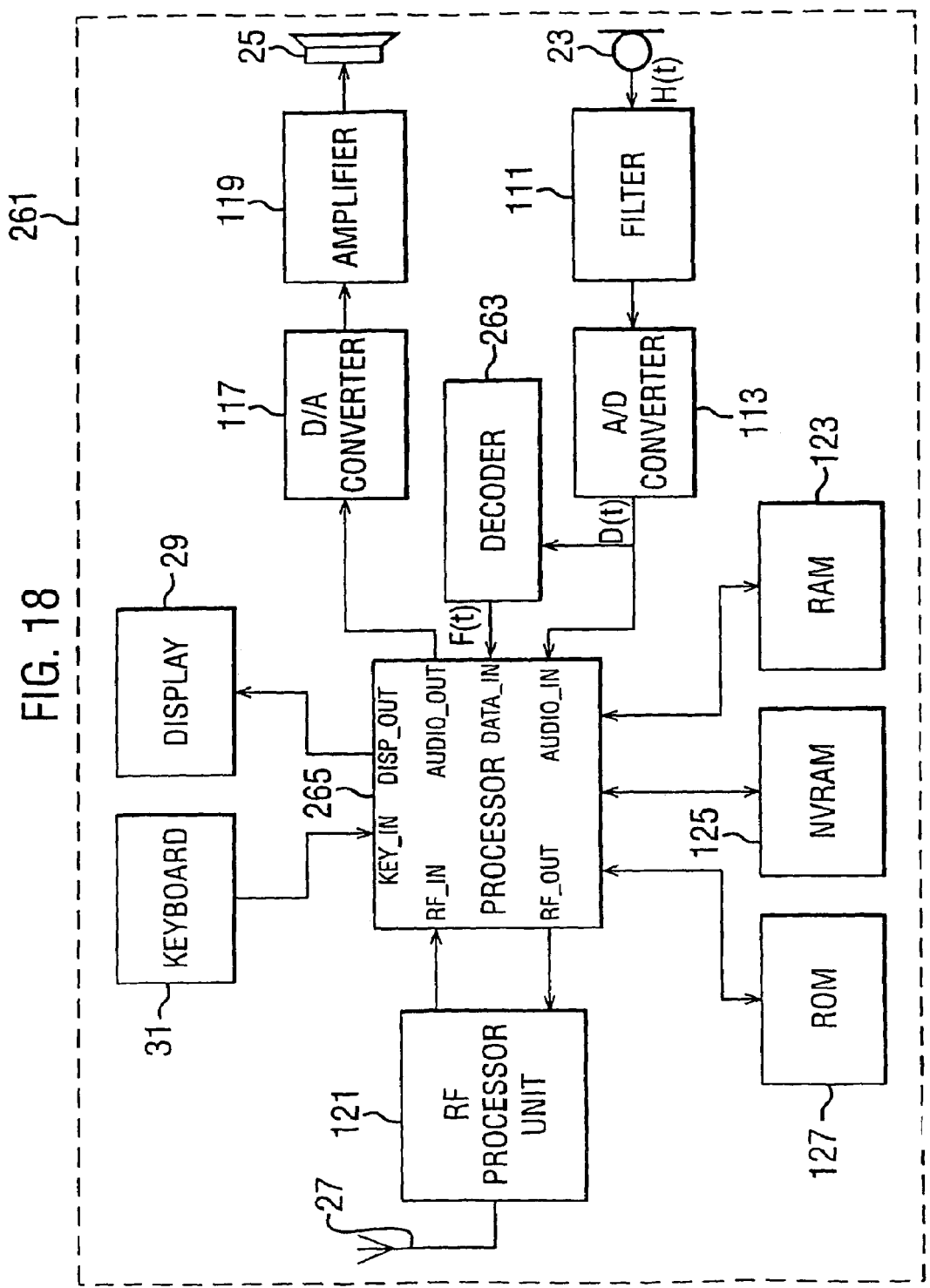
Figure 19:
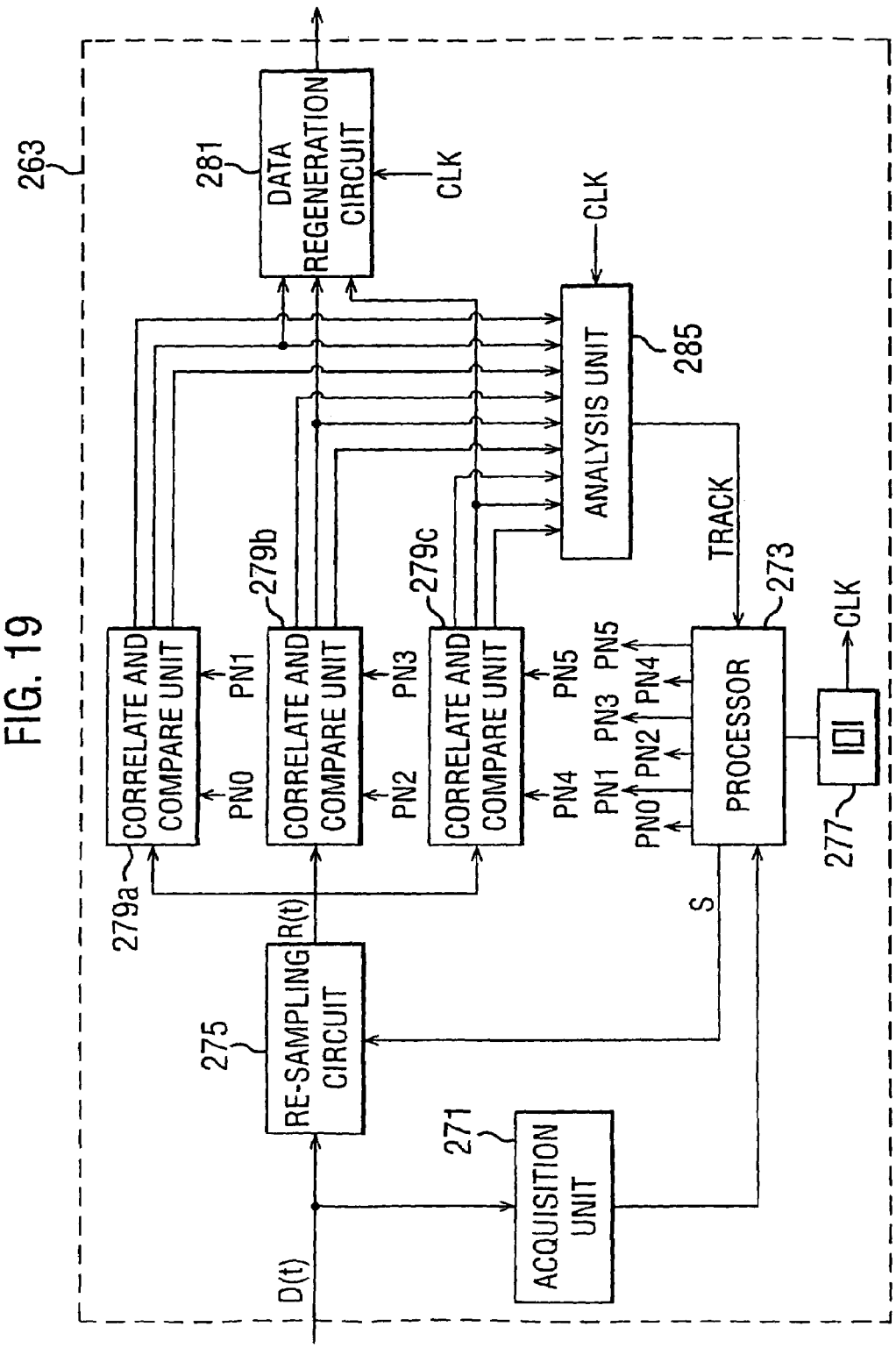
Figure 20:
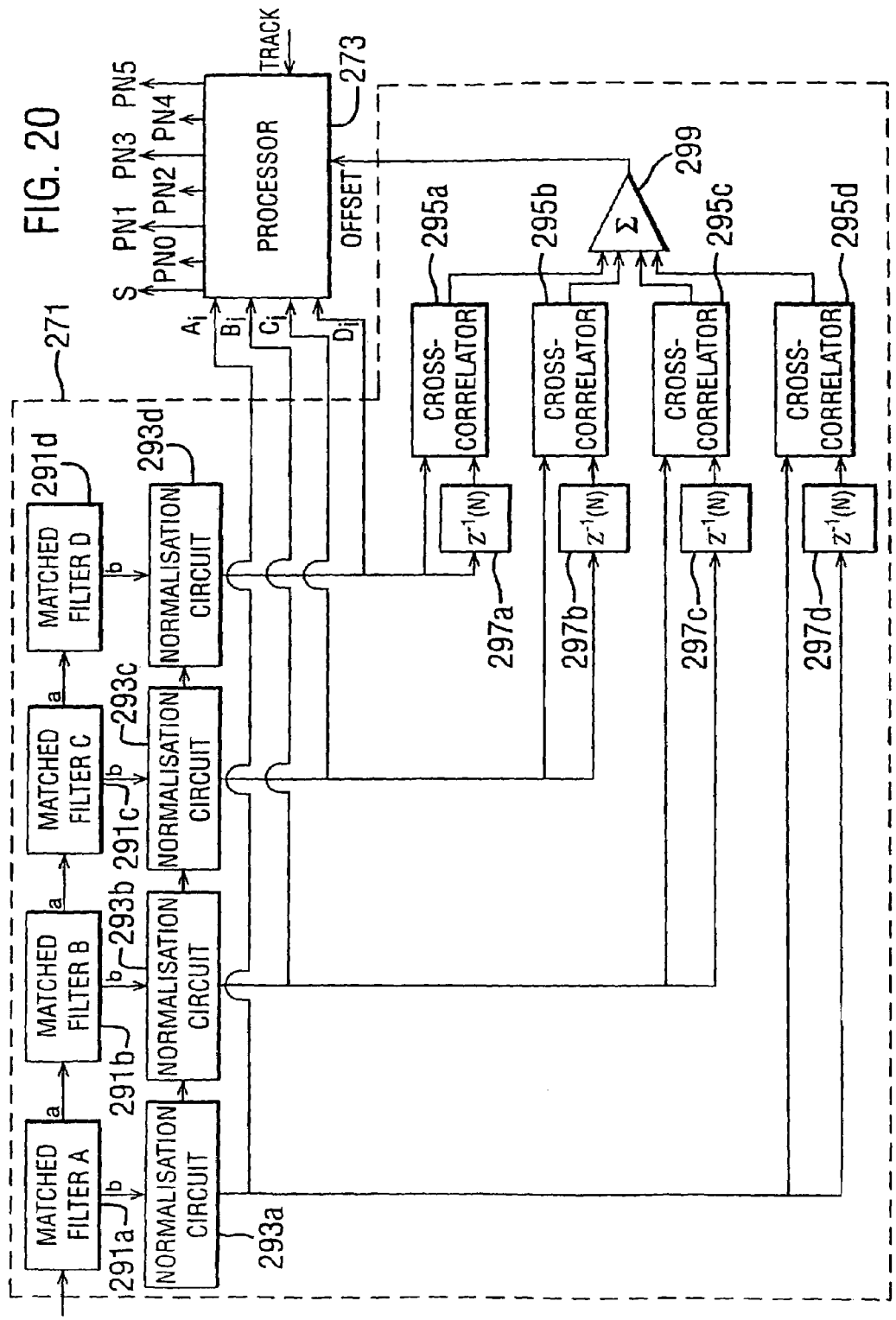
Figure 21:
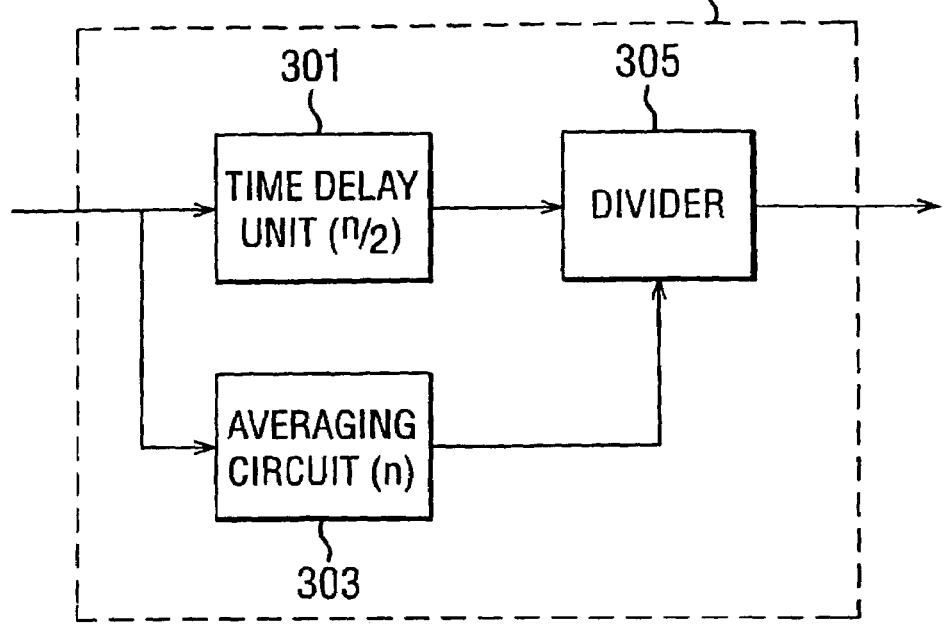
Figure 22:
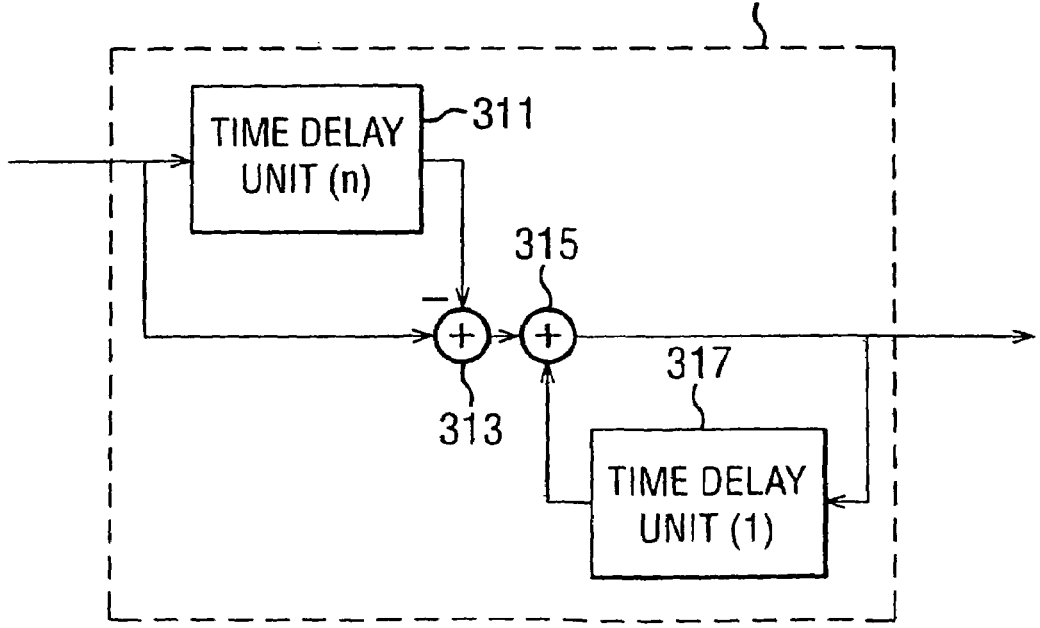
Figure 23:
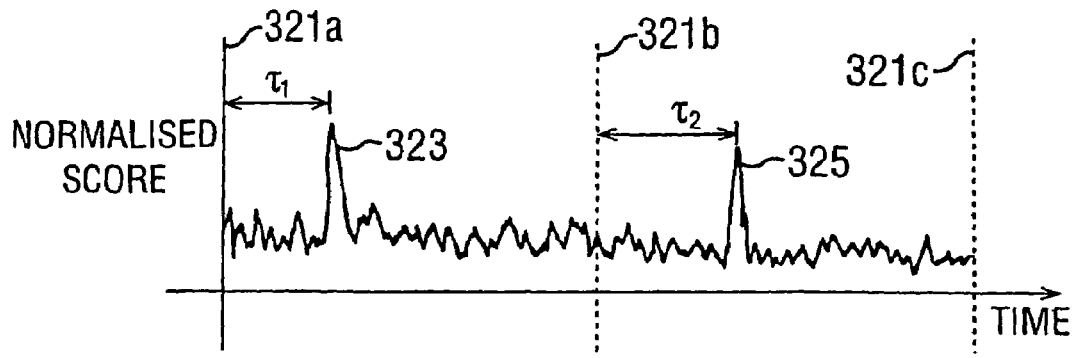
Figure 24:
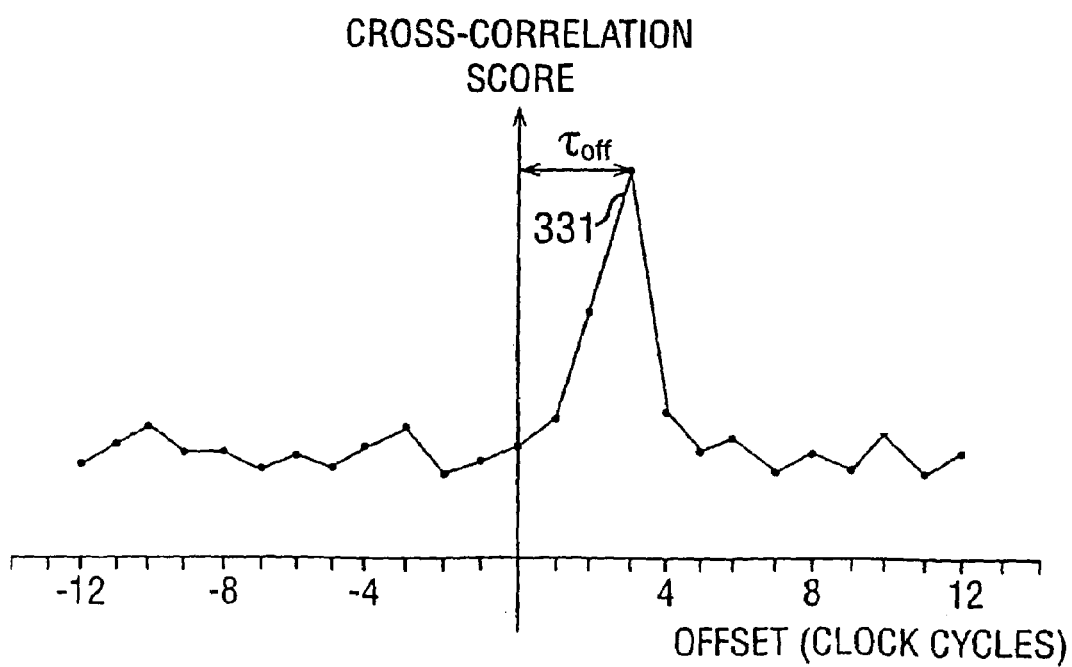
Figure 25:
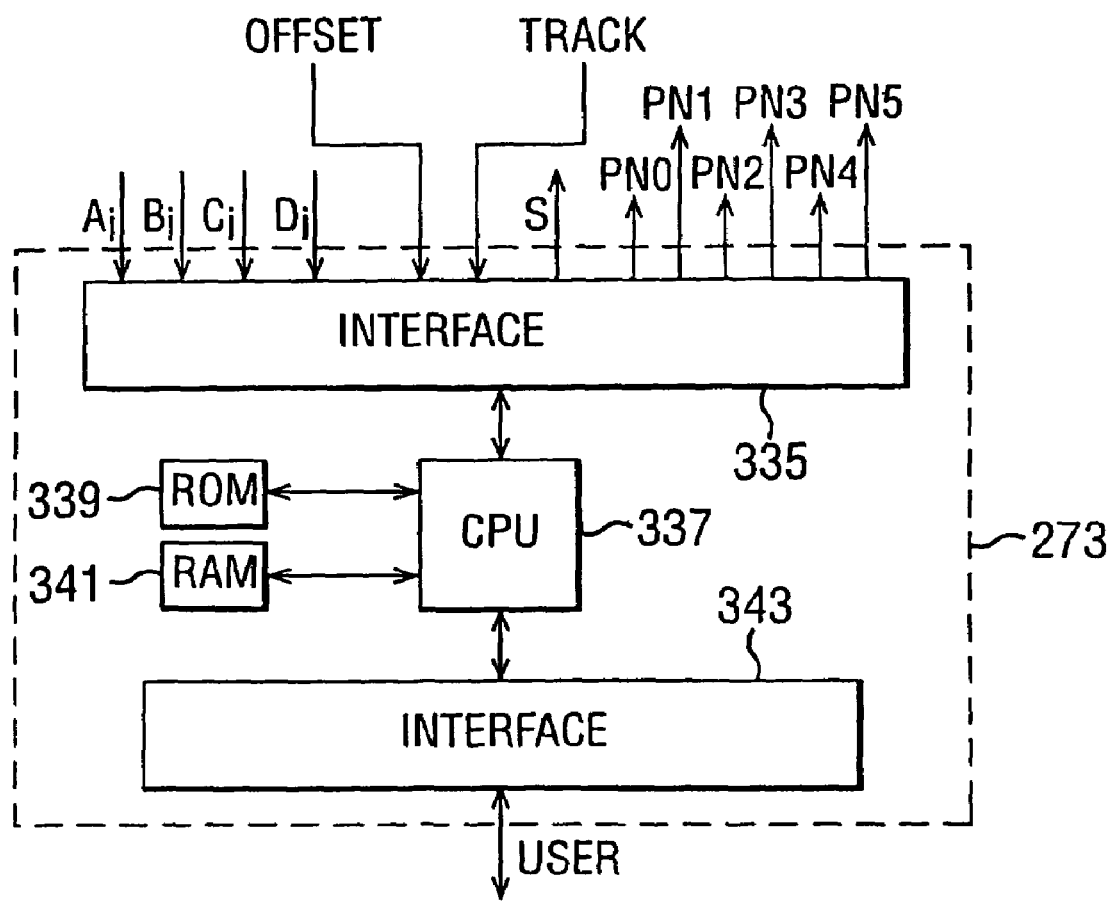
Figure 26:
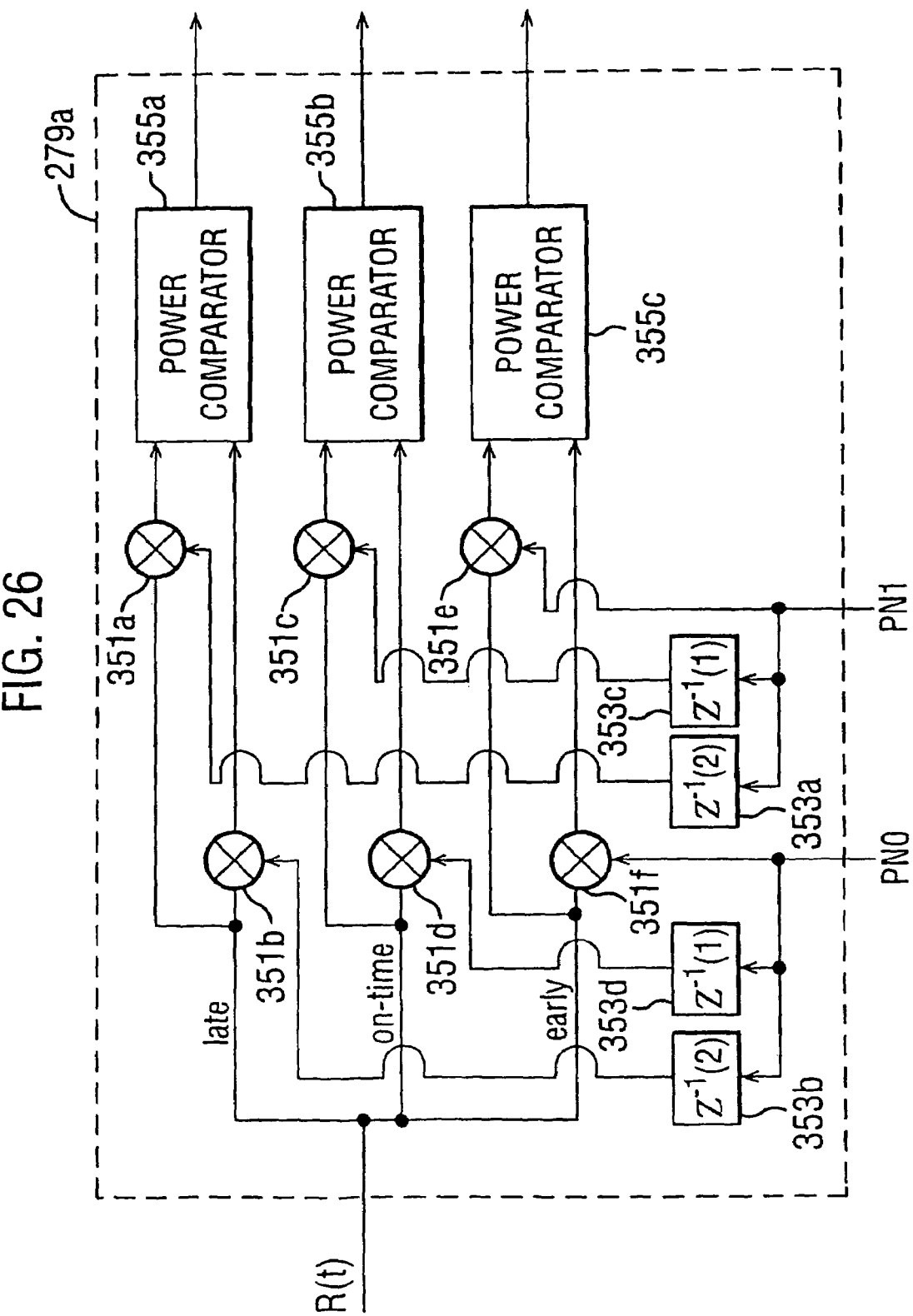
Figure 27:
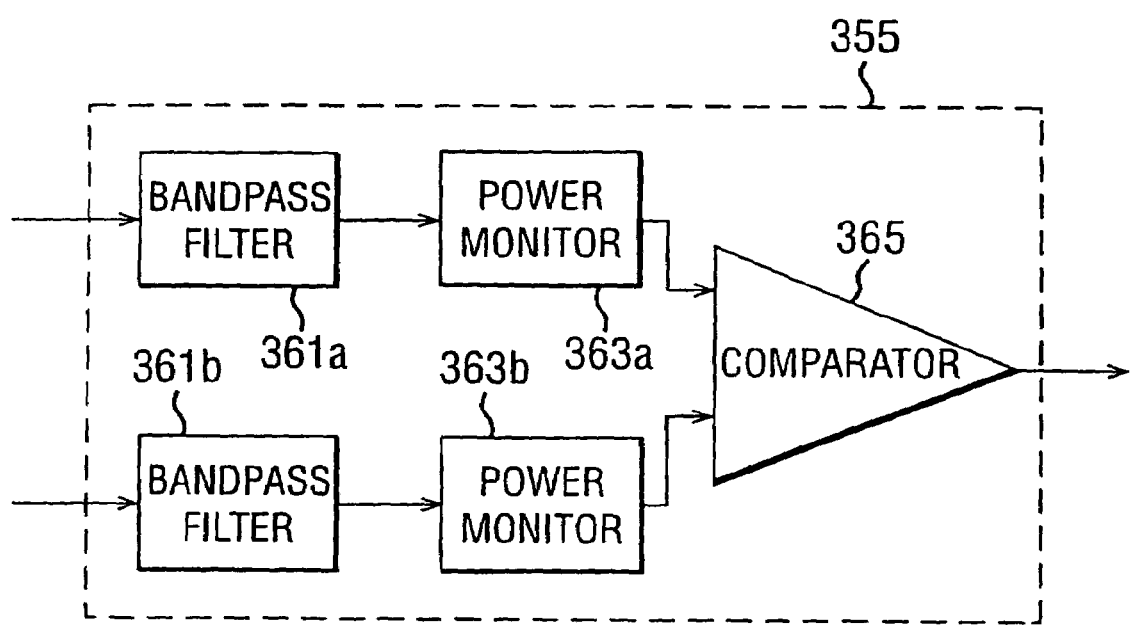
Figure 28:
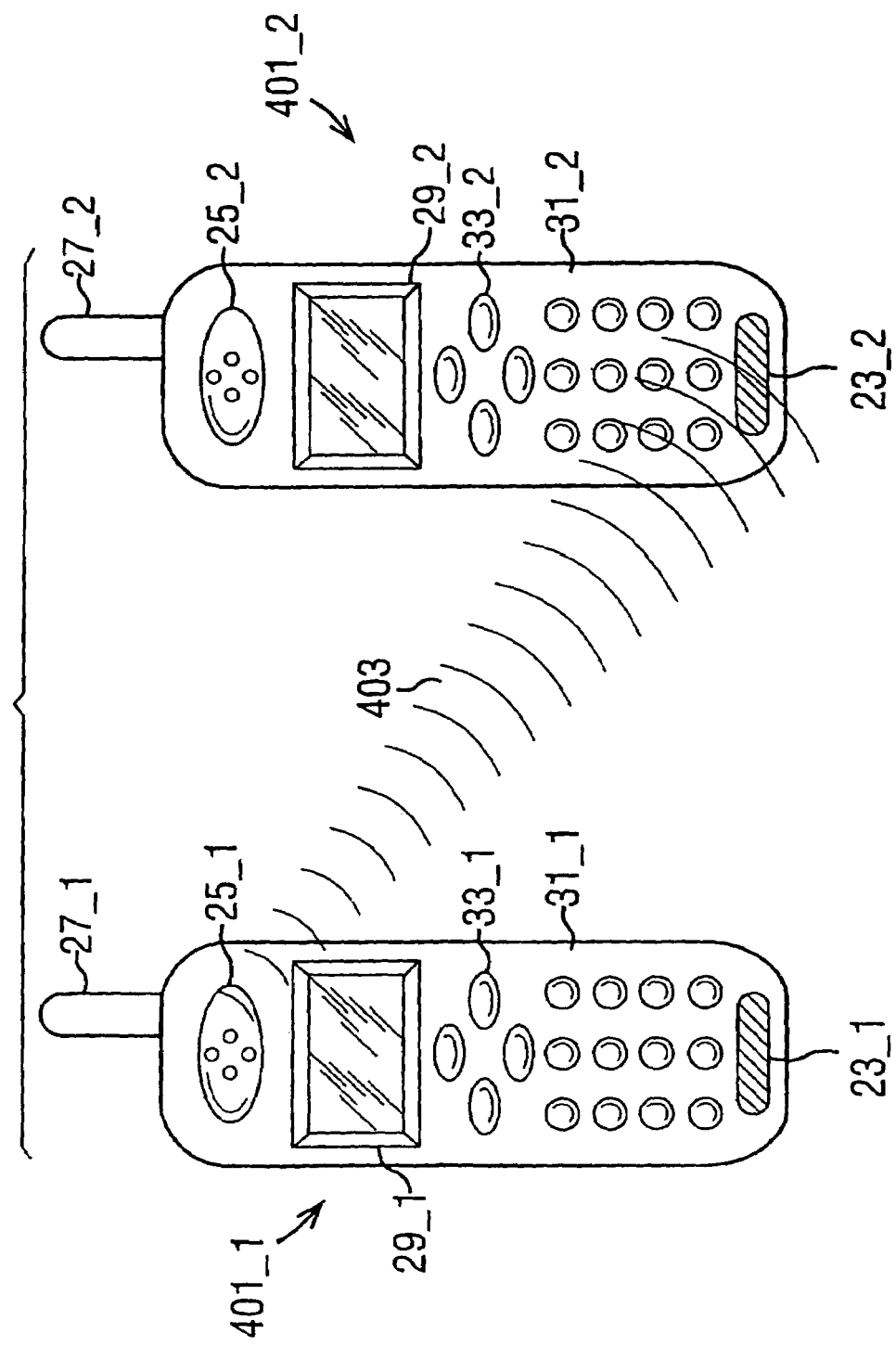
Figure 29:
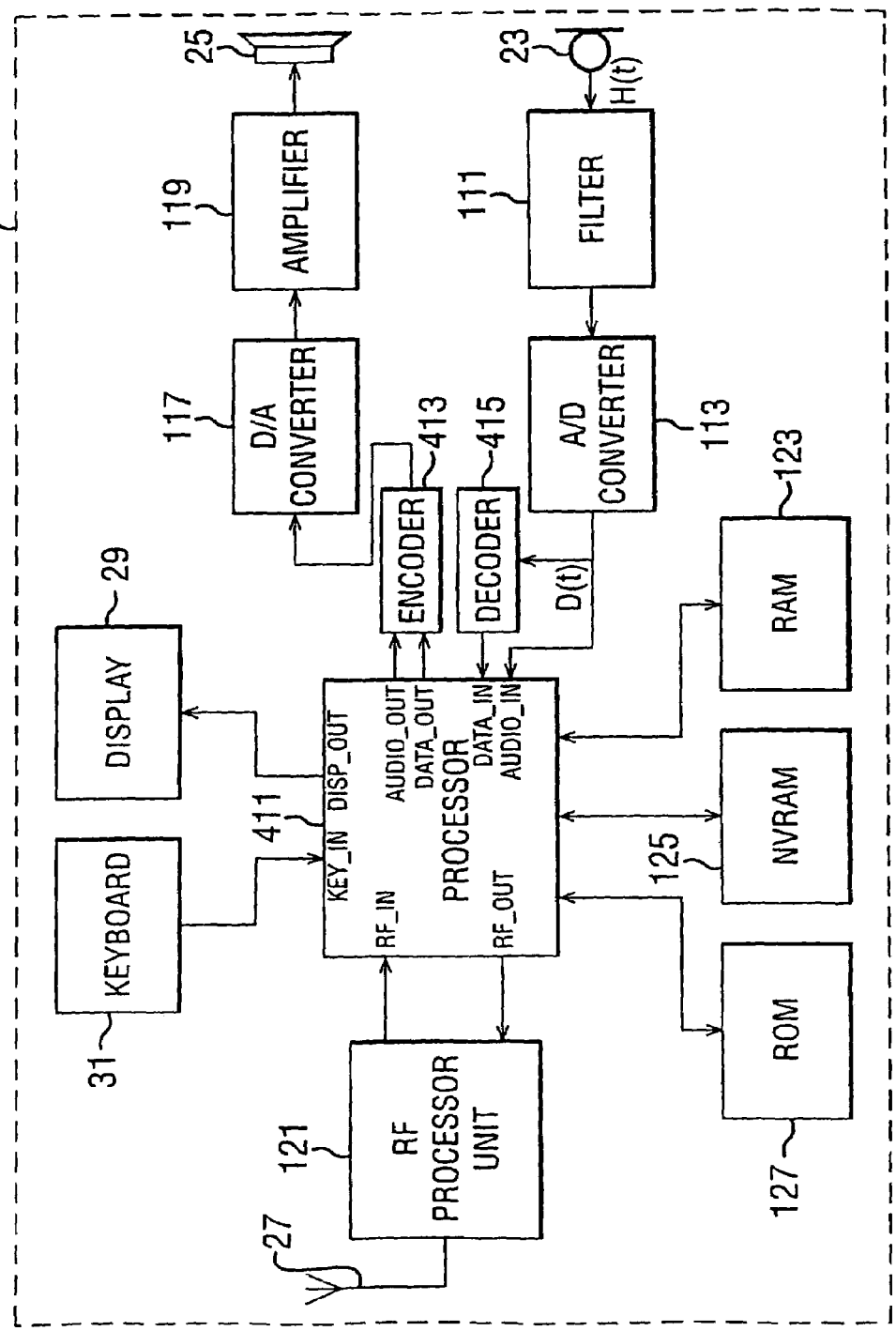
Figure 30:
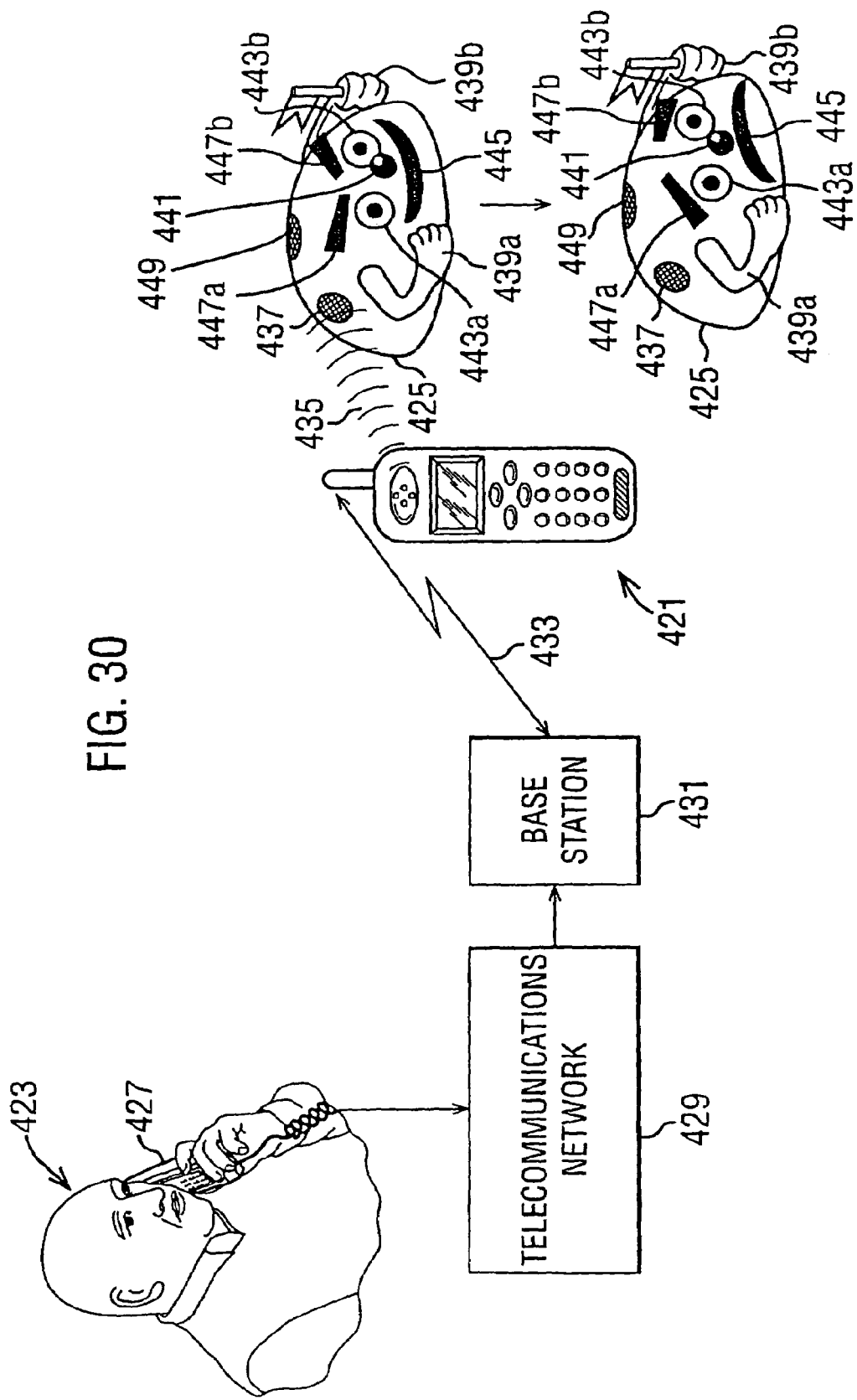
Figure 31:
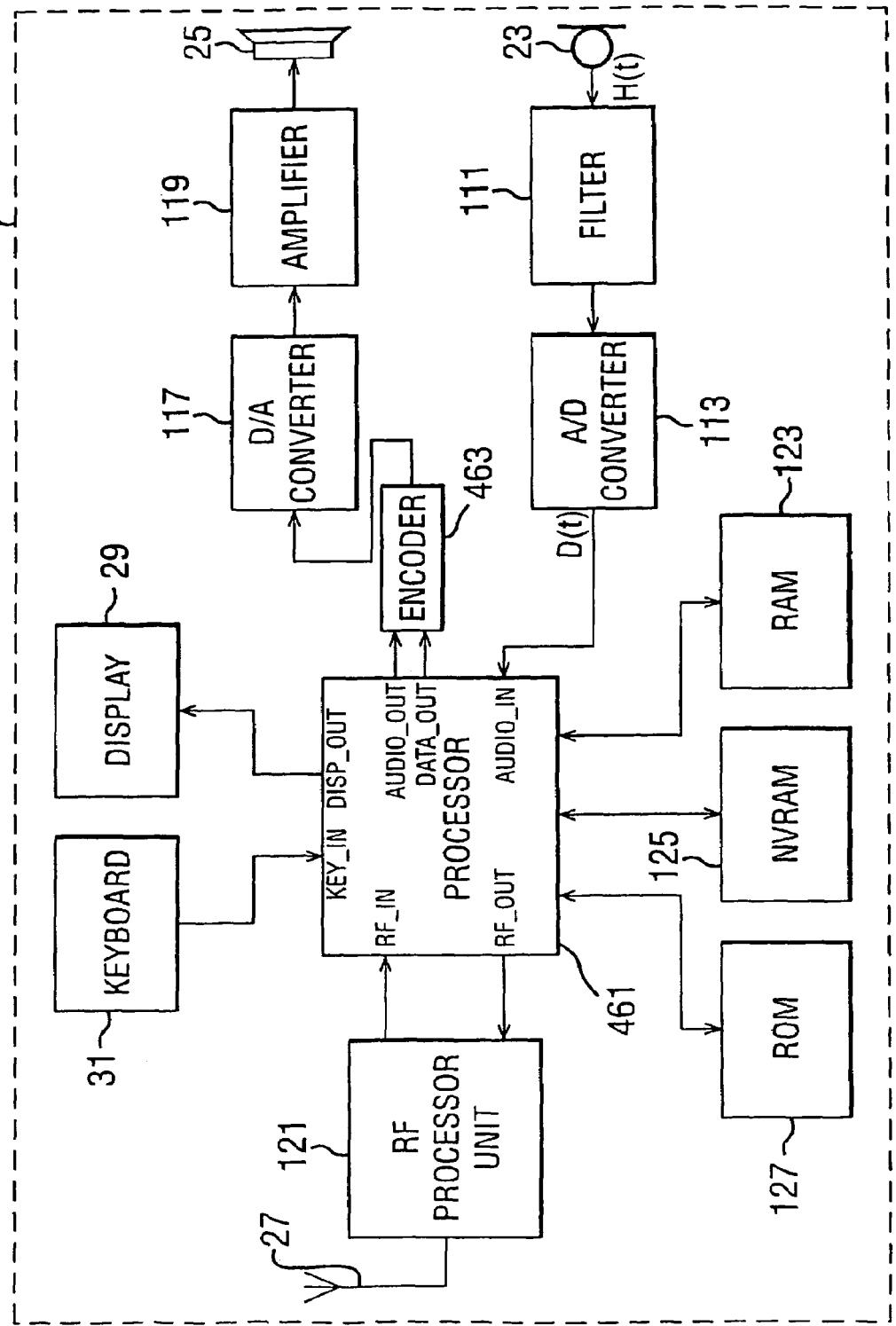
Figure 32:
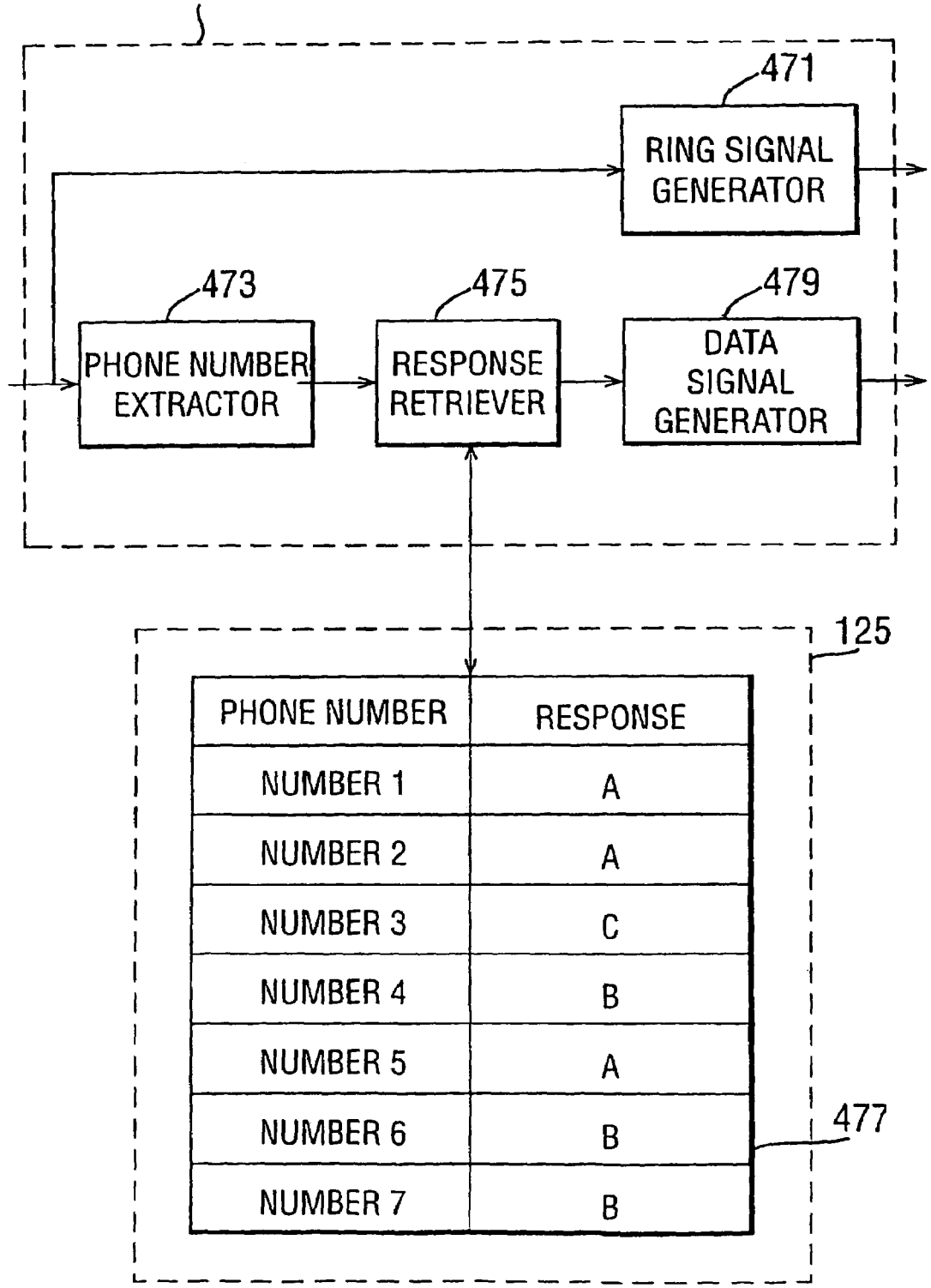
Figure 33:
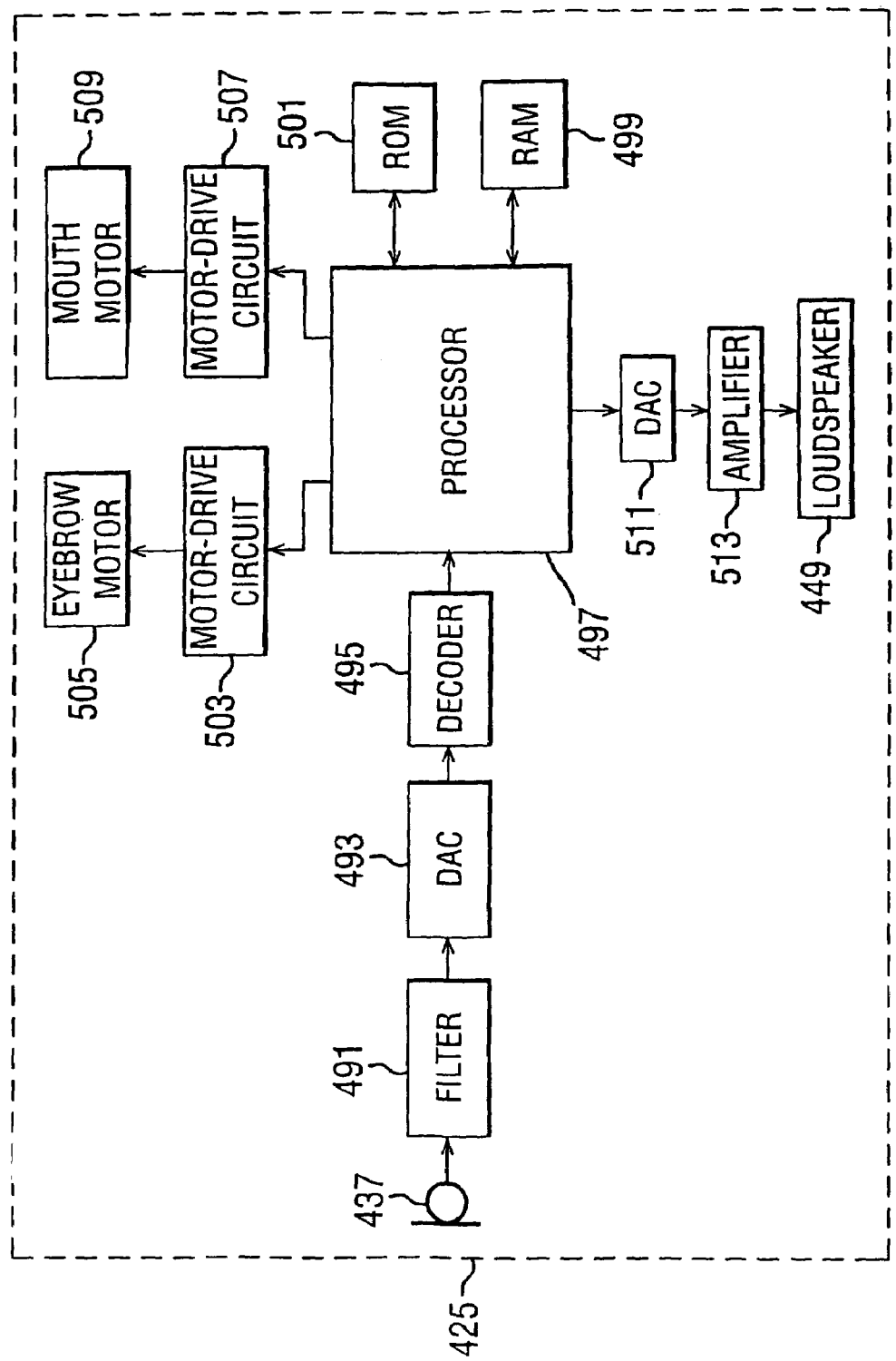
Figure 34:
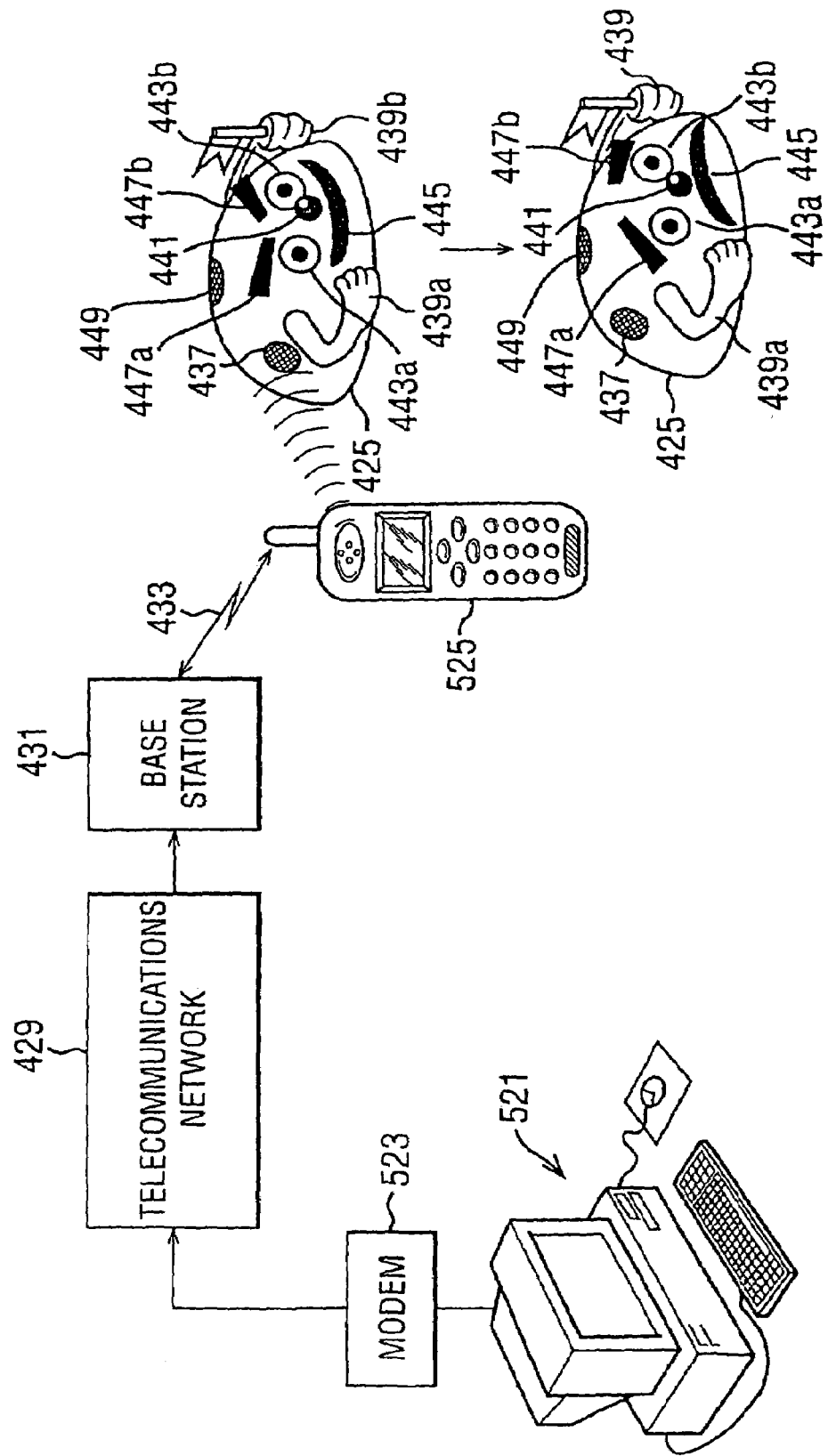
Figure 35:
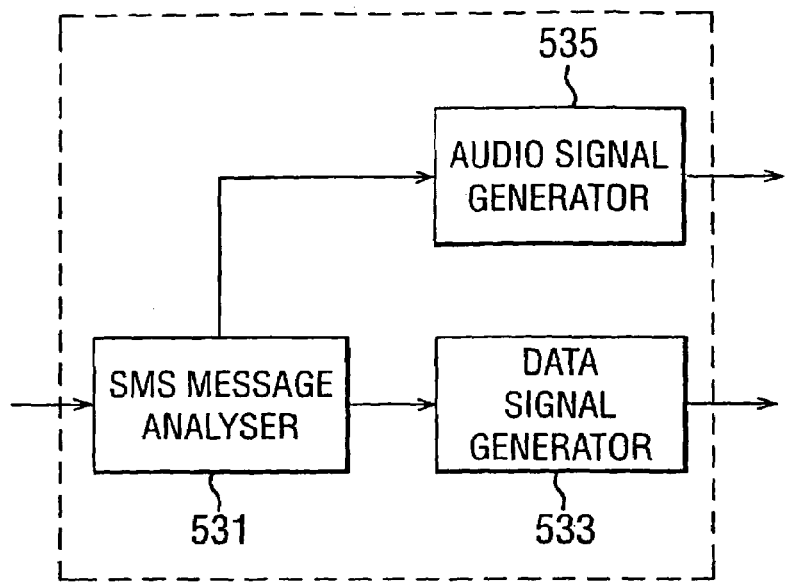
Figure 36:
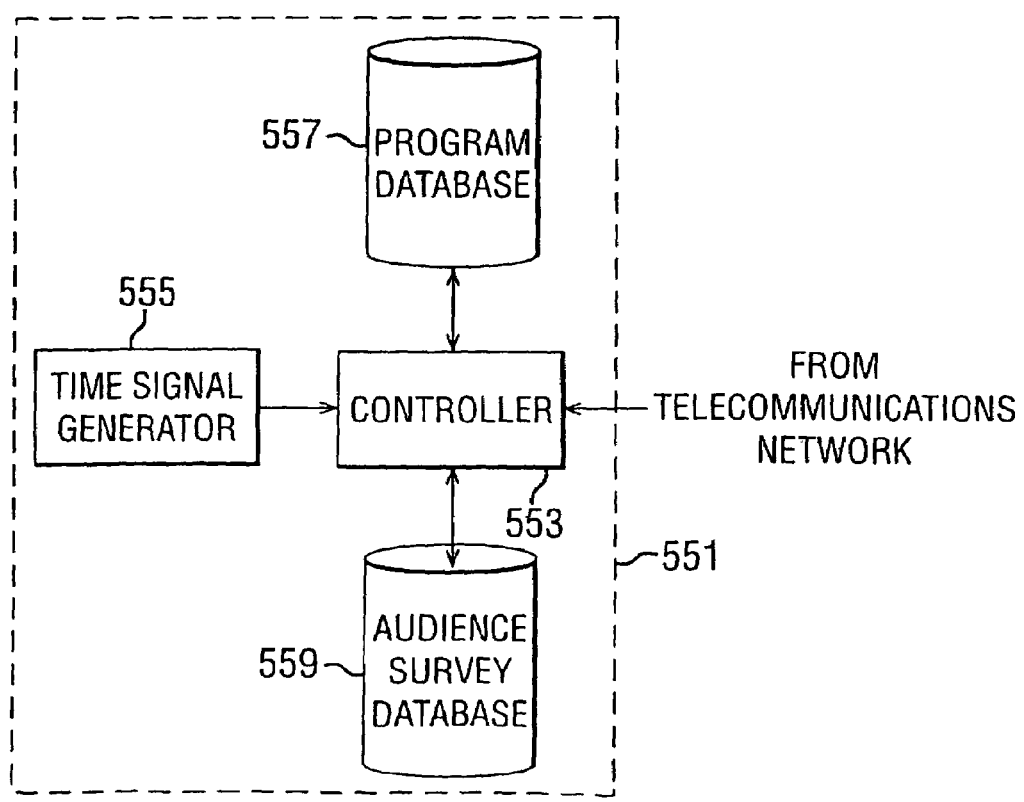
Figure 37:
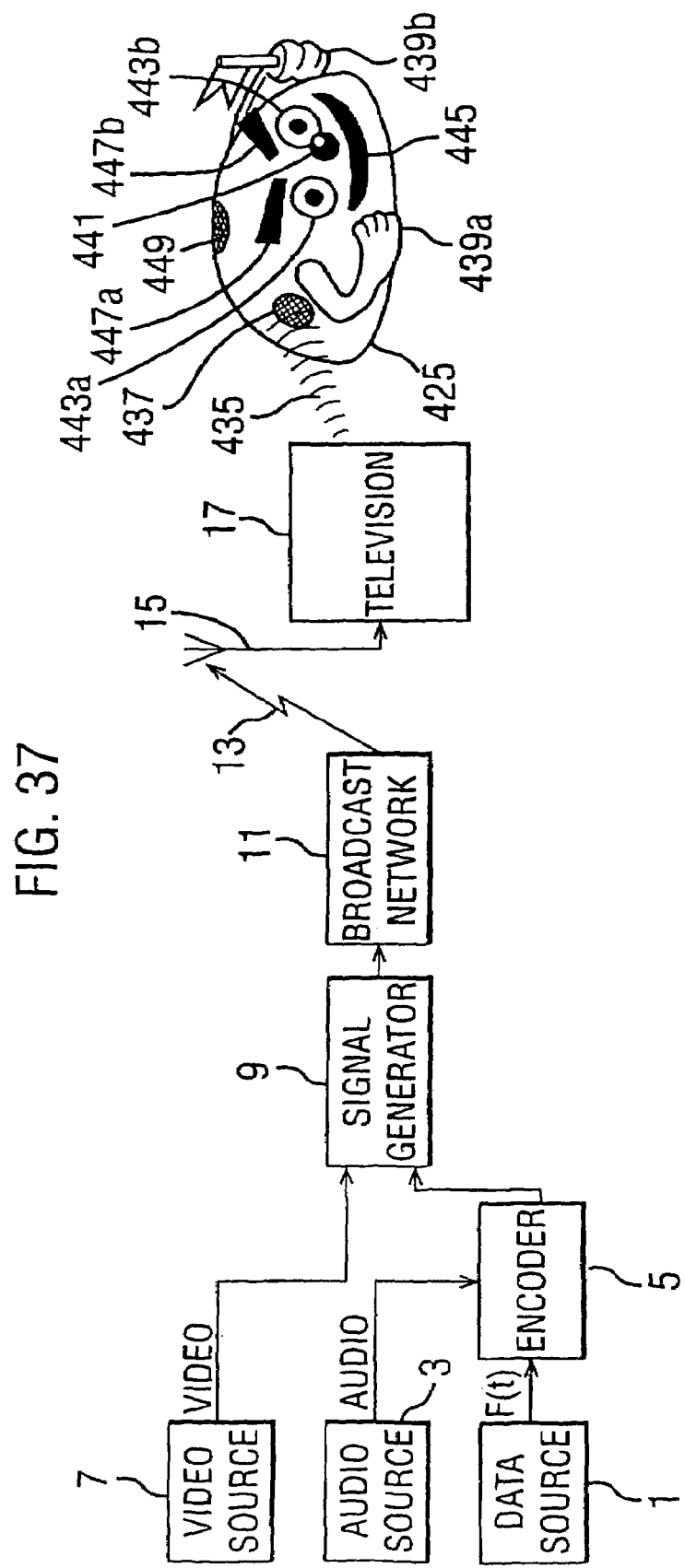
Figure 38:
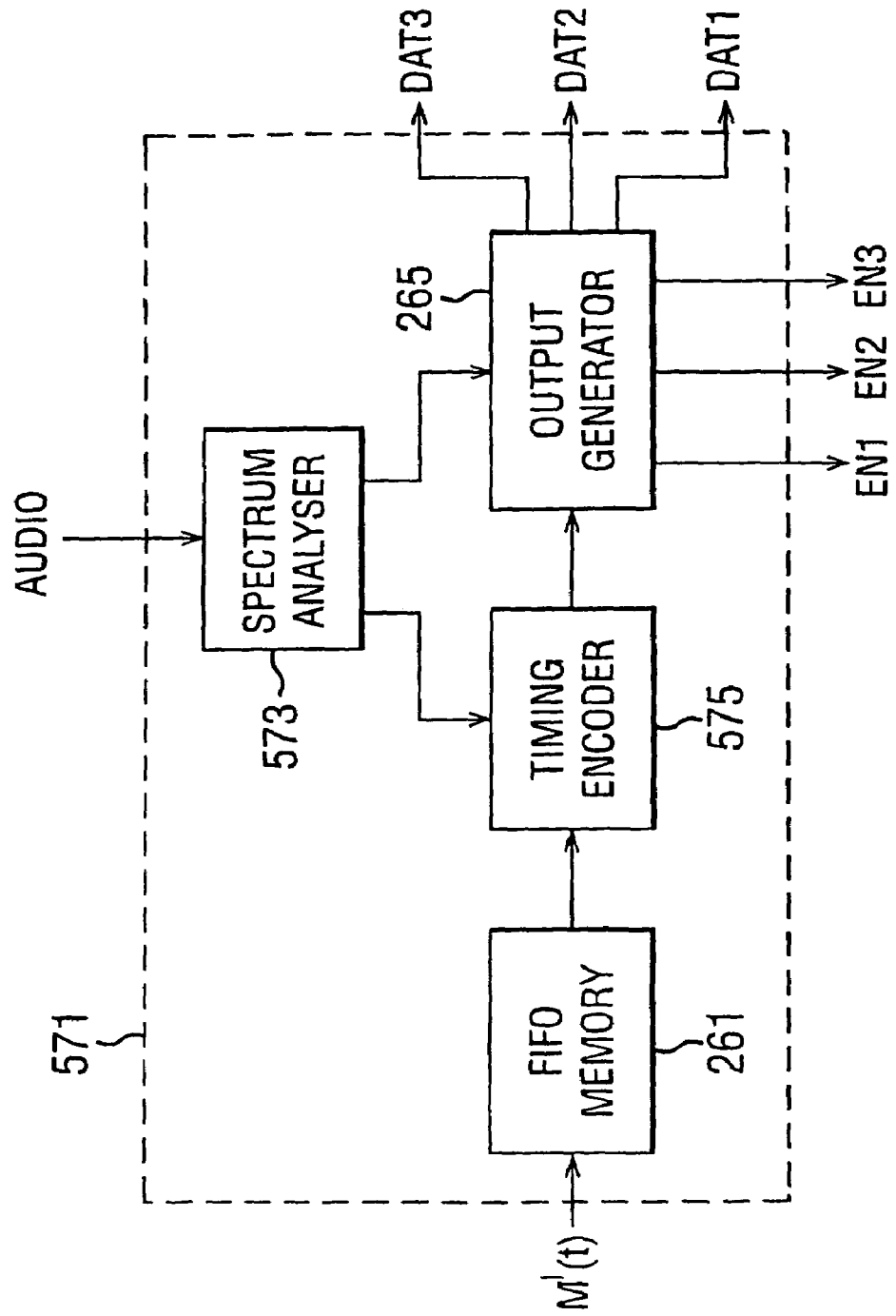
Figure 39A:
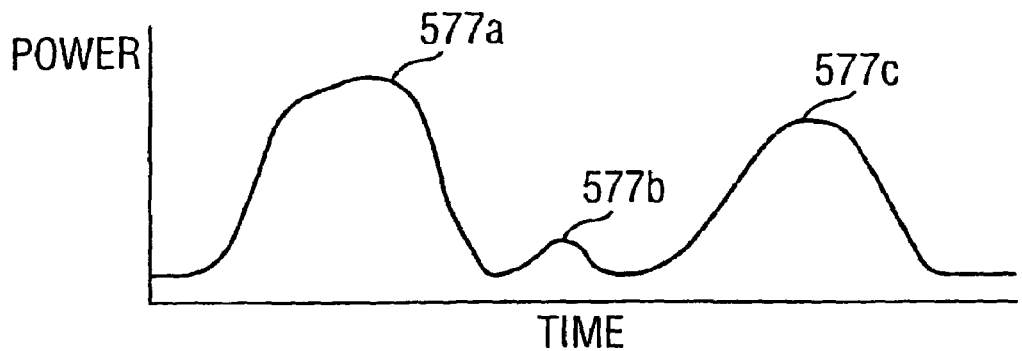
Figure 39B:
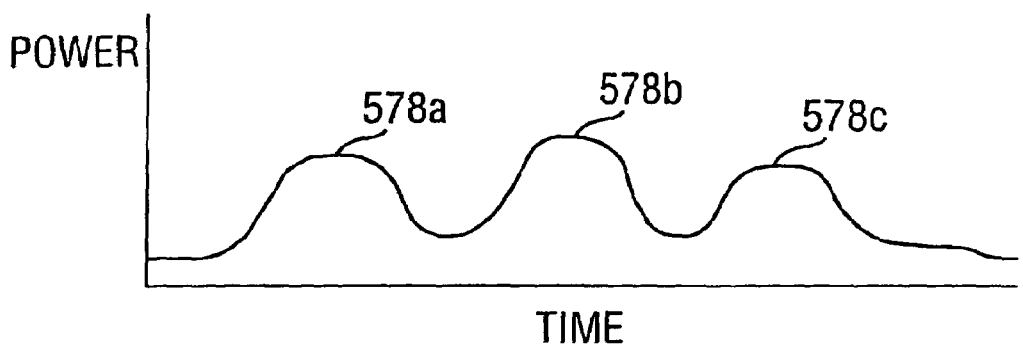
Figure 39C:
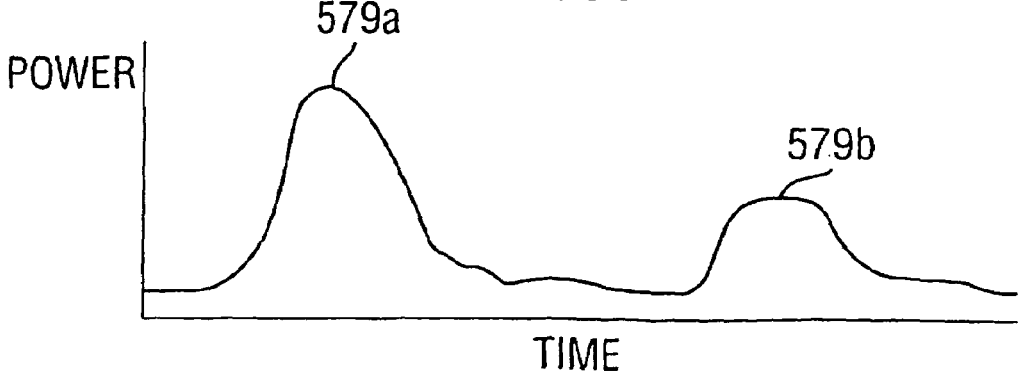

FIG. 8 schematically shows a scaling unit for a first alternative encoder to the encoder illustrated in FIG. 2;

FIG. 9 is a plot illustrating a portion of the audio track, a signal output by the shaping unit illustrated in FIG. 4 using the audio track, and a signal output by the shaping unit illustrated in FIG. 8 using the audio track;

FIG. 10 schematically shows a second alternative encoder to the encoder illustrated in FIG. 2;

FIG. 11 is a schematic block diagram showing the functional configuration of a processor of a first alternative cellular phone to the cellular phone illustrated in FIG. 6 when demodulating a signal encoded by the second alternative encoder illustrated in FIG. 10;

FIG. 12 schematically shows an audio mixer of a third alternative encoder to the encoder illustrated in FIG. 2;

FIG. 13A is a timing diagram illustrating a typical audio track;

FIG. 13B is a timing diagram illustrating the predictable portion of the audio track illustrated in FIG. 13A;

FIG. 13C is a timing diagram showing the non-predictable portion of the audio track illustrated in FIG. 13A;

FIG. 13D is a timing diagram showing a spread spectrum data signal;

FIG. 13E is a timing diagram showing the spread spectrum data signal illustrated in FIG. 13D after it has been shaped to approximate the non-predictable portion of the audio track as illustrated in FIG. 13C;

FIG. 13F is a timing diagram showing a modified audio track obtained by combining the predictable portion of the audio track as illustrated in FIG. 13B with the shaped spread spectrum signal as shown in FIG. 13E;

FIG. 14 schematically shows an audio mixer for a fourth alternative encoder to the encoder illustrated in FIG. 2;

FIG. 15 schematically shows an audio mixer for a fifth alternative encoder to the encoder illustrated in FIG. 2;

FIG. 16 schematically shows a sixth alternative encoder to the encoder illustrated in FIG. 2;

FIG. 17 is a schematic block diagram showing in more detail a data rate determining unit which forms part of the sixth alternative encoder illustrated in FIG. 16;

FIG. 18 schematically shows a second alternative cellular phone to the cellular phone illustrated in FIG. 6;

FIG. 19 schematically shows a decoder which forms part of the second alternative cellular phone illustrated in FIG. 18;

FIG. 20 shows in more detail an acquisition unit which forms part of the decoder illustrated in FIG. 19;

FIG. 21 shows in more detail a normalisation circuit which forms part of the acquisition unit illustrated in FIG. 20;

FIG. 22 shows in more detail an averaging circuit which forms part of the normalisation circuit illustrated in FIG. 21;

FIG. 23 is a plot of the output of the normalisation circuit of the acquisition unit illustrated in FIG. 20 in the presence of a single-path signal;

FIG. 24 is a plot of the output of a cross-correlator which forms part of the acquisition unit shown in FIG. 20;

FIG. 25 shows in more detail the components of a processor used in the decoder illustrated in FIG. 19;

FIG. 26 shows in more detail a correlate and compare unit which forms part of the decoder illustrated in FIG. 19;

FIG. 27 shows in more detail a power comparator which forms part of the correlate and compare unit illustrated in FIG. 26;

FIG. 28 schematically shows a first alternative signalling system in which data is communicated between two cellular phones via acoustic signals;

FIG. 29 is a block diagram showing in more detail a cellular phone of the first alternative signalling system illustrated in FIG. 28;

FIG. 30 schematically shows a second alternative signalling system in which a cellular phone encodes a control signal, which varies in accordance with the telephone number of a caller, within a ring signal and a toy detects the ring signal and responds in accordance with the control signal;

FIG. 31 schematically shows a cellular phone which forms part of the second alternative signalling system illustrated in FIG. 30;

FIG. 32 is schematic block diagram showing the functional configuration of a processor of the cellular phone illustrated in FIG. 31 when receiving an incoming call;

FIG. 33 schematically shows a toy which forms part of the second alternative signalling system illustrated in FIG. 30;

FIG. 34 schematically shows a third alternative signalling system in which a data signal is conveyed between a computer and a toy via an acoustic signal emitted by a cellular telephone;

FIG. 35 is a schematic block diagram showing the functional configuration of a processor of a cellular phone for the third alternative signalling system illustrated in FIG. 34 when processing a received control signal;

FIG. 36 schematically shows a first alternative server for the signalling system illustrated in FIG. 1;

FIG. 37 schematically shows a fourth alternative signalling system in which a control signal is communicated to a toy via the audio track of a television signal;

FIG. 38 is a schematic block diagram of a data rate determining unit of an encoder which forms part of the fourth alternative signalling system;

FIG. 39A is a timing diagram showing a typical audio track;

FIG. 39B is a timing diagram showing a typical data signal;

FIG. 39C is a timing diagram showing a modified data signal generated by modifying the data signal illustrated in FIG. 39B in accordance with the audio track illustrated in FIG. 39A; and FIG. 40 schematically shows an alternative encoder for the fourth alternative signalling system illustrated in FIG. 36.

FIG. 1 schematically illustrates a first embodiment of the invention in which a data signal F(t), generated by a data source 1, is encoded within an audio track from an audio source 3 by an encoder 5 to form a modified audio track for a television program. In this embodiment, the data signal F(t) conveys a Uniform Resource Locator (URL) identifying a web page, accessible via the Internet, associated with the television program. The modified audio track output by the encoder 5 is then combined with the corresponding video track, from a video source 7, by a signal generator 9 to form a television signal conveying the television program. In this embodiment the data source 1, the audio source 3, the video source 7 and the encoder 5 are all located in a television studio and the television signal is broadcast by a conventional broadcast network 11 using a radio frequency (RF) signal 13.

The RF signal 13 is detected by a television aerial 15 which directs the television signal to a conventional television 17. The television 17 has a display (not shown) for showing the video track and a loudspeaker (not shown) for outputting the modified audio track as an acoustic signal 19.

In this embodiment, a cellular phone 21 (sometimes referred to as a mobile phone) detects the acoustic signal 19 emitted by the television 17 using a microphone 23 which converts the detected acoustic signal into a corresponding electrical signal. The cellular phone 21 then decodes the electrical signal to recover the data signal F(t). The cellular phone 21 also has conventional components such as a loudspeaker 25, an antenna 27 for communicating with a cellular telecommunications network, a display 29, a keypad 31 for entering numbers and letters, and menu keys 33 for accessing menu options.

In this embodiment, the cellular phone 21 is able to access the Internet using the Wireless Application Protocol (WAP). After the data signal F(t) has been recovered by the cellular phone 21, in response to a user requesting further information about the television program being shown by the television 17 by selecting a menu option using the menu buttons 33, the cellular phone 21 transmits to a base station 35, via RF signals 37, a request to download the web page corresponding to the URL conveyed by the data signal F(t). The base station 35 forwards the request, via a telecommunications network 39, to the server 41 identified in the URL conveyed by the data signal F(t). The server 41 retrieves from a database 43 the requested web page and transmits the requested web page to the cellular phone 21 via the telecommunications network 39 and the base station 35. The user is then able to read the web page on the display 29 and, for example, access further web pages referenced in the requested web page or make a transaction to buy a product associated with the television program.

As those skilled in the art will appreciate, an advantageous feature of the above-described signalling system is that conventional television broadcast networks, televisions, cellular communications networks and web pages can be used, although a novel encoder 5 and a novel cellular phone 21 are required.

FIG. 2 shows in more detail the main components of the encoder 5 of the first embodiment. The data signal F(t) is input to a forward error correction (FEC) unit 51 which separates the data signal F(t) into blocks of 7 data bits and encodes each block of seven data bits using a (15,7) block code, in particular a BCH (Bose, Chaudhuri and Hocquenghem) code, to form a block of 15 data bits. Those skilled in the art will appreciate that the extra bits added by the BCH code enable errors in transmission to be detected and corrected. In this embodiment, the FEC unit 51 also adds a synchronisation bit (hereafter referred to as the SYNC bit) having a value of "0" at the beginning of each block of 15 data bits to generate a modified data signal M(t) formed by 16-bit frames of data. In this embodiment, the modified data signal M(t) is a logic signal which is generated at approximately 7.8 bits per second.

An advantageous feature of the first embodiment is that a spread spectrum encoding technique is used to spread the energy of the modified data signal M(t) over a wide range of frequencies. This has the effect of making the data signal less noticeable in the acoustic signal 19 emitted by the television 17. In particular, if the modified data signal M(t) is directly combined with the audio track without such coding, then it is more likely to be heard by a viewer of the television 17.

In this embodiment, direct sequence spread spectrum (DSSS) encoding is used to spread the energy of the data signal over a wide band of frequencies. In order to perform the DSSS encoding, a first pseudo-noise code generator 53a is used to generate a pseudo-noise code PN0 and a second pseudo-noise code generator 53b is used to generate a pseudo-noise code PN1. As those skilled in the art of telecommunications will appreciate, pseudo-noise codes are binary codes which appear to be completely random in nature, but which are in fact deterministic, i.e. they can be reproduced. In particular, these codes are generated by exclusive-OR (XOR) feedback from synchronously clocked registers. By continually clocking the registers, the pseudo-noise code is cyclically reproduced. The number of registers, the registers used in the feedback path and the initialisation state of the registers determines the length of the code and the specific code produced.

In this embodiment, the pseudo-noise code generators 53 have 12 registers and generate pseudo-noise codes having 4095 bits (which will hereinafter be referred to as chips using the standard nomenclature in the art to distinguish the bits of the pseudo-noise code from the bits of the data signal to be spread) in a stream with no sequence of more than 12 chips repeated in the 4095 chips. Such a pseudo-noise code is conventionally referred to as a 12-bit code after the number of registers used to generate it. At the end of each stream of 4095 chips a binary 0 is added to make the total length of the stream 4096 chips. In this embodiment, the pseudo-noise codes PN0 and PN1 are orthogonal to each other and therefore if they are sequentially input chip by chip into respective inputs of an XOR gate then another pseudo-noise sequence is output by the XOR gate.

The output of the first pseudo-noise code generator 53a is connected to a non-inverting input of a first AND gate 55a while the output of the FEC unit 51 is connected to an inverting input of the first AND gate 55a. The output of the FEC unit 51 is also connected to a non-inverting input of a second AND gate 55b and the output of the second pseudo-noise code generator 53b is connected to a non-inverting input of the second AND gate 55b. The outputs of the first and second AND gates 55 are connected together to generate a spread data signal I(t) which corresponds to PN0 when the value of the modified data signal M(t) is 0 and corresponds to pseudo-noise code PN1 when the value of the modified data signal M(t) is 1.

In this embodiment, each pseudo-noise code is generated at a rate of 2000 chips per second so that each data bit is multiplied by a sequence of 256 chips and each data frame is multiplied by 4096 chips. As each data frame corresponds to a complete cycle of the pseudo-noise codes PN0 and PN1, the SYNC bit, which has a data value of "0", is always represented by the same 256 chip sequence of the pseudo-noise code PN0. This allows a decoder to synchronise itself with a received chip sequence more easily.

The logic signal I(t) is input to a modulator 57 which uses phase shift keying to modulate a 2 kHz carrier signal generated by a local oscillator (not shown) in accordance with the value of the logic signal I(t). In particular, the carrier signal is a digital signal having a sample rate of 8 kHz and a 16-bit value per sample. Each chip of the logic signal I(t) therefore modulates a sequence of four samples of the carrier signal. In this embodiment, the modulator 57 includes a re-sampling circuit (not shown) which re-samples the modulated signal at the sampling rate of the audio track, which in this embodiment is 22.05 kHz, to generate a modulated signal G(t).

Figure 3:
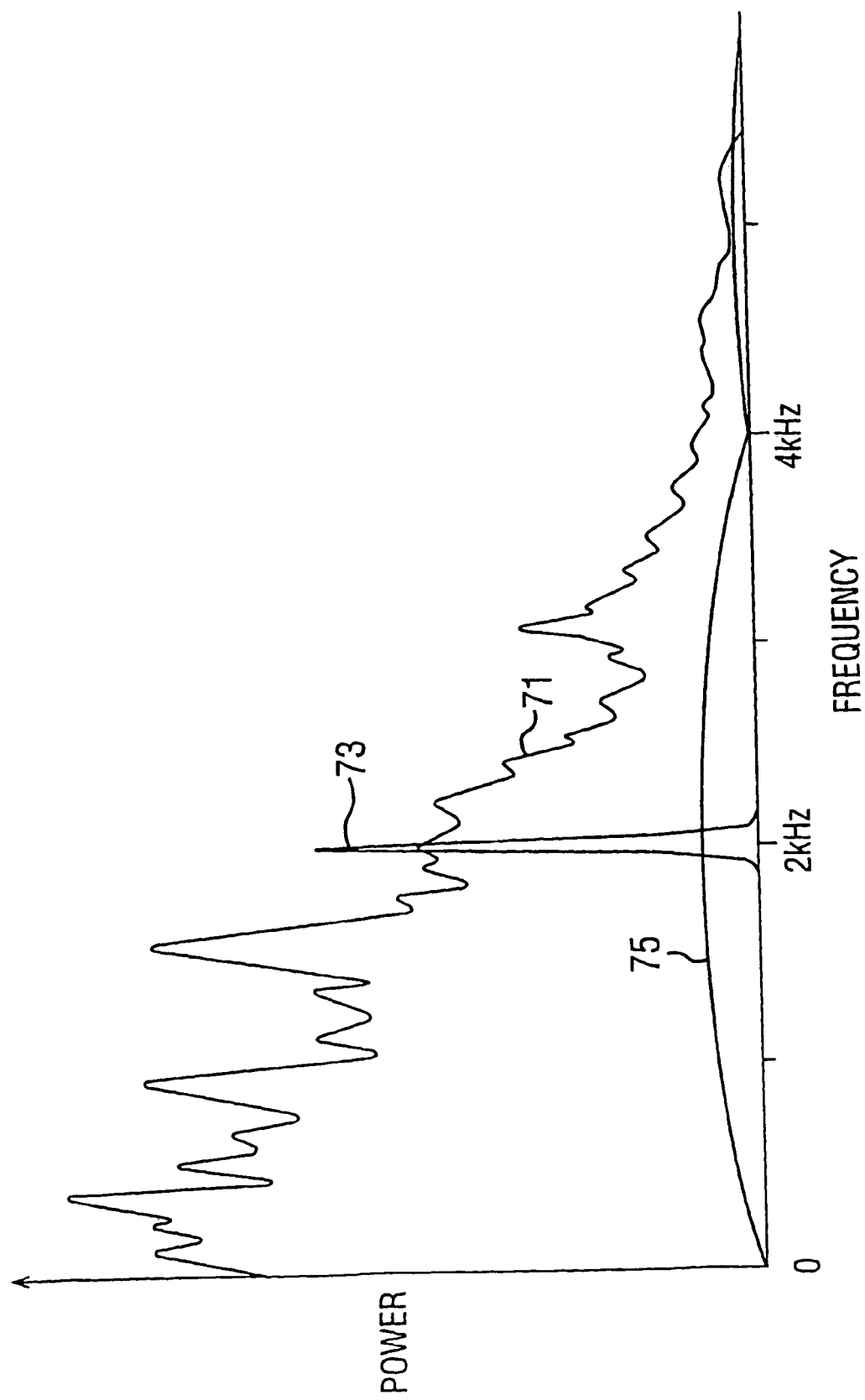

The effect of the spread spectrum encoding is illustrated in FIG. 3 which shows a typical audio signal 71 in the frequency range of 0 to 6 kHz with, as is normally the case, the power being predominantly concentrated at the lower frequencies. FIG. 3 also shows a modulated data signal 73 which would result if no spreading was carried out and the modified data signal M(t) was directly modulated by the modulator 57. As shown, this modulated data signal 73 is a narrow band signal centred at approximately 2 kHz and having a peak power significantly above the power level of the audio signal 71 at that frequency. However, if spreading is performed as well as modulating, a spread signal 75 is obtained which has a power spectrum with a main band spread between 0 and 4 kHz and harmonic bands at higher frequencies. As the power of the spread signal 75 is distributed over a wider range of frequencies than for the modulated signal 73, the peak power level is significantly reduced. For many applications the spread signal 75 is not noticeable to a listener or is heard only as a background white noise. Further, the majority of the energy of the main band is in a frequency range for which most conventional television loudspeakers work satisfactorily. There is, therefore, no requirement for a user to obtain a new television set to take advantage of the invention.

Returning to FIG. 2, the modulated signal G(t) and the audio track are input to an audio mixer 59 where they are combined to form the modified audio track. In particular, in the audio mixer 59 the modulated signal G(t) and the audio track are input to a shaping unit 61 which analyses the power spectrum of the audio track and modifies the power spectrum of the modulated signal G(t) in dependence upon the power spectrum of the audio track in order to generate a shaped signal S(t) which is less obtrusive when combined with the audio track. FIG. 4 shows in more detail the main components of the shaping unit 61. The audio track, which in this embodiment is generated at 22,050 samples per second with each sample having a 16-bit value, is input to a first Fast Fourier Transform (FFT) unit 81 which splits the audio track into blocks each having 2048 samples applying conventional overlapping and windowing techniques. The FFT unit 81 measures for each block the energy in 2048 frequency sub-bands to generate 2048 coefficients which are output to a scaling unit 83.

Figure 5:
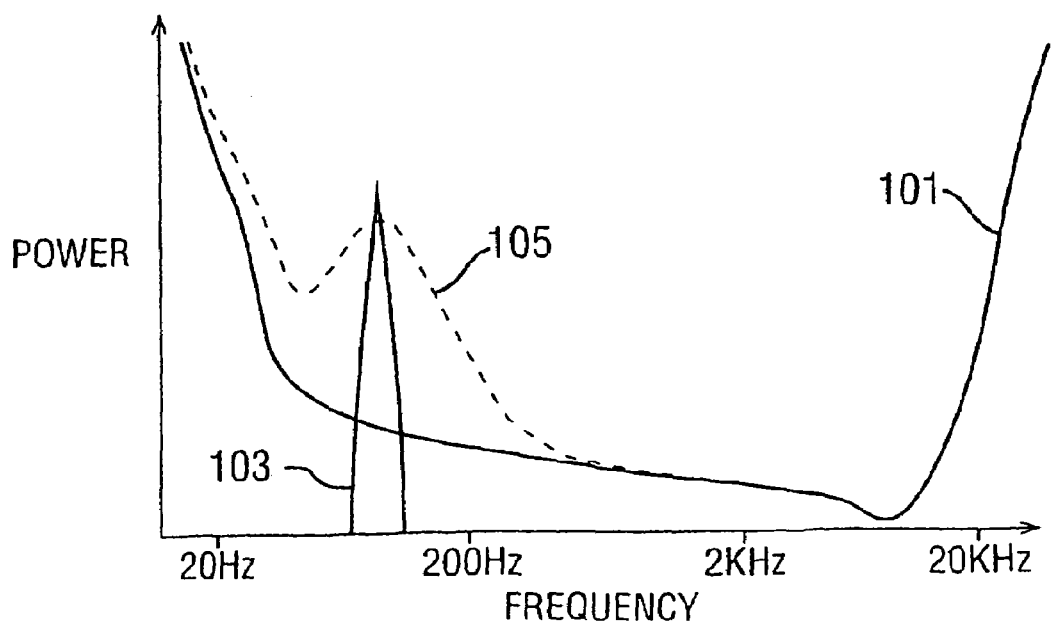

The scaling unit 83 applies a psycho-acoustic algorithm to generate scaling factors for the 2048 frequency sub-bands. In particular, the scaling unit includes a psycho-acoustic filter which outputs, for each frequency sub-band of each block of samples, a scaling factor based on the energy in that and neighbouring frequency sub-bands for that block of samples and for preceding and succeeding neighbouring blocks of samples. Using a psycho-acoustic algorithm allows higher signal levels to be used than if a simple scaling algorithm was applied because it takes into account the dynamic variation of sensitivity of the human ear in the presence of sounds. This will be explained further with reference to FIG. 5 which shows the sensitivity of a typical human ear for different frequencies (in other words, the minimum sound levels for different frequencies which can be heard by a typical human ear) without any background noise (the plot referenced as 101) and in the presence of a narrow band signal 103 (the dashed plot referenced as 105). As can be seen from FIG. 5, the ability of the human ear to distinguish sound in the frequency range of the narrow band signal 103 and in a range of frequencies both above and below the frequency range of the narrow band signal 103 is significantly reduced. There are therefore audio signals which cannot be heard by the human ear in the presence of the narrow band signal 103, even though they would be heard if the narrow band signal 103 is not present. In this embodiment, the psycho-acoustic algorithm uses channel descriptors, which are stored in a memory 85, to approximate how the audio track will be modified by the broadcast network 11 and television 17 when determining the scaling factors for each of the 2048 frequency sub-bands.

Psycho-acoustic algorithms have been previously investigated for data compression, since sounds which would not be discerned by a listener can be removed from an audio data stream. Further details of psycho-acoustic encoding can be found in the paper "Transform Coding of Audio Signals Using Perceptual Noise Criteria" by James D. Johnston, IEEE Journal on Selected Areas in Communications, Vol. 6, No. 2, February 1988, whose contents are hereby incorporated by reference.

The modulated signal G(t) is input to a second FFT unit 87 which, in the same manner as the FFT unit 81, splits the modulated signal G(t) into blocks of 2048 samples and generates 2048 coefficients corresponding to the energy in 2048 frequency sub-bands for each block. In this embodiment, the 2048 frequency sub-bands for the second FFT unit 87 match the 2048 frequency sub-bands of the first FFT unit 81. The 2048 coefficients output by the second FFT unit 87 and the 2048 scaling factors output by the scaling unit 83 are input to a multiplier 89 where the coefficient for each frequency sub-band of the modulated signal G(t) is multiplied by the corresponding scaling factor for that frequency sub-band determined from the audio track. The scaled coefficients output by the multiplier 89 are then input to an Inverse Fast Fourier Transform (IFFT) unit 91 which generates the shaped signal S(t) from the scaled coefficients, taking into account the windowing and overlapping.

Returning to FIG. 2, the audio track is also input to a time delay unit 63 which delays the audio track for a period of time corresponding to the time required for the shaping unit 61 to generate the shaped signal S(t) using the audio track. The audio track output from the time delay unit 63 and the shaped signal S(t) are input to an adder 65 which performs a simple linear adding operation to combine them to form the modified audio track. The purpose of the time delay unit 63 is to ensure that each portion of the audio track is combined in the adder 65 with the portion of the shaped signal S(t) which has been shaped in accordance with the power spectrum of that portion of the audio track.

As described above, the modified audio track is combined with a video track to form a television signal which is then broadcast over a conventional television network 11. An aerial 15 detects the broadcast television signal 13 and directs a corresponding electrical signal to a television 17 which outputs an acoustic signal 19 corresponding to the modified audio track using a loudspeaker (not shown). The output acoustic signal 19 is then detected by the microphone 23 of the cellular phone 21.

FIG. 6 shows in more detail the main components of the cellular phone 21 of the first embodiment. As shown, the microphone 23 of the cellular phone 21 converts the detected acoustic signal 19 into a corresponding electrical signal H(t) which is input to an anti-aliasing filter 111. The filtered signal output by the anti-aliasing filter 111 is input to an analog-to-digital converter (ADC) 113 which converts the filtered signal into a corresponding digital signal D(t) using a sampling rate of 8 kHz. The output of the ADC 113 is connected to an AUDIO_IN input of a processor 115.

Digital signals output via an AUDIO_OUT output of the processor 115 are input to a digital-to-analog converter (DAC) 117 which converts the digital signals into corresponding analog signals which are then amplified by an amplifier 119 before being output as acoustic waves by the loudspeaker 25. A DISP_OUT output of the processor 115 is connected to the display 29 while a KEY_IN input to the processor 115 is connected to the keyboard 31. An RF_OUT output of the processor 115 is connected to a radio frequency (RF) processor unit 121 which processes baseband digital signals output by the processor 115 to form RF signals for broadcast via the antenna 27. The RF processor unit 121 also processes incoming RF signals received via the antenna 27 to form baseband signals which are input to an RF_IN input of the processor 115.

A random access memory (RAM) 123, a non-volatile random access memory (NVRAM) 125 and a read only memory (ROM) 127 are also connected to the processor 115. The NVRAM 125 stores data associated with the user of the cellular phone 21, for example a phone book listing the names and associated phone numbers of commonly called people, and the RAM 123 provides working space for use during the operation of the processor 115. The ROM 127 stores routines which control the operation of the processor 115.

In particular, the ROM 127 stores routines which enable the processor to operate in three different modes. In a call mode, which is activated when the cellular phone 21 is used during a telephone call, acoustic signals received by the microphone 23 are converted by the processor 115 into baseband signals which are output to the RF processor unit 121 and incoming baseband signals from the RF processor unit 121 are converted into audio signals which are output by the loudspeaker 25. In a standby mode, which is the default mode when no telephone call is being made, the processor 115 waits for either an RF signal initiating a call to be detected by the antenna 27 or for one of the keys of the keyboard 31 to be pressed. In the standby mode the processor 115 does not process acoustic signals detected by the microphone 23. The call mode and standby modes are conventional modes of operation for a cellular phone. In the third mode, hereafter called the monitor mode, the processor 115 processes acoustic signals 19 received by the microphone 23 to recover any data signal embedded within the acoustic signal 19 in addition to performing the operations of the standby mode.

Figure 7B:
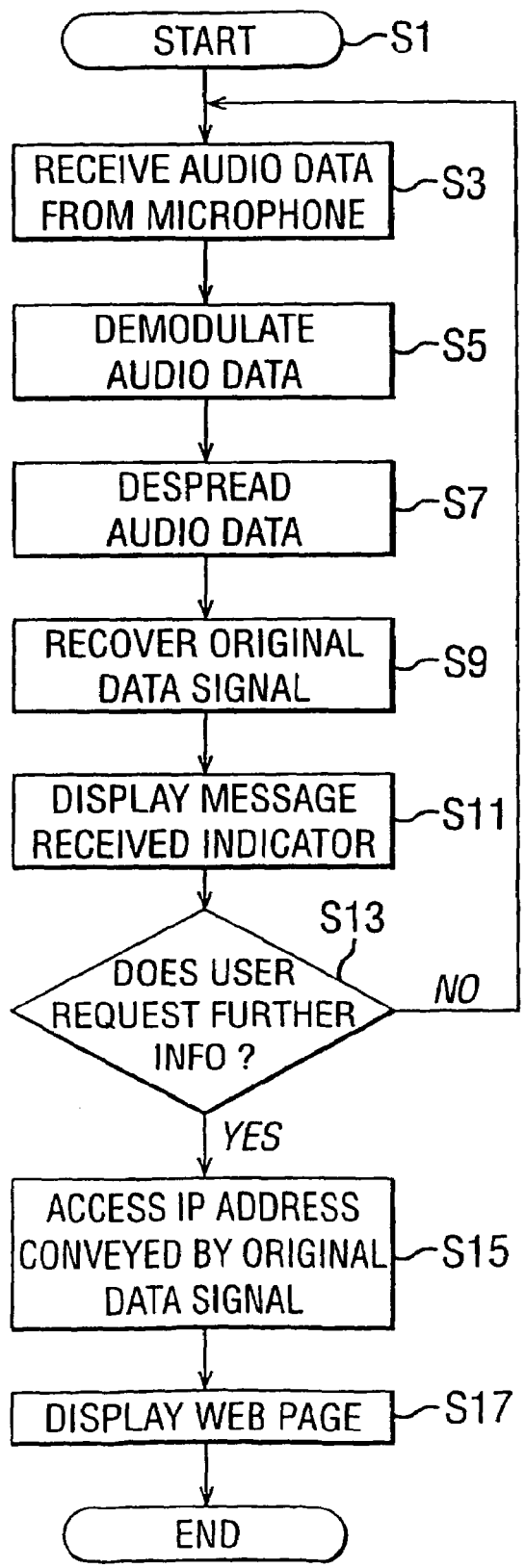
FIG. 7B is a flow chart illustrating the steps performed by the cellular phone shown in FIG. 6 to receive and process a data signal.

The operation of the processor 115 in the monitor mode will now be described in more detail with reference to FIGS. 7A and 7B. FIG. 7A is a schematic block diagram showing the functional configuration of the processor 115 during the monitor mode and FIG. 7B shows a flow chart illustrating the main steps performed by the processor 115 in the monitor mode. The monitor mode is initiated, in step S1, by the user selecting a menu option using the menu keys 33. Once the monitor mode has been initiated, the processor 115 receives, in step S3, the digital signal D(t) conveying audio data from the microphone 23 via the AUDIO_IN input of the processor 115.

The digital signal D(t) is then processed by a demodulator 130 which demodulates, in step S5, the digital signal D(t) using conventional digital signal processing techniques. The demodulated digital signal is then processed by a despreading module 131 which despreads, in step S7, the audio data. This despreading involves monitoring for the chip sequence corresponding to the SYNC bit which, when detected, is processed to determine the timing of the received chip sequence and the slight frequency offset between the chip rate of the received chip sequence and the chip rate of the pseudo-noise codes generated within the cellular phone 21. In general, there will be a slight frequency offset which arises from three main causes. The first cause is that many transmission media slightly vary the transmission rate of the audio track, thereby varying the chip rate of the chip sequence conveyed by the audio track. The second cause is that Doppler effects can occur, for example due to movement of the cellular phone 21, which affects the chip rate in the detected signal. Finally, the third main cause is that there is always a slight difference between the clock frequencies used to generate the pseudo-noise codes in the encoder 5 and the cellular phone 21. The despreading module 131 is then able to determine from the received chip sequence transitions between the pseudo-noise codes PN0 and PN1, thereby recovering the modified data signal.

The recovered modified data signal is then processed by a data signal regenerator 132 which recovers, in step S9, the original data signal F(t) by removing the synchronisation bit and decoding the remaining (15,7) BCH code, thereby recovering the URL associated with the television programme. After the URL has been recovered, the data signal regenerator 132 outputs, in step S11, a signal to a signal generator 133 which sends a control signal to a display driver 134 which in turn outputs a drive signal to the display 29 causing the display 29 to show a message received indicator. The message received indicator enables the user of the cellular phone 21 to see that further information about the television program is available from the internet. The data signal regenerator 132 also stores the URL in the RAM 123.

The processor 115 then waits, in step S13, for the user to request further information. If the user does not request further information within a preset time, the routine returns to step S3. If, however, the user selects the menu option for requesting further information then this selection is input to the keyboard interface 135 which sends a signal to a browser 136 causing the browser 136 to access, in step S15, the web page corresponding to the URL conveyed by the original data signal F(t). In particular, the browser retrieves the URL from the RAM 123 and outputs a baseband signal, via the RF_OUT output, which is converted to an RF signal by the RF processor unit 121 and is broadcast by the antenna 27.

Subsequently, a RF signal conveying web page data for the IP address is detected by the antenna 27 and converted to a baseband signal by the RF processor unit 121, and the baseband signal is input to the RF_IN input of the processor 115. In the processor 115, the web page data is processed by the browser 136 which sends the web page data to the display driver 134 which in turn outputs, in step S17, a drive signal causing the display 29 to display the received web page.

Those skilled in the art will appreciate that processors typically used in digital cellular phones are well suited to be programmed to perform the digital signal processing required in the monitor mode.

As described above, in the first embodiment a cellular phone 21 retrieves from the acoustic signal 19 corresponding to the audio track of a television program an IP address for a web page associated with that program so that the user of the cellular phone can download additional information about the television program. By using spread spectrum encoding techniques to generate a spread signal and by shaping the spread signal in dependence upon the power spectrum of the audio track, the data embedded within the audio track can be hidden from a listener. An advantage of encoding the data signal within the acoustic signal is that the bandwidth required to electronically transmit the audio track after the data signal has been encoded therein is no more than that required to transmit the audio track by itself.

In the first embodiment, the shaping unit 61 analyses the frequency spectrum of the modulated signal G(t) to generate a set of frequency-dependent coefficients which are then scaled by scaling factors determined by analysing, using a Fast Fourier Transform, the frequency spectrum of a segment of the audio track. In this way, the shaping unit 61 is able to identify peaks of the audio track in the frequency domain and scale the frequency spectrum of the spread signal G(t) accordingly.

A second embodiment will now be described, with reference to FIGS. 8 and 9, in which the shaping unit of the first embodiment is replaced by an alternative shaping unit which performs a wavelet transform instead of a Fast Fourier Transform. The remaining components of the signalling system of the second embodiment are the same as those for the first embodiment and will not therefore be described again.

FIG. 8 shows the main components of the shaping unit 141 of the second embodiment. As shown, the audio track is input to a first wavelet transform (WT) unit 143 which splits the audio track into blocks having 2048 samples. For each block, the first WT unit 143 decomposes the sequence of samples into a linear superposition of 2048 weighted basis functions, with the basis functions forming a wavelet family. As those skilled in the art will appreciate, the basis functions of a wavelet family differ in both the frequency and the time domain. The weighting coefficients therefore convey both time domain and frequency domain information. The first WT unit 143 then outputs the 2048 weighting coefficients for the basis functions to a scaling unit 145 which applies a psycho-acoustic algorithm, using channel descriptors from a channel descriptor memory 147, to generate for each wavelet basis function a corresponding scaling factor.

The modulated signal G(t) is input to a second WT unit 149 which splits the modulated signal G(t) into blocks of 2048 samples and decomposes each block, using the same wavelet basis functions as the first WT unit 143, to generate 2048 weighting coefficients. The second WT unit 149 outputs the 2048 weighting coefficients to a multiplier 151 where each weighting coefficient is multiplied by the scaling factor determined by the scaling unit 145 for the corresponding wavelet function using the audio track. The 2048 scaled coefficients output by the multiplier 151 are input to an inverse wavelet transform (IWT) unit 153 which synthesises a scaled signal S(t) by superposing the family of wavelet basis functions weighted by the respective scaled coefficients output by the multiplier 151.

Those skilled in the art will appreciate that by carefully selecting the family of wavelet basis functions, bearing in mind the expected profile of the audio track, the number of weighting coefficients required in order to synthesise the shaped signal S(t) satisfactorily is no more than the number required using a FFT. For some families of wavelet basis functions, it is even possible to use fewer coefficients than are required for a FFT.

The time localisation of the wavelet functions is advantageous for shaping the modulated signal G(t) because the profile of a block of the modulated signal G(t) can be shaped in the time domain as well as in the frequency domain. This will be explained further with reference to FIG. 9 which shows a block of samples of the audio track (the plot referenced 157), a FFT-shaped signal 159 generated by analysing the block of the audio track using a FFT, and a WT-shaped signal 161 generated by analysing the segment of the audio track using a wavelet transform. As shown in FIG. 9, the power spectrum of the audio track is close to zero for the second half of the block of samples. When using FFT analysis, this zero amplitude can only be achieved by destructive interference between the basis functions (i.e. sine and cosine waves), which will depend upon the exact phase of each basis function. However, when using a Fast Fourier Transform the coefficients generated for the modulated signal G(t) have magnitudes which are determined only by the frequency spectrum of the block of the audio track and contain no phase information. The destructive interference required to obtain near-zero power will not therefore generally occur and the FFT-shaped signal 159 does not follow the temporal profile of the audio track. On the other hand, as the wavelet basis functions are localised in time, when using a wavelet transform it is not necessary to rely upon destructive interference to produce zero amplitude and therefore the WT-shaped signal 161 more closely matches the temporal profile of the audio track.

The time localisation obtainable using wavelet analysis also has the advantage that psycho-acoustic analysis can be performed in the time domain within a single block of samples. In particular, a similar psycho-acoustic effect to that described above for the frequency domain, in which frequency components which would otherwise be audible can be masked by neighbouring frequency components, also exists in the time domain in that after a loud sound stops, the human ear does not immediately recover the sensitivity indicated by the plot 101 in FIG. 5. Therefore, it is possible to increase the amplitude of the modulated signal G(t) immediately after a peak in the sound of the audio track without it becoming overly noticeable to a listener.

In the first and second embodiments a 2 kHz carrier signal is modulated using phase shift keying in accordance with the logic signal I(t) to produce a spread signal G(t) having a power spectrum with a main band spread between 0 and 4 kHz. However, the energy spectrum of the audio track could be concentrated in a frequency range away from 2 kHz, in which case the power level of the shaped signal (and hence the signal to noise ratio) needs to be low if the data signal is not to be noticed by a listener. A third embodiment will now be described with reference to FIGS. 10 and 11 in which the encoder of the first embodiment is replaced by an alternative encoder in which the frequency of the carrier wave is varied in accordance with the frequency spectrum of the audio track, and the software stored in the ROM of the cellular phone is modified to account for this variation in frequency during decoding. The remaining components of the signalling system of the third embodiment are the same as those of the first embodiment and will not therefore be described again.

FIG. 10 shows the main components of the encoder 163 of the third embodiment. In FIG. 10, components which are the same as corresponding components of the encoder of the first embodiment have been referenced with the same numerals and will not be described again. As shown, the audio track is input to a spectrum analyser 164 which monitors the frequency spectrum of the audio track. In particular, the spectrum analyser 164 monitors the energy in 2048 frequency sub-bands, each corresponding to 10 Hz, and determines the set of 200 adjacent frequency sub-bands which has the greatest energy. The spectrum analyser 164 then outputs a control signal to a modulator 165 to adjust the frequency of the local oscillator so that the carrier signal is in the centre of the frequency range corresponding to the identified set of frequency sub-bands. The modulated signal G(t) output by the modulator 165 is then shaped and combined with the audio track to form the modified audio track in the same manner as described above in the first embodiment.

In this embodiment, the cellular phone is substantially as described in the first embodiment except that when the processor is configured for the monitor mode, the demodulator 130 shown in FIG. 7A is in effect replaced by the demodulator module 166 shown in FIG. 11. As shown, the digital signal D(t) received at the AUDIO-IN input is processed by a spectrum analyser 167 which determines, in the same manner as the spectrum analyser 164, the frequency spectrum of the digital signal D(t) and outputs a signal identifying the centre frequency. The digital signal D(t) is also delayed by a time delay module 168 and then processed by a demodulator 169 whose carrier frequency is controlled by the signal output by the spectrum analyser 167 to match the centre frequency. The purpose of the time delay unit 168 is to ensure that each part of the digital signal D(t) is demodulated using the carrier frequency calculated for that part. The demodulated signal output by the demodulator 169 is processed by the despreading module 131 and the process continues as described with reference to FIGS. 7A and 7B.

In this embodiment, the carrier frequency is varied so that the main band of the modulated signal G(t) is moved to a frequency range in which the energy of the audio track is relatively large. This has the effect that the scaling factors determined by the shaping unit 61 are generally larger than if the carrier frequency was kept constant. In this way, the power of the shaped signal S(t) is increased.

In the first to third embodiments, the modulated signal G(t) is combined with the audio track after having been scaled in order to reduce its noticeability in the modified audio track. A fourth embodiment will now be described with reference to FIGS. 12 and 13 in which the encoder of the first embodiment is replaced by an alternative encoder which removes part of the audio track, shapes the modulated signal G(t) to approximate the removed part of the audio track, and then adds the shaped signal to the remaining part of the audio track. The remaining components of the signalling system of the fourth embodiment are the same as those for the first embodiment and will not therefore be described again.

FIG. 12 shows the main components of the audio mixer 171 of the fourth embodiment. As shown, the audio track is input to a linear predictive coding (LPC) unit 173 which uses conventional linear predictive coding techniques to analyse the audio track. Linear predictive coding takes advantage of the fact that for many sounds the power at any instant is strongly dependent on the power in preceding instants in order to generate a small number of linear prediction (LP) coefficients, sometimes called predictors, from which the sound can be reproduced. In particular, a block of samples is analysed to determine the LP coefficients $a_1, a_2 \ldots a_n$ which, when used in the equation:

$$s(k)=a_1s(k-1)+a_2s(k-2)+\ldots+a_ns(k-n)+\xi(k) \quad (1)$$

where s(k) is the value of the k-th sample, give the smallest set of error values $\xi(k)$ for the block.

In this embodiment, the LPC unit 173 splits the audio track into blocks of 2048 samples and determines, using a maximum likelihood algorithm, a set of 10 LP coefficients for each block. These 10 LP coefficients model (through equation (1) above) the tonal components of the audio track to be regenerated. The determined LP coefficients are output by the LPC unit 173 and input to a conventional synthesis unit 175 which for each sample synthesises, using the LP coefficients and equation (1) above, a predicted sample value corresponding to $s(k)-\xi(k)$. The sequence of predicted values output by the synthesis unit 175 form a tonal part P(t) of the audio track.

The audio track is also input to a time delay unit 177 which introduces a time delay corresponding to the processing time required to analyse the audio track in the LPC unit 173 and to synthesize the tonal part P(t) in the synthesis unit 175. The output of the time delay unit 177 and the output of the synthesis unit 175 are input to a subtractor 179 in which the tonal part P(t) is subtracted sample by sample from the actual audio track so that the subtractor 179 outputs a noise part N(t) which corresponds to the error values $\xi(k)$, in other words the random part of the audio track (sometimes referred to as the residue, the residual part or the atonal part).

The noise part N(t) is input to a first FFT unit 181 which splits the noise part N(t) into blocks each having 2048 samples, using conventional windowing and overlapping techniques, and outputs for each block 2048 frequency-dependent coefficients corresponding to the energy in 2048 frequency sub-bands. Similarly, the modulated signal G(t) is input to a second FFT unit 183 which, in the same manner as the first FFT unit 181, splits the modulated signal G(t) into blocks of 2048 samples and generates 2048 coefficients corresponding to the energy in 2048 frequency sub-bands for each block. The 2048 coefficients output by the second FFT unit 183 are input to a multiplier 185. The 2048 coefficients output by the first FFT unit 181 are input to a scaling unit 187 which calculates and outputs 2048 scaling factors which are input to the multiplier 185 where the co-efficient for each frequency sub-band of the modulated signal G(t) is multiplied by the corresponding scaling factor for that frequency sub-band determined from the noise part N(t). The scaling unit 187 applies a scaling algorithm to calculate the scaling factors so that when the scaled coefficients output by the multiplier 189 are input to an IFFT unit 189, which generates a shaped signal S(t) using the scaled coefficients, the shaped signal S(t) approximates the noise part N(t).

The tonal part P(t) output by the synthesis unit 175 is also input to a time delay unit 191 which delays the tonal part P(t) by a time corresponding to the time required to generate and process the noise part N(t) and to scale the modulated signal G(t) using the noise part N(t) to generate the shaped signal S(t). The output of the time delay unit 191 and the shaped signal S(t) are then input to an adder 193 which performs a linear adding operation to generate the modified audio track. In this way, the noise part N(t) of the audio track is replaced by a version of the modulated signal G(t) which has been shaped to approximate the noise part N(t) of the audio track in order to form the modified audio track.

FIGS. 13A to 13F are plots which illustrate the signals at different points in the audio mixer 171. FIG. 13A shows the audio track which is input to the audio mixer 171. FIG. 13B shows the tonal part P(t) which is output by the synthesis unit 175 and FIG. 13C shows the noise part N(t) which is obtained by subtracting the tonal part P(t) from the audio track. FIG. 13D shows the modulated signal G(t) input to the audio mixer 171 and FIG. 13E shows the shaped signal S(t) output by the IFFT unit 191. FIG. 13F shows the modified audio track formed by adding the tonal part P(t) shown in FIG. 13B and the shaped signal S(t) shown in FIG. 13E. A comparison of FIGS. 13A and 13F shows that the profile of the modified audio track is approximately the same as the profile of the original audio track.

In the fourth embodiment, the noise part of the audio track, which is particularly associated with hiss-like sounds, is removed from the audio track and replaced by the shaped signal S(t). A fifth embodiment of the invention will now be described with reference to FIG. 14 in which the encoder of the first embodiment is replaced by an encoder which modifies the relative amplitudes of the audio track and the shaped signal in dependence upon the level of tonality of the audio track. The remaining components of the fifth embodiment are identical to those of the first embodiment and will not therefore be described again.

FIG. 14 shows the main components of the audio mixer 195 of the fifth embodiment. As shown, the audio track is input to a first FFT unit 197 which splits the audio track into blocks of 2048 samples using conventional overlapping and windowing techniques and, for each block, determines the energy in 2048 frequency sub-bands to generate 2048 coefficients which are output to a scaling unit 199 and a spectrum analyser 201. The scaling unit 199 applies the same scaling algorithm as that used in the fourth embodiment to generate 2048 scaling factors which are output to a multiplier 203.

The modulated signal G(t) is input to a second FFT unit 205 which, in the same manner as the first FFT unit 197, splits the modulated signal G(t) into blocks of 2048 samples and for each block generates 2048 coefficients corresponding to the energy in 2048 frequency sub-bands which match the frequency sub-bands for the first FFT unit. The 2048 coefficients output by the second FFT unit 205 are input to the multiplier 203 where each coefficient is multiplied by the scaling factor, output by the scaling unit 199, for its respective frequency sub-band. The 2048 scaled coefficients output by the multiplier 203 are input to an IFFT unit 207 which generates the shaped signal S(t) from the scaled coefficients.

The spectrum analyser 201 determines the level of tonality of each block of the audio track from the 2048 coefficients output by the first FFT unit 197. In particular, this is achieved by statistically analysing the 2048 coefficients to determine if a tonal signal is present, which will be indicated by peaks in a small number of frequency sub-bands, or if no tonal signal is present in which case the frequency coefficients for the sub-bands will vary more randomly. The spectrum analyser 201 then outputs a signal indicative of the level of tonality which, in this embodiment, is a four bit binary number which varies from 0000 for when the audio track is almost purely noise-like to 1111 when the audio track is almost purely tonal.

The audio track is also input to a time delay unit 209 which delays the audio track for a time corresponding to the time required to analyse a portion of the audio track and generate the shaped signal S(t) for that portion. The output of the time delay unit 209, the shaped signal S(t), and the four bit binary number output by the spectrum analyser 201 are input to respective input ports of a variable combiner 211. In the variable combiner 211, the delayed audio track is input to a variable amplifier 213a where it is multiplied by a gain factor G determined from the four bit number output by the spectrum analyser 201 and the shaped signal S(t) is input to a second variable amplifier 213b where it is multiplied by a gain factor of (1-G). The outputs of the first and second variable amplifiers 213 are then added together by an adder 215 to generate the modified audio track.

In the fifth embodiment, the audio track and the shaped signal S(t) are weighted in accordance with the level of tonality of the audio track and then added together to form the modified audio track. In particular, the more noise-like the audio track the greater the proportion of the modified audio track which is formed by the shaped signal S(t). Further, in the fourth embodiment the noise-like part of the audio track is removed and replaced by the shaped signal S(t). However, a problem with the fourth and fifth embodiments is that if the audio track is very tonal then the noise-like part is small and the shaped signal S(t) cannot be added at sufficiently high signal levels for it to be reliably decoded in the decoder. Therefore, if the audio track is very tonal, the psycho-acoustic shaping technique described in the first embodiment is preferred.

A sixth embodiment will now be described with reference to FIG. 15 in which the encoder of the first embodiment is replaced by an alternative encoder which combines the psycho-acoustic shaping technique described in the first embodiment, the linear predictive coding technique described in the fourth embodiment and the weighting technique described in the fifth embodiment. In the encoder of the sixth embodiment, a user is able to set parameters which determine the nature of the encoding. This is advantageous because the masking ability of the audio track is subjective and therefore better masking is generally obtained if the user can set the encoding parameters than if the encoding parameters were automatically set. The remaining components of the sixth embodiment are identical to those of the first embodiment and will not therefore be described again.

FIG. 15 shows the main components of the audio mixer 217 of the sixth embodiment. Components which are the same as corresponding components in the audio mixer of the fourth embodiment have been referenced with the same numerals and will not be described again. As shown, the audio track is input to the LPC unit 173 which determines and outputs LP coefficients corresponding to the tonal part P(t) for sequential blocks of 2048 samples. In this embodiment, a user interface 218 is provided via which a user can set the number of LP coefficients used in the LPC unit 173. In response to the user setting the number of LP coefficients, the user interface 218 outputs a control signal to the LPC unit 173 which causes the LPC unit 173 to use the selected number of LP coefficients.

As in the fourth embodiment, the noise part N(t) is obtained by inputting the LP coefficients output by the LPC unit 173 to a synthesis unit 175 in order to generate the tonal part P(t), and then subtracting the tonal part P(t) from the audio track using the subtracter 179. In this embodiment, the noise part N(t) is input, via a time delay unit 219, to a first input port of a variable combiner 220 as well as to the first FFT unit 181.

The coefficients output by the first FFT unit 181 are input to a scaling unit 221 which applies a psycho-acoustic algorithm, using channel descriptors from a channel descriptors memory 222, to generate 2048 scaling factors which are input to the multiplier 185 to multiply respective ones of the 2048 coefficients output by the second FFT unit 183 to generate the scaled coefficients for forming the shaped signal S(t). In this embodiment, the user is able to set the level of the psycho-acoustic encoding via the user interface 218. In particular, the scaling unit applies a psycho-acoustic filter and, in response to the user setting the level of the psycho-acoustic encoding, the user interface outputs a control signal which determines the bandwidth of the psycho-acoustic filter (i.e. the number of neighbouring frequency sub-bands and blocks of data samples whose energy is taken into account when determining the scaling factors). If the highest level of psycho-acoustic encoding is desired, then the bandwidth is set so that the scaling unit 221 effectively acts in the same manner as the scaling unit of the first embodiment. If, however, the lowest level of psycho-acoustic encoding is desired, then the bandwidth is set so that the scaling unit 221 effectively acts in the same manner as the scaling unit of the fourth embodiment.

The shaped signal S(t) output by the IFFT unit 189 is input to a second input port of the variable combiner 220. In this embodiment, a user is able to select using the user interface 218 the gain factor G used in the variable combiner 220, in response to which the user interface 218 outputs a signal to a third input port of the variable combiner 220. In the variable combiner 220, the delayed noise part N(t) is input to a variable amplifier 223a where it is multiplied by the gain factor G and the shaped signal S(t) is input to a second variable amplifier 223b where it is multiplied by a gain factor (1-G). The output of the first and second variable amplifiers 223 are then added together by an adder 224 to form a modified noise part N'(t). The purpose of the time delay unit 219 is to ensure that each portion of the noise part N(t) is combined in the variable combiner 220 with the portion of the shaped signal S(t) which was shaped using that portion of the noise part N(t).

The tonal part P(t) output by the synthesis unit 175 is input, via a time delay unit 225, to the adder 195 along with the output of the variable combiner 220. The adder 195 performs a simple linear addition to generate the modified audio track. The purpose of the time delay unit 225 is to ensure that the tonal part P(t) in synchronised with the modified noise part N'(t).

In this embodiment, the audio mixer 217 allows a user to adjust the encoding in accordance with the tonality of the audio track to improve the masking of the data by the audio track. For example, if there is only a small atonal portion to the audio track, the user can reduce the number of LP coefficients used by the LPC unit 173 in order to increase the energy in the noise part N(t) because less of the audio track is modelled by the LPC unit 173. Reducing the number of LP coefficients also has the effect of increasing the tonal features within the noise part N(t). In the extreme case, the number of LP coefficients can be set to 0 so that the noise part N(t) is the same as the audio track. As the tonal features within the noise part N(t) increase, the user can set the scaling unit 221 to apply a wider bandwidth psycho-acoustic filter to take advantage of the masking ability of these tonal features. The user can subsequently set the gain factor G of the variable combiner to 0.9 so that 90% of the modified noise part N'(t) is formed by the noise part N(t) and 10% of the modified noise part N'(t) is formed by the shaped signal S(t). If, however, the audio track is predominantly atonal, then the user can increase the number of coefficients used by the LPC unit 173, decrease the bandwidth of the psycho-acoustic filter applied by the scaling unit 221 and set the value of the gain factor G of the variable combiner 220 to zero so that the modified noise part N'(t) is identical to the shaped signal S(t).

In this embodiment the user can adjust the number of coefficients of the LPC unit 173, the bandwidth of the psycho-acoustic filter and the gain factor G freely. This allows the user to determine, for a required signal to noise ratio, the set-up for which the modified audio track is, in the opinion of the user, most similar to the original audio track.

In the first to sixth embodiments, the rate at which the data signal F(t) is conveyed by the modified audio track is constant. However, the ability of the audio track to hide the data signal F(t) is better during loud portions of the audio track than during quiet portions of the audio track. A seventh embodiment of the invention will now be described with reference to FIGS. 16 to 27 in which the encoder and the cellular phone of the first embodiment are replaced by an alternative encoder, which varies the rate at which data is encoded within the modified audio track depending upon the power spectrum of the audio track, and an alternative cellular phone. The remaining components of the seventh embodiment are the same as the corresponding components in the first embodiment and will therefore not be described again.

FIG. 16 shows the main components of the encoder 231 of the seventh embodiment. As shown, the data signal F(t) is input to an FEC unit 233 which separates the data signal F(t) into segments of 7 data bits and applies a (15,7) BCH code to generate a modified data signal M'(t). In this embodiment, unlike the first embodiment, the FEC unit 233 does not add a synchronisation bit.

The modified data signal M'(t) and the audio track are input to a data rate determining unit 235 which monitors the audio track and outputs either one, two or three data streams in dependence upon the power spectrum of the audio track. The data rate determining unit 235 will now be described in more detail with reference to FIG. 17.

As shown in FIG. 17, in the data rate determining unit 235 the modified data signal M'(t) is input to a first-in first-out (FIFO) memory 261 which acts as a cache memory. The audio track is input to a spectrum analyser 263 which determines the power in the 0 to 5 kHz portion of the audio track and outputs a signal indicative of the determined power to an output signal generator 265 which has three data output ports and three enable signal output ports. The output signal generator 265 determines from the signal from the spectrum analyser 263 if the power in the 0 to 5 kHz portion of the audio track is above a first predetermined level, between the first predetermined level and a second predetermined level which is greater than the first predetermined level, or above the second predetermined level.

If the output signal generator 265 determines that the power level is below the first predetermined level, then the output signal generator 265 outputs a single data stream. In particular, the output signal generator 265 outputs from a first data output port a data stream DAT1 by sequentially retrieving data bit by bit from the FIFO memory 261, apart from every sixteenth bit of the data stream DAT1 which is set to a data value of 0 to act as a SYNC bit. The output signal generator 265 also sets the output EN1 of a first enable output port to a value of 1, and sets the output EN2 of a second enable output port and the output EN3 of a third enable output port to a value of 0.

If the output signal generator 265 determines that the power level is between the first and second predetermined levels, then the output signal generator 265 outputs two parallel data streams DAT1, DAT2. In particular, the output signal generator 265 retrieves data from the FIFO memory 261 two bits at a time and outputs one of the retrieved bits through the first data output port to form data stream DAT1 and the other retrieved bit through the second data output port to form data stream DAT2, except that for every sixteenth pair of bits output the value of the data stream DAT1 is set to 0 in order to act as a SYNC bit and the output signal generator retrieves a single data bit from the FIFO memory 261 for the data stream DAT2. The SYNC bit is only added to the data stream DAT1 because the chip rate and timing information for the data stream DAT1 will also apply to the data stream DAT2. The output signal generator also sets respective outputs EN1, EN2 of the first and second enable signal output ports to a value of 1 and the output EN3 of the third enable signal output port to a value of 0. In this way, two parallel data streams are output from the data rate determining unit 235.

If the output signal generator 265 determines that the power level is above the second predetermined level, then the output signal generator 265 outputs three parallel data streams through the data output ports. In particular, the output signal generator 265 retrieves data from the FIFO memory 261 three bits at a time and outputs one bit through the first data output port to form data stream DAT1, one bit through the second data output port to form data stream DAT2, and one bit through the third serial data port to form a data stream DAT3. Again, the value of every sixteenth bit of the data stream DAT1 is set to 0 to provide a SYNC bit. The output signal generator 265 also sets the outputs EN1, EN2 and EN3 of the first to third enable signal output ports to a value of 1. In this way, three parallel data streams are output by the data rate determining unit 235.

Returning to FIG. 16, the encoder 231 includes six pseudo-noise code generators (not shown) which respectively generate first to sixth pseudo-noise codes PN0 to PN5 which are input to non-inverting inputs of respective ones of six AND gates 237a to 237f. Each data stream is input to a respective pair of the AND gates 237, in the manner shown in FIG. 2, where they are combined (when the respective pair of AND gates are enabled by the enable signal) with a respective pair of the pseudo-noise codes PN0 to PN 5.

The data streams output by the first and second AND gates 237a, 237b are input to a first adder 239a where they are added together to generate a first logic signal $I_1(t)$, which corresponds to the pseudo-noise code PN0 when the data value of the data stream DAT1 is 0 and corresponds to the pseudo-noise code PN1 when the data value of the data stream DAT1 is 1. Similarly, the data streams output by the third and fourth AND gates 237c, 237d are input to a second adder 239b where they are added together to generate a second logic signal $I_2(t)$ and the data streams output by the fifth and sixth AND gates 237e, 237f are input to a third adder 239c to generate a third logic signal $I_3(t)$.

In this embodiment, the first to third data streams DAT1, DAT2 and DAT3 are all output by the data rate determining unit at a rate of 10.7 bits per second and the first to sixth pseudo-noise code generators generate the first to sixth pseudo-noise codes PN0-PN5 respectively at a rate of 1,378 chips per second. Further, in this embodiment the first to sixth pseudo-noise code generators generate 11-bit codes with a binary 0 added after each sequence of 2047 chips to form a repeating sequence of 2048 chips. By using the same data rates for the data streams DAT1-DAT3 and the same chip rates for the pseudo-noise codes PN0 -PN5, the processing required in the decoder to recover the original data signal is significantly simplified.

The first logic signal $I_1(t)$ is input to a first modulator 241a together with the output EN1 from the data rate determining unit 235. When the output EN1 has a value of 1, the modulator 241 uses phase shift keying to modulate a 2.76 kHz carrier signal in accordance with the value of the logic signal I(t) to generate a modulated signal $G_1(t)$. In this embodiment, the carrier signal is a digital signal having a sample rate of 22.05 kHz and the modulated signal $G_1(t)$ is a sequence of 16-bit numbers.

Similarly, the second logic signal $I_2(t)$ is input to a second modulator 241b which, when the output EN2 has a value of 1, modulates a 2.76 kHz carrier signal in accordance with the value of the second logic signal $I_2(t)$ to generate a second modulated signal $G_2(t)$ and the third logic signal $I_3(t)$ is input to a third modulator 241c which, when the output EN3 has a value of 1, uses phase shift keying to modulate a 2.76 kHz carrier signal in accordance with the value of the logic signal $I_3(t)$ to generate third modulated signal $G_3(t)$. If the enable signal applied to a modulator 241 is zero, the modulator outputs a null signal.

The first to third modulated signals G(t) are input to a 16-bit adder 243 which adds the 16-bit values of the first to third modulated signals G(t) for each sample to generate a final modulated signal $G_4(t)$.

The audio track is also input to a time delay unit 245 and the output of the time delay unit 245 is input to a shaping unit 247 along with the final modulated signal $G_4(t)$ to generate the shaped signal S(t). The shaping unit 247 is identical to the shaping unit described with reference to FIG. 4 in the first embodiment and therefore will not be described again. The purpose of the time delay unit 245 is to introduce a time delay corresponding to the time taken for the data rate determining unit 235 to monitor the audio track and output the first to third data streams and for the AND gates 237, adders 239, modulator 241 and 16-bit adder 243 to generate the final modulated signal $G_4(t)$. In this way, the final modulated signal $G_4(t)$ is shaped using the same portion of the audio track as was monitored to determine the data rate.

As described in the first embodiment, the shaping unit 247 shapes the final modulated signal $G_4(t)$ so that it is less noticeable when, after having been combined with the audio track, it is output as an acoustic signal. In this embodiment, however, the modulated signal $G_4(t)$ is pre-processed to contain more data when combined with loud portions of the audio track than when combined with quiet portions of the audio track.

The audio track output by the time delay unit 245 is also input to a second time delay unit 249, which delays the audio track for a period of time corresponding to the time required for the shaping unit 247 to generate the shaped signal S(t). The audio track output by the time delay unit 249 and the shaped signal S(t) are then input to an adder 251 which performs a simple linear adding operation to combine them to form the modified audio track.

The modified audio track is then combined with the video track to generate a television signal which is broadcast in the same manner as for the first embodiment. The broadcast television signal is then detected by a conventional television set which outputs the modified audio track as an acoustic signal.

The cellular phone 261 of the seventh embodiment will now be described with reference to FIGS. 18 to 27 in which components which are identical to those of the cellular phone of the first embodiment have been referenced with the same numerals and will not be described again.

The main difference between the cellular phone 261 of the seventh embodiment and the cellular phone 21 of the first embodiment is that the cellular phone 261 of the seventh embodiment includes a decoder 263 to recover the original data signal F(t) from the digital signal D(t) output by the ADC 113 rather than using a software routine run by a central processor 265. The recovered data signal F(t) output by the decoder 263 is then input to an input DATA_IN input of the processor 265.

FIG. 19 shows in more detail the main components of the decoder 263. In this embodiment, the decoder 263 uses coherent detection, in which a received data stream is synchronously multiplied by the pseudo-noise codes PN0-PN5, to perform despreading. It is, however, necessary to ensure that the chip sequence in the digital signal D(t) and the chip sequences of the pseudo-noise codes PN0-PN5 are time-synchronised. To achieve an initial synchronisation, the digital signal D(t) is input to an acquisition unit 271 which generates timing signals which are input to a processor 273 which then generates the pseudo-noise codes PN0-PN5 in accordance with the timing signals.

In this embodiment, the processor 273 first determines from the timing signals any slight frequency offset between the chip rate of the chip sequence in the digital signal D(t) and the chip rate of the pseudo-noise codes PN0-PN5, and then outputs a signal S indicative of the frequency offset to a re-sampling circuit 275. The digital signal D(t) is input to the re-sampling circuit 275 where it is stored in blocks of 8192 samples. The re-sampling circuit re-samples the 8192 samples in each block at a rate determined by the signal S output by the processor 273 so that the pseudo-noise codes conveyed by the re-sampled digital signal R(t) have the same chip rate as the pseudo-noise codes generated by the processor 271. For example, if the determined frequency offset indicates a chip rate of 1392 Hz, which corresponds to an increase of 1% over the nominal chip rate of 1378 Hz, then the re-sampling rate is set at 22.2705 Hz to allow for the additional chips present. The re-sampled data is determined in the re-sampling circuit 275 from the 8192 stored samples using interpolation techniques to give, for the exemplary 1% increase in chip rate, 8274 samples. For the re-sampled data, each chip will correspond to sixteen samples and therefore each data bit will correspond to 2048 samples.

FIG. 20 shows in more detail the main components of the acquisition unit 271, the timing signals output by the acquisition unit 271 to the processor 273, and the signals output by the processor 273. As shown in FIG. 20, the samples of the digital signal D(t) output by the ADC 113 are input sequentially to a series of four digital matched filters 291a to 291d which are arranged so that after passing through the first matched filter 291a the samples are output via the cascade output (indicated in FIG. 20 by a) of the first matched filter 291a and input to the second matched filter 291b and so on. Each matched filter 291 has 512 taps so that the four matched filters 291 have a sequence of 2048 taps, and the matched filters 291 are matched to the chip sequence of the pseudo-noise code PN0 corresponding to the SYNC bit.

The reason why a single matched filter having 2048 taps is not used rather than the four series connected matched filters 291 will now be described. In particular, if a single large matched filter was used in order to detect the SYNC bit, and if the rate at which the code PN0 is generated is different to the chip rate in the received electrical signal D(t), then this lack of synchronisation will lead to a severe degradation in the peak score output by the matched filter. This is because a large single matched filter performs the correlation over a larger time window and consequently the effects of the lack of synchronisation can build up over a longer period of time. In contrast, by using a number of smaller matched filters connected in series, the time window over which each of the matched filters performs the correlation is much smaller than that of the larger single matched filter. Hence, the lack of synchronisation will cause less degradation for each of the individual smaller matched filters. As a result, larger frequency offsets between the chip rate in the digital signal D(t) and the chip rate of the pseudo-noise code PN0 can be tolerated by using the four matched filters 211 rather than a single matched filter.

The score output by each of the matched filters 291 (which is indicated by output b and which is updated at each clock pulse as the samples of D(t) are clocked through the matched filters) is input to a corresponding one of four normalisation circuits 293a to 293d. The normalisation circuits 293 provide a normalised output for a wide dynamic signal range of the digital signal D(t). This enables the output of the normalisation circuit to be analysed by a simple thresholding operation.

FIG. 21 shows schematically the contents of each normalisation circuit 293. As shown, the current score from the corresponding matched filter 291 is input to a time delay unit 301 where it is delayed for 256 clock periods, which corresponds to the time taken for the samples of the digital signal D(t) to propagate halfway through the corresponding one of the matched filters 291. The current score is also input to an averaging circuit 303 which uses the current score to update a running total of the last 512 scores. The output of the time delay unit 301 is then input to a divider 305 which divides the delayed score by the current value of the running total, to produce the normalised output. The above processing makes the normalisation circuit particularly well suited to systems where a spread spectrum signal is hidden in an acoustic signal, because the acoustic signal will typically vary over a large dynamic range.

FIG. 22 shows in more detail the contents of the averaging circuit 303. As shown, the current score is input to a time delay unit 311, where it is delayed for 512 clock periods, and a first adder 313 where the inverse of the time delayed score is added to the current score. The output of the first adder 313 is then input to a second adder 315 which adds it to the current value of the running total (delayed by one clock cycle) output by the time delay unit 317, to generate a new current value of the running average which is used by the divider circuit 305. In this way, the value of each new sample is added to the running total while the value of the sample 512 clock periods before the new sample is subtracted.

FIG. 23 shows a typical output of one of the normalisation circuits 293, when two consecutive 16-bit frames pass through the corresponding matched filter 291. In FIG. 23 reference timings 321a to 321c are illustrated which are separated by 32768 clock periods (nominally corresponding to the time required for the samples corresponding to one 16-bit frame to pass through the matched filter). The period between two adjacent reference timings 321 will hereinafter be referred to as a frame period. A first peak 323 in the normalised score, corresponding to a first SYNC bit, occurs a time $\tau_1$ after the nearest preceding reference timing 321a, while a second peak 325, corresponding to a second SYNC bit, occurs a time $\tau_2$ after the nearest preceding reference timing 321b. If there is no frequency offset in the chip rates, then $\tau_1$ is equal to $\tau_2$ (since in 32768 clock periods the samples corresponding to a 16-bit frame will pass completely through the four matched filters 291) and the matched filters 291a-291d all output peaks at the same time. However, if there is a frequency offset in the chip rates, then there will be a timing offset $\tau_{off}$ defined by $\tau_2-\tau_1$, between the peaks in neighbouring frames which is dependent on the frequency offset. Further, a frequency offset in the chip rates will lead to the peaks output by the four matched filters 211a to 211d not occurring simultaneously. However, the timing offset ($\tau_{off}$) for the output of each of the normalisation circuits 293 should be identical. In this embodiment, the acquisition unit 271 makes use of this, in order to quantify the frequency offset and hence to correct for it. The way in which this is done will now be described.

As shown in FIG. 20, in this embodiment, the output of each normalisation circuit 293 is input to a corresponding cross-correlator 295a to 295d where it is cross-correlated with the output from the same normalisation circuit for the immediately preceding frame. This is achieved by passing the output score from each normalisation unit 293 through a corresponding time delay unit 297a to 297d which delays the scores by one frame period (i.e. 32768 clock periods). The output from the normalisation circuit 293 is then cross correlated with the corresponding delayed output, by the cross-correlator 295. In this embodiment, a maximum frequency offset corresponding to twelve clock samples is anticipated. Therefore, the cross-correlators 295 only look for a cross-correlation peak over a range of time offsets between the two frames, varying between a twelve sample lead and a twelve sample lag. This results in a significant reduction in the amount of processing required by the cross-correlators 295.

FIG. 24 shows a typical output of one of the cross-correlators 295. The x-axis corresponds to the time offset between the two frames output by the normalisation circuit 293 and the y-axis corresponds to the score output by the cross-correlator 295. A cross-correlation peak 331 occurs at a time offset $\tau_{\mathit{off}}$ which is equal to $\tau_2-\tau_1$. As mentioned above, the time offset for each of the matched filters 291a-291d should be identical and therefore the position of the cross-correlation peak 331 in the output of each of the cross-correlators 295 should be the same. The outputs of the four cross-correlators 295 are therefore added together by an adder 299 and the output of the adder 299, labelled OFFSET in FIG. 20, is input to the processor 273. The processor 273 then calculates the frequency offset (from $\tau_{\mathit{off}}$ and the size of the correlation window of the matched filters 291) and sends the signal S indicative of the frequency offset to the re-sampling circuit 275.

Once the frequency offset has been removed, it is then necessary to synchronise the pseudo-noise codes PN0-PN5 generated by the processor 273 with the chip sequence in the digital signal D(t). In this embodiment, this is achieved by inputting the output scores $A_i$, $B_i$, $C_i$ and $D_i$ from the four normalisation circuits 293 directly into the processor 273 which determines, from the largest peak present in the four outputs, the timing of the chip sequence in the detected electrical signal D(t). The processor 273 then uses the determined timing when generating the pseudo-noise codesPN0-PN5 to ensure that they are synchronised with the chip sequence within the digital signal D(t).

In this embodiment, the processor 273 is a microprocessor based system which is schematically illustrated in FIG. 25. As shown, the processor 273 includes an interface circuit 335 for interfacing a central processing unit (CPU) 337 with the normalised scores $A_i$, $B_i$, $C_i$ and $D_i$ output from the normalisation circuits 293, for interfacing the CPU 337 with the adder 299, and for outputting the pseudo-noise codes PN0-PN5. As shown in FIG. 25, the interface circuit 335 also receives a signal (TRACK) which is used in a tracking operation which will be described in more detail below. In carrying out the calculations described above, the processor 273 processes the values received from the interface circuit 335 in accordance with predetermined instructions stored in a program memory 339. A working memory (RAM) 341 is also provided for use by the CPU 337 when performing calculations. A user interface 343 is also provided to allow a user to adjust the settings of the processor 273, for example in order to change or alter the program instructions stored in the program memory 339 so that the decoder can be reconfigured.

Returning to FIG. 19, the output of the re-sampling circuit 275 is input to first to third correlate and compare units 279a to 279c. The first correlate and compare unit 279a correlates the data output by the re-sampling circuit with the first and second pseudo noise codes PN0,PN1 and then compares the results of these two correlations. Similarly, the second correlate and compare unit 279b correlates the data output by the re-sampling circuit 275 with the third and fourth pseudo noise codes PN2,PN3 and compares these two correlations and the third correlate and compare unit 279c correlates the data output by the re-sampling circuit 275 with the fifth and sixth pseudo noise codes PN4,PN5 and compares the results of these two correlations.

FIG. 26 shows in more detail the main components of the first correlate and compare unit 279a (the second and third correlate and compare units 279b, 279c have the same structure but different inputs). AS shown in FIG. 21, the first correlate and compare unit 279a has three channels which have been labelled late, on-time and early. As will be explained below, the three channels enable the time synchronisation to be tracked while data other than the SYNC bit is being transmitted.

The data signal R(t) is input into each of the three channels of the correlate and compare unit 279 and in each channel it is separately multiplied by PN0 and PN1. In the late channel, the data signal R(t) is input to a first multiplier 351a, where it is multiplied by PN1 time-delayed by two clock periods by a first time delay unit 353a, and to a second multiplier 351b, where it is multiplied by PN0 time delayed by two clock periods by a second time delay unit 353b. Similarly, in the on-time channel the data signal R(t) is input to a third multiplier 351c, where it is multiplied by PN1 time-delayed by one clock period by a third time delay unit 353c, and to a fourth multiplier 351d, where it is multiplied by PN0 time-delayed by one clock period by a fourth time delay unit 353d. In the early channel, the data signal R(t) is input to a fifth multiplier 351e, where it is multiplied by PN1, and to a sixth multiplier 351f, where it is multiplied by PN0.

When the data signal R(t) is multiplied by PN1, if the chip sequence in the data signal R(t) corresponds to PN1, then a narrow band signal at about the carrier frequency of 1378 Hz will be generated. Similarly, when the data signal R(t) is multiplied by PN0, if the chip sequence of the signal R(t) matches PN0, then a narrow band signal at the carrier frequency will be generated. In this way, for each channel, if the received data bit has a value of 1, then the output of the first, third and fifth multipliers 351a, 351c, 351e will contain a narrow band signal at the carrier frequency and, because PN1 and PN0 are orthogonal, the output of the second, fourth and sixth multipliers 351b, 351d, 351f will not contain the narrow band signals. Similarly, if the received data bit has a value of 0, then the output of the second, fourth and sixth multipliers 351b, 351d, 351f will contain the narrow band signal at the carrier frequency and the output of the first, third and fifth multipliers 351a, 351c, 351e will not.

The outputs of the two multipliers 351 in each channel are input to a corresponding one of three power comparators 355a to 355c, one of which is shown in more detail in FIG. 27. As shown, in the power comparator 355 the outputs of the two multipliers 351 are input to respective bandpass filters 361a and 361b which are centred on the carrier frequency. The output of each bandpass filter 361 is then input to a respective power monitor 363a, 363b which determines the power of the signal output from the corresponding bandpass filter 361. As mentioned above, when the received data bit is a "1", the output from the power monitor 363a should be greater than the output from the power monitor 363b. In contrast, when the received data bit is a "0", the output from the power monitor 363b should be greater than the output from the power monitor 363a. Therefore, the outputs from the power monitors 363 are input to a comparator 365 which outputs a value which varies in dependence upon the difference between the outputs of the two power monitors 363. In this embodiment, the output from the power monitor 363a is input to the positive terminal of the comparator 365 and the output from the power monitor 363b is input to the negative terminal of the comparator 365. Therefore, if the received data bit is a "1", then the output of the comparator 365 will be a large positive value, and if the received data bit is a "0", then the output of the comparator 355 will be a large negative value.

In this embodiment, as the encoder 263 continuously outputs the data stream DAT1, when decoding the digital signal D(t) corresponding to the modified audio track the first correlate and compare unit 279a will, provided PN0 and PN1 are time-synchronised with the received chip sequence, output a continuous sequence of either positive or negative values indicative of data bits "1" and data bits "0" respectively. However, the encoder 263 only outputs the second data stream DAT2 and the third data stream DAT3 for the louder portions of the audio track. In this embodiment, if the data stream DAT3 is not present then in the third correlate and compare unit 279c neither the output of the fifth multiplier 351e nor the output of the sixth multiplier 351f will contain a narrow band signal at the carrier frequency and the output of the power comparators 355 for all three channels will be approximately zero volts. Similarly, if the data stream DAT2 is not present then the outputs from the second correlate and compare units 279b will be approximately zero volts.

Returning to FIG. 19, the output of the on-time channel of the first to third correlating compare units 279 are input to a data regeneration circuit 281 which determines which of the data streams DAT1, DAT2 and DAT3 are present, removes the SYNC bits and decodes the (15,7) BCH code to regenerate the original data signals.

The output of the on-time channel of each correlate and compare unit 279 is also input, together with the outputs of the late and early channels of each correlate and compare unit 279, into an analysis unit 285. The analysis unit 285 determines which of the channels provides the largest output, which indicates the channel for which there is the best match between the timing of chip sequence in the data signal R(t) and in the pseudo-noise codes PN0 to PN5. If the late channel provides the largest output, then analysis unit 285 sends a signal (on the control line labelled TRACK) to the processor 273 indicating that the clock should skip a sample so that the on-time channel once more produces the largest output. Similarly, if the early channel produces the largest output, then the analysis unit 285 outputs a signal to the processor 273 which causes the clock 277 to make a double sample so that the on-time channel once more produces the largest output. In this way, a tracking operation is accomplished in which time synchronisation of PN0 to PN5 with a chip sequence encoded in the data signal R(T) is checked on a sample-sample basis and, if necessary, the timing of PN0 to PN5 is adjusted to correct for a reduction in synchronisation.

In the first to seventh embodiments, a data signal conveying a URL identifying a website associated with a television program is input to an encoder in which the data signal is spread and mixed with the audio track for the television program prior to the television program being broadcast over a conventional television network. A cellular phone then recovers the URL from the acoustic signals output by a television tuned to the television program so that the user of the cellular phone, if desired, can download the web page to the cellular phone. The first to seventh embodiments describe different techniques for encoding the data signal within the audio track.

Alternative embodiments will now be described in which the encoder is incorporated within a cellular phone so that a data stream can be encoded within an acoustic signal emitted by the cellular phone.

FIG. 28 illustrates an eighth embodiment of the invention in which a first cellular phone 401_1 emits an acoustic signal 403, having encoded therein user data associated with the user of the first cellular phone 401_1, from a loudspeaker 25_1. In this embodiment, the user data includes the name of the user and the telephone number of the first cellular phone 401_1. The emitted acoustic signal 403 is detected by a second cellular phone 401_2, using a microphone 23_2, and the second cellular phone 401_2 then decodes and stores the user data. In particular, the name of the user of the first cellular phone 401_1 is stored along with the telephone number of the first cellular phone 401_1 in a "phone book" stored in the second cellular phone 401_2. Similarly, the second cellular phone 401_2 emits an acoustic signal conveying user data associated with the user of the second cellular phone 401_2 from a loudspeaker 25_2 for detection and decoding by the first cellular phone 401_1.

It will be appreciated that transmitting user data in this manner removes the requirement of inputting names and phone numbers via the keypad 31 of the cellular phone 401, which is generally a slow and awkward process because the keys of the keypad 31 are small.

FIG. 29 schematically illustrates the main components of the cellular phone 401 of the eighth embodiment. In FIG. 29, components which are identical to corresponding components of the cellular phone of the first embodiment have been referenced by the same reference numerals and will not be described again.

As shown, in this embodiment the processor 411 of the cellular phone 401 has an AUDIO_OUT output and a DATA_OUT output which are connected to respective inputs of an encoder 413. In this embodiment, the only difference between the encoder 413 and the encoder of the first embodiment is that the modulator of the encoder 413 does not include a re-sampling circuit because the digital signal output via the AUDIO_OUT output of the processor 411 has a sample rate of 8 kHz. The output of the encoder 413 is connected to the input of the DAC 117. In this way, user data output via the DATA_OUT output of the processor 411 is encoded within an audio track output by the AUDIO_OUT output to form a modified audio track.

In the cellular phone 401 of this embodiment, the digital signal D(t) output from the ADC 113 is input to a decoder 415 as well as the AUDIO_IN input of the processor 411. The decoder 415 is identical to the decoder of the seventh embodiment and will not therefore be described again. The decoder 415 recovers user data encoded within the digital signal D(t) and outputs the recovered user data to a DATA_IN input of the processor 411. In this way, user data conveyed by an acoustic signal from another cellular phone 401 can be decoded for processing by the processor 411.

In this embodiment, the user data associated with the user of the cellular phone 401 is stored in the NVRAM 125 and the ROM 127 stores a sub-routine which, in response to the user selecting a menu option using the menu keys 33, causes the processor 411 to output, via the DATA_OUT output, the user data and to output, via the AUDIO_OUT output, a preset audio sequence. The purpose of the preset audio sequence is to provide an audible indication to the user that the data transfer is taking place. In the encoder 413, the user data is spread, modulated and shaped as described in the first embodiment before being added to the preset audio sequence to form a modified audio sequence. The modified audio sequence output by the encoder 413 is input to the DAC 117 where it is converted into an analogue signal which is amplified by the amplifier 119 and output as an acoustic wave by the loudspeaker 25.

When the cellular phone 401 detects, using the microphone 23, an acoustic wave conveying user data, the user data is decoded by the decoder 415 and input, via the DATA_IN input, to the processor 411. In response to the user data being input, the processor 411 runs a sub-routine stored in the ROM 127 which extracts the user name and phone number from the user data and stores the extracted user name and phone number as an entry in a look-up table within the NVRAM 125. In this embodiment, the NVRAM 125 can store up to 100 entries which form an electronic phone book.

In the eighth embodiment, data is transferred between two cellular phones 401 via an acoustic communications link. However, cellular phones could also use an acoustic communications link to transmit data signals to other electronic devices. A ninth embodiment will now be described with reference to FIGS. 30 to 33 in which a cellular phone encodes a control signal within an emitted acoustic signal; a toy detects the acoustic signal, recovers the control signal and responds in accordance with the control signal in a manner discernable to humans.

As shown in FIG. 30, a caller 423 uses a telephone handset 427, connected to a telecommunications network 429, to phone the user (not shown) of the cellular phone 421. The call is routed by the telecommunications network to a base station 431, which covers the area in which the cellular phone 421 is currently located, and the base station 431 outputs a RF signal 433 which is detected by the antenna of the cellular phone 421. Included in the RF signal 433 is identification data identifying the phone number of the handset 427. Those skilled in the art will appreciate that such identification data is sent in many conventional telephone systems. In this embodiment, the cellular phone 421 determines from the incoming RF signal 433 the telephone number of the handset 427, retrieves from a look-up table a control signal identifier associated with the determined telephone number, and encodes the control signal corresponding to the control signal identifier within a ring tone which is output as an acoustic signal 435.

In this embodiment, the acoustic signal 435 is detected by a microphone 437 in an electronic toy 425. As shown in FIG. 30, the electronic toy 425 includes two arms 439a, 439b and a face formed by: a nose 441; two eyes 443a, 443b; an articulated mouth 445; and two articulated eyebrows 447a, 447b. The electronic toy 425 also includes a loudspeaker 449. The toy 425 decodes the control signal within the ring tone emitted by the cellular phone 421 and responds by outputting a sound via the loudspeaker 449 and by moving the mouth 445 and the eyebrows 447 to from an expression in accordance with the recovered control signal.

FIG. 31 shows the main components of the cellular phone 421 of the ninth embodiment. In FIG. 31, components which are identical to corresponding components of the cellular phone of the first embodiment have been referenced by the same reference numerals and will not be described again. As shown, the processor 461 has a DATA_OUT output which is connected to a first input of an encoder 463 and the AUDIO_OUT output of the processor 461 is connected to a second input of the encoder 463. In this embodiment, the encoder 463 is identical to the encoder of the eighth embodiment. The encoder 463 encodes a data signal output via the DATA_OUT output of the processor 461 within an audio signal output via the AUDIO_OUT output of the processor 461 to form a modified audio signal which is converted into an analog signal by the DAC 117, and the analog signal is then amplified by the amplifier 119 prior to being converted into an acoustic signal by the loudspeaker 25.

FIG. 32 shows the functional configuration of the processor 461 when a signal initiating a telephone call is first received via the antenna 27. As shown, the received signal is input to a ring signal generator 471 which generates a ring signal which is output via the AUDIO_OUT output of the processor 461. The received signal is also input to a phone number extractor 473 which determines from the received signal the telephone number of the caller. The determined telephone number is processed by a response retriever 475 which accesses a response identifier corresponding to the determined telephone number from a response storage region 477 of the NVRAM 125. As shown, the response storage region 477 is in the form of a look-up table which stores a plurality of telephone numbers along with corresponding response identifiers. In this embodiment, there are three possible responses which have response identifiers A, B and C respectively. When the response retriever 475 has retrieved a response identifier from the response storage region 477, the retrieved response identifier is processed by a data signal generator 479 which generates a corresponding control signal which is output via the DATA_OUT output of the processor 461.

As described above, the acoustic signal 435 is detected by a microphone 437 of an electronic toy 425 which converts the acoustic signal into an electrical signal. FIG. 33 schematically shows the main components of the electronic circuitry within the toy 425. As shown, the electrical signal output by the microphone 437 is input to an anti-aliasing filter 491 before being converted into a digital signal by a DAC 493. The digital signal output by the DAC 493 is input to a decoder 495 which recovers the control signal. In this embodiment, the decoder 495 is identical to the decoder for the eighth embodiment.

The recovered control signal is input to a processor 497 which is connected to a RAM 499, which provides working memory, and a ROM 501 which stores routines which are executed in response to the control signal. A first output of the processor 497 is connected to a first motor drive circuit 503 which outputs drive signals to an eyebrows motor 505 for causing movement of the articulated eyebrows 447. A second output of the processor 497 is connected to a second motor drive circuit 507 which outputs drive signals to a mouth motor 509 for causing movement of the articulated mouth 445. A third output of the processor 497 is connected, via a DAC 511 and an amplifier 513, to a loudspeaker 515.

In operation, receipt of a control signal activates a corresponding routine stored in the ROM 501 associated with the control signal which causes the processor 497 to output a signal to the motor drive circuit 503, causing the motor drive circuit 503 to drive the eyebrows motor 505 to move the articulated eyebrows 447, and outputs a signal to the second motor drive circuit 507 causing the second motor drive circuit 507 to output a drive signal to the mouth motor 509 to move the articulated mouth 445. In this way, the desired expression corresponding to the control signal is formed. Further, an audio signal associated with the control signal is output by the processor 497 to the DAC 511 where it is converted into an analog signal which is then amplified by the amplifier 513 before being output as an acoustic signal by the loudspeaker 449. As shown in FIG. 30, the control signal associated with the user 423 causes the facial expression of the toy 425 to become a frown, and the audio signal associated with the user 423 is a groan.

In the ninth embodiment, a cellular phone determines a control signal associated with the telephone number of a caller and combines the control signal with the ring tone for detection by the toy 425. However, control signals could also be transmitted to a cellular phone over a telecommunications network for transmission by the cellular phone as an acoustic signal for subsequent detection and processing by an electronic device. A tenth embodiment will now be described with reference to FIGS. 34 and 35 in which the facial expression of, and sounds output by, the toy 425 of the ninth embodiment are altered in accordance with control signals which are transmitted, using the Short Message Service (SMS) defined in the Global System for Mobile communication (GSM) specification, over the telecommunications network 429 to a cellular phone. In FIG. 34, components which are identical to corresponding components in FIG. 30 have been referenced with the same numerals and will not be described again.

As shown in FIG. 34, a computer system 521 is connected to a modem 523 via which the computer system 521 sends signals over the telecommunications network 429. In response to a user of the computer system 521 indicating a control signal to be sent to the cellular phone 525, a corresponding control signal identifier is output, using the modem 523, in the form of an SMS message to the telecommunications network 429 which routes the SMS message to the base station 431 covering the location of the cellular phone 525. The base station 431 then emits an RF signal 433 conveying the SMS message for detection by the cellular phone 525.

In this embodiment, the hardware components of the cellular phone 525 are identical to those of the cellular phone described with reference to FIG. 31 for the ninth embodiment. However, in this embodiment the ROM in the cellular phone 525 includes a routine which, in response to an SMS message conveying a control signal identifier, retrieves the control signal identifier from the SMS message and outputs the corresponding control signal and a preset audio signal via the DATA_OUT and AUDIO_OUT outputs of the processor respectively.

FIG. 35 shows the functional configuration of the processor of the cellular phone when processing a received SMS message conveying a control signal identifier. The SMS message is processed by a SMS message analyser 531 which retrieves the control signal identifier. The SMS message analyser then causes an audio signal generator 535 to output the preset audio signal via the AUDIO_OUT output of the processor and a data signal generator 533 to output the control signal corresponding to the control signal identifier from the processor via the DATA_OUT output. The encoder then combines the control signal with the preset audio signal to form a modified audio signal which is output as the acoustic signal 435. In this embodiment, the preset audio signal is only used to alert the user of the cellular phone that a control signal is being sent.

In this embodiment, the toy 425 detects the acoustic signal 435, and responds in the same manner as described in the ninth embodiment.

Modifications and Further Embodiments

In the first to tenth embodiments, an acoustic data channel is used to either input data into or output data from a cellular phone. The addition of an acoustic data channel to a cellular phone has many advantages, for example:
1. The cellular phone is already equipped with a microphone and a loudspeaker which can be used for the acoustic data channel. Therefore, the weight of the cellular phone does not need be significantly increased.
2. The processors typically used in most digital cellular phones are well suited to be programmed to carry out software routines for encoding and/or decoding data within the acoustic data channel.
3. Acoustic communication techniques are well suited for short range communication, particularly as they are not subject to the same regulatory requirements as RP communications techniques.
4. There are already established networks for distributing acoustic signals, for example television and radio networks.
5. Many people carry a cellular phone on their person virtually all the time. It therefore provides an ideal communication route for data which are dependent upon the location of a person.
6. Using an acoustic link to cellular phones enables data to be targeted to people within a specific location, for example a particular building via a public address system within the building, or listeners to a particular audio source, for example a particular radio network. This is advantageous both to the data supplier, because data is supplied efficiently, and to the user of the cellular phone, because only data which is likely to be useful is received.
7. Using an acoustic communication technique to input data into a cellular phone is generally more convenient than inputting data using the keys of the cellular phone because the keys are generally small.

As those skilled in the art will appreciate, some of the above-described advantages also arise with other portable telephones, such as cordless telephones which communicate with a base station directly connected to a public switched telephone network (PSTN), or even a standard telephone which is directly connected to a PSTN. Those skilled in the art will also appreciate that the telephone could be incorporated as part of another device, for example a personal digital assistant (PDA).

As described above in the first to seventh embodiments, an acoustic data channel is particularly well suited to so-called "smart" phones which have some data processing capability in addition to voice call handling capability because the acoustic communication techniques can be used, for example, to control the accessing of data or to output signals in accordance with received data. In the first to seventh embodiments, the cellular phone is able to download data from the internet using the Wireless Application Protocol. Other types of "smart" phone include those employing the i-MODE system, "Java phones" which have incorporated therein the Java 2 Platform Micro Edition (J2ME), and the future 3G cellular phones.

In the first to seventh embodiments, a user is able to download a web page from the internet about a television programme using a cellular phone. In particular, a URL for the web page is encoded within the audio track of the television programme. In this way the acoustic data channel is used to establish a link between the cellular phone and the web page.

The URL encoded within the television programme could relate to a web page specifically mentioned in the television programme as a source of further information. Alternatively, the URL could be for a "hidden" web page whose existence is not generally broadcast and therefore can only be accessed by suitably enabled cellular phones. For example, a feature film could have encoded within its soundtrack a URL for a web page having cast interviews etc.

Those skilled in the art will appreciate that another form of web page identifier could be encoded within the audio track instead of the URL. For example, a combination of the Internet Protocol address of the server storing the web page and index data identifying the desired web page to the server could be used.

In an alternative embodiment, a proprietary web page identifier is encoded within the audio track, and on receiving an acoustic signal conveying a proprietary web page identifier, the cellular phone accesses a database storing a look-up table associating a plurality of proprietary web page identifiers with associated IP addresses and/or URLS. In this way, the data location of the web page associated with the received proprietary web page identifier is determined. The database could be located either in the cellular phone or at a remote server which the cellular phone accesses using the cellular telecommunications network. If the database is stored in the cellular phone, the database can be periodically updated, for example by sending new data using a SMS message.

If the proprietary database is located at a remote server, on receiving a proprietary web page identifier the remote server can either send the corresponding IP address/URL back to the cellular phone or forward to the corresponding IP address/URL a request to download data directly to the cellular phone. An advantage of using a remote server to store the database of proprietary web page identifiers and associated IP addresses is that the number of times the server is accessed by the user of the cellular phone can be monitored. This enables the television programme maker to assess the usefulness of encoding the web pages within the television programme. Further, by monitoring the number of times the user of the cellular phone accesses the server, a loyalty scheme can be established in which the user receives rewards, for example free gifts, for frequent use. In particular, if the user accesses the database a predetermined number of times then a reward is given. This encourages the user of the cellular phone to make use of the server.

For the first to seventh embodiments, the television signal need not be broadcast using a transmitter but could be sent to the television set along a cable network or via a satellite. It will also be appreciated that the same techniques could be applied to a radio signal, whether broadcast using a transmitter or sent along a cable network. Further these techniques can be applied to a point-to-point communication system as well as broadcast systems. In addition, conventional encryption techniques could be used so that the television or radio signal could only be reproduced after processing by decryption circuitry.

As another alternative, the television signal could be stored on a video cassette, a digital versatile disk (DVD), hard disk or the like. In this way, no signal is transmitted through the atmosphere or through a cable network but rather the television signal is stored on a recording medium which is subsequently played to a user on the user's television set. Similarly, an audio signal could be stored on an audio cassette, compact disc (CD) or the like. Further, the audio track could be stored as a computer file, for example an MP3 file, on a hard disk or the like.

In the first to seventh embodiments, the monitor mode is activated by the user of the cellular phone. In other embodiments, the monitor mode is activated in response to an external stimulus rather than by the user of the cellular phone. For example, the monitor mode could be activated by a received SMS message. Alternatively, the cellular phone could be configured so that the functionality of the monitor mode is continuously activated.

As described above, in the monitor mode a cellular phone monitors for any data signals conveyed by acoustic signals detected by the microphone. In an embodiment, in order to save power during periods when no data signals are detected, the cellular phone can operate in a "power-save" mode in which the cellular phone only periodically checks for data signals rather than continuously checking for data signals. For example, the cellular phone could check for data signals for a period of three seconds and, if no data signals are detected, the cellular phone then waits ten seconds before checking again. The power-save mode could be activated automatically by the cellular phone if no data signal is received for a predetermined time period. Alternatively, the power-save mode could be activated by a user or by an external stimulus.

In the first to seventh embodiments, the web page whose URL is detected within the audio track of a television programme is accessed by the user of the cellular phone selecting a menu option using menu keys. The accessing of the web page could also be initiated by an external stimulus, for example a command sent using the acoustic data channel. In some applications, the web page is automatically accessed by the cellular phone without requiring any input from the user or an external stimulus, in which case the cellular phone need not store the URL or other web page identifier. For example, in an embodiment a sequence of web page identifiers is encoded within the audio track of a television programme and a cellular phone detects the sequence of web page identifiers and automatically downloads the corresponding web pages. In this way, the cellular phone can display web pages which vary in synchronism with the content of the television programme. Such automatic accessing could be activated in response to a user instruction or an external stimulus, or alternatively the cellular phone could be pre-configured for automatic accessing. Preferably, the user is able to disable the automatic accessing if the user considers the data being downloaded to be irrelevant.

In an alternative embodiment, the user of the cellular phone is able to store a received web page identifier in a NVRAM within the cellular phone for future access by selecting an appropriate menu option.

In the described embodiments, the user inputs an instruction to the cellular phone by accessing a menu option. Examples of user instructions are activating the monitor mode or power-save mode, accessing a web page corresponding to a received web page identifier or instructing the cellular phone to access automatically the web page corresponding to a received web page identifier. Instead of or in addition to such a "soft key" arrangement for entering instructions, the cellular phone could include one or more "hard keys" associated with the acoustic data channel, i.e. dedicated keys provided on the cellular phone which are each associated with a corresponding instruction. These "hard keys" could be either pre-configured during manufacture of the cellular phone or programmed by the user of the cellular phone. In an alternative embodiment, the cellular phone includes voice recognition software so that instructions can be entered by a user speaking an associated word or phrase into the microphone of the cellular phone.

In the first to seventh embodiments, the data encoded within the audio track of a television programme relates to a web page. Alternatively, the data encoded within the audio track of a television programme could be related to, for example, the title of a musical track being played on the television. This title can then be displayed by the cellular phone. Alternatively, telephone numbers could be encoded within the audio track of a television programme, for example a "prize" telephone number could be encoded which can be automatically dialled during a broadcast to enter a competition.

The acoustic data channel could also be used to transmit gaming information to the cellular phone. For example, for computer games played on the cellular phone which have a multi-level structure with each level being accessed by a password, the passwords could be encoded within an audio track so that they can be downloaded to the cellular phone, via the acoustic data channel, in order to allow access to respective levels. The audio track could be, for example, the audio track of a film associated with the computer game so that people who have seen the film can have access to one or more levels of the computer game. Alternatively clues or tips related to a computer game could be encoded within an audio track.

In another alternative application, the data signal F(t) encoded within the audio track of a television programme or a radio programme could convey audience survey data identifying the programme being watched and/or listened to by the user of the cellular phone. The use of a cellular phone for audience survey is advantageous for three main reasons. Firstly, the user of a cellular phone tends to carry the cellular phone on their person. The collected audience survey data is therefore associated with a user, rather than a television set or radio as in most automated audience survey systems. Secondly, the cellular phone is able to send the audience survey data for the user automatically, using the cellular communications network, to a remote database where audience survey data from many users is collated and analysed. This provides a simple mechanism for collecting the audience survey data without requiring user involvement. Thirdly, by incorporating the audience survey operation within a cellular phone which the user normally has either on their person or nearby, the user is less aware of the audience survey being performed than if the user has to carry a dedicated audience survey device about on their person, even if the user knows that the cellular phone is collecting audience survey data. This alleviates a common problem with audience surveys that users alter their viewing and/or listening habits in view of the audience survey.

In a preferred embodiment of the audience survey application, as each item of audience survey data is received by the cellular phone it is immediately downloaded, via the cellular telecommunications network, to an audience survey station where it is stored in an audience survey database. In this embodiment, the data signal is only a channel identifier for the radio station being listened to or the television channel being watched rather than an identifier for a particular programme.

FIG. 36 shows the main components of the audience survey station 551 for this preferred embodiment. The audience survey station 551 receives an audience survey signal, via a telecommunications network, conveying the phone number of the cellular phone and the channel identifier. The received audience survey signal is input to a controller 553 which retrieves the channel identifier and, using a time signal from a time signal generator 555, determines from a programme database 557 the programme currently being watched by the user of the cellular phone. In particular, the programme database stores the programmes for each channel identifier for each time and therefore the programme being watched can be determined from the time signal and channel identifier. The controller 553 then stores, in the audience survey database 559, data corresponding to the user, who is identified by the telephone number of the cellular phone, and the television programme being watched by the user. In this way, an almost instantaneous result for the audience survey is produced.

The acoustic data channel could also be used for opinion polling. For example, a television programme about a subject could have encoded within its audio track questions about the subject which are displayed by the cellular phone. The user is then able to input an answer to the cellular phone which automatically forwards the answer to a remote site where it is collated along with answers from other cellular phones. An advantage of such opinion polling is that the user of the cellular phone only has to press a button to answer a question and therefore it requires less effort by the user than other telephone opinion polls in which the user has to dial a telephone number, wait for connection and then give a response. This will encourage more people to participate in the opinion poll. For the above example where the opinion poll is associated with a television programme, the result can be given during the television programme. This is an example of how the acoustic data channel can be used to "close the loop" from a broadcaster to a viewer/listener (via a media broadcast) and from the viewer/listener back to the broadcaster (via a telecommunications network).

In another application, data for a quiz is transmitted to the cellular phone using the acoustic data channel. For example, a question is broadcast and detected by a plurality of cellular phones. The respective users of the cellular phones input their answers which are transmitted, via the cellular communications network, back to the originator of the question. A prize could then be awarded for the fastest answer.

In preferred embodiments, the data transmitted by the cellular phone is enhanced by adding user profile data stored in the cellular phone. This is particularly useful for the audience survey and opinion polling applications described above because the collected data can be analysed in accordance with user characteristics contained in the user profile data. For example, if the user profile data specified the age of the user then the audience survey station could determine the age profile of the audience of a television/radio programme.

Those skilled in the art will appreciate that cellular phones which can determine their position are known. For example, the location of a cellular phone can be determined to within five kilometers by identifying the base station of the cellular communications network which is handling the RF communications with the cellular phone. More precise techniques are known, for example the Enhanced Observed Time Difference (EOTD) technique which is described in U.S. Pat. No. 6,094,168, whose contents are hereby incorporated by reference, and can determine the position of the cellular phone to within about one hundred meters. Alternatively, the cellular phone could use a Global Positioning System (GPS) or other satellite based systems to determine its position to within about ten meters by analysing RF signals received from satellites. Therefore, data transmitted by the cellular phone can be enhanced with location data calculated by the cellular phone instead of, or in addition to, the user profile data. In this way, for example, an audience survey station could determine the geographical distribution of the audience for a television/radio programme.

An advantage of sending enhanced data including data which is either stored in the cellular phone, for example the user profile data, or calculated by the cellular phone, for example location data, is that no additional effort is required by the user.

In a further alternative application, the encoder is incorporated within a public address system, for example in an airport or a railway station, and the text of an announcement made over the public address system is encoded within the acoustic signal conveying the announcement. Then, if a user does not hear the announcement, the text of the announcement can be displayed to the user by the user's cellular phone.

In a further application, the data signal added to a broadcast audio track includes a source identifier and a time stamp. The user of a cellular phone including a decoder for decoding the data signal is then able to transmit, via the cellular communications network, the source identifier and the time stamp to a remote server which stores a database identifying for each combination of source identifier and time stamp the title of the music being played. The remote server then transmits the title associated with the received source identifier and time stamp to the cellular phone which displays the title to the user of the cellular phone. For example, if a radio station is playing a song having a data signal encoded therein with a source identifier identifying the radio station and a time stamp identifying the track number of the song being played (e.g. the tenth song played by that radio station that day), then the user can download from the remote server the title of the song. Alternatively, the audio track may be a song in a film and the source identifier identifies the film and the time stamp identifies where in the film the song is being played. It will be appreciated that this application could also be performed by any device having a decoder for decoding data sent over an acoustic data channel, a data link via which the device is able to access a telecommunications network, and a display for displaying the title of the song. In an embodiment, the device is removably connectable to a personal computer which is in turn connected to a telecommunications network via a modem.

In the first to seventh embodiments, a data signal is encoded within an audio track of a television programme in a television studio. This encoding need not, however, occur prior to the broadcasting of the television signal. For example, the data signal could be carried within the vertical blanking intervals of the video track and either a television set or a "set-top box" could then extract the data signal from the video track and encode it within the audio track. The encoder need not, therefore, be in the television studio but could also, for example, be in a television or a set-top box.

The acoustic data channel could also be used to transmit messages which are either broadcast or selectively addressed to particular cellular phones. In an embodiment, the cellular phone includes an acoustic-only mode in which the RF output is disabled but the phone is still able to detect and analyse acoustic signals to recover data. This is particularly advantageous for transmitting messages in areas where, for safety reasons, cellular phones cannot normally be used because of their RF emissions. Examples of such areas include airports, petrol stations and hospitals.

The acoustic data channel for transmitting messages could be formed by any commonly encountered audio source. For example, the audio track of a television/radio programme or the output of a public address system could be used. In a particular application, the public address system within a shop is used to transmit message data about, for example, special offers available in the shop.

The ability to encode data which is specific to a particular geographical area is useful. For example, a television programme could be broadcast by several different television companies covering different geographical areas. The data encoded within the television programme could therefore be varied from area to area. In this way, if the data is associated with contact addresses, then the data encoded within the television programme for each television station could be associated with only the contact addresses within the geographical area covered by the television station. This is advantageous because it reduces the amount of data sent to the user by automatically removing data which is unlikely to be relevant.

The data encoded within the audio track could also be used to control the operation of the cellular phone. For example, in locations such as cinemas, aeroplanes and petrol stations where cellular phones should not be used, a data signal can be broadcast to the cellular phone which either switches the cellular phone off or puts it into a silent mode as appropriate.

In one application, the data encoded within the audio track is for a ring tone for the cellular phone, which responds by storing the ring tone data in a NVRAM (or other type of non-volatile memory) within the cellular phone. The ring tone generator of the cellular phone can then generate a ring tone corresponding to the stored ring tone data. In an embodiment, a recorded song has encoded therein data for a ring tone sounding like a segment of the song, and the cellular phone decodes the ring tone so that the ring tone of the cellular phone can be set to sound like the song.

In another application, the data for an icon is encoded within the audio track for decoding by the cellular phone. The icon can then either be displayed by the cellular phone or included in data messages to other cellular phones.

The acoustic data channel could be used to transmit small application files for the cellular phone. For example, for "Java phones" small application files commonly referred to as APPlets (sometimes referred to as MIDlets) could be received by the cellular phone via the acoustic data channel. The acoustic data channel could also be used to trigger an application file which has already been downloaded onto the cellular phone. For example, a Java phone could have stored an APPlet for displaying an animation sequence and the APPlet could be activated, and the animation sequence accordingly displayed, in response to a trigger signal received via the acoustic data channel.

Applications files could also be downloaded into the cellular phone corresponding to computer characters whose behaviour varies in response to a user's actions. In particular, a "behaviour" algorithm within the application file determines the actions of the computer character on the basis of inputs by the user of the cellular phone. The user is therefore able to nurture the behaviour of the computer character. Such computer characters are known, for example Tamagochi. The acoustic data channel could then be used to convey control data which modify the behaviour algorithm of a computer character so that the behaviour of the computer character reacts to events occurring around the user of the cellular phone. For example, a horror film could have control data encoded within its sound track which makes the computer character behave in a manner indicative of being agitated or scared. In this way, the computer character is able to react to external events.

In all the above applications and embodiments, a single acoustic data channel is provided for a cellular phone. However, more than one acoustic data channel could be provided. For example, if spread spectrum encoding is used then different pseudo-noise codes could be allocated to each acoustic data channel (i.e. a code division multiple access (CDMA) arrangement).

Application files containing pseudo-noise codes for establishing an acoustic data channel and configuration instructions for responding to data received via that acoustic data channel could also be downloaded into the cellular phone. For example, the acoustic data channel corresponding to an application file could be associated with a particular company who send proprietary web page identifiers via the acoustic data channel, and the cellular phone responds by forwarding the proprietary web page identifiers to a server operated by the company. A cellular phone could have more than one of these application files stored therein, with the user being able to select one of the application files, and therefore the pseudo-noise codes used for decoding a detected acoustic signal, using a menu.

In an embodiment, a acoustic control channel is provided which uses pseudo-noise codes which are programmed within the cellular phones during manufacture. Subsequently, an application file containing pseudo-noise codes for establishing an additional acoustic data channel and configuration instructions for responding to data received via the additional data channel, are transmitted over the acoustic control channel. In an alternative embodiment, the application file is downloaded via the cellular communications network.

A problem with transmitting data acoustically is that the data transmission rates are generally slow, especially if it is desired to minimise the obtrusiveness of the acoustic data signal to a listener. For any application which requires the downloading of a significant amount of data, for example an APPlet file, this problem can be at least partially solved by transmitting a web page address, which requires significantly less data, for a web page from which the data is downloadable, using for example the Wireless Applications Protocol, via the cellular communications network. Alternatively the data could be downloaded using e-mail. Further, it is not essential that the data is downloaded from a web page because it could be downloaded from any information source accessible via the cellular communications network.

As the bandwidth required to transmit an electrical signal conveying an original audio track modified by having a data signal encoded therein is no more than required for transmitting an electrical signal conveying the original audio track, during a call a cellular phone could encode a data signal within the outgoing RF signals conveying voice data for receipt by another cellular phone which retrieves the data signal from the received voice data. The data signal could, for example, correspond to a business card.

In all the above described applications and embodiments, the cellular phone or other telephone apparatus comprises either an encoder for encoding a data signal within an audio track, or a decoder for decoding a data signal within an electrical signal corresponding to a detected acoustic signal or both an encoder and a decoder. However, this is not essential because a conventional telephone apparatus could be used which either receives from a remote device having an encoder, via a telecommunications network, an audio track which already has a data signal encoded within it for outputting by the telephone apparatus as an acoustic signal, or could transmit, via the telecommunications network, an electrical signal corresponding to a detected acoustic signal to a remote device having a decoder.

The eighth, ninth and tenth embodiments describe systems in which a cellular phone encodes a data signal within an acoustic signal emitted by the cellular phone for detection by an electronic device. In the eighth and tenth embodiments, the data signal is encoded in a preset audio sequence whose only purpose is to alert the user that a data transfer is taking place. This preset audio sequence is therefore not essential and the spread data signal could be directly output.

In the eighth embodiment, user data is transmitted between two cellular phones using the acoustic data channel. Alternatively, the acoustic data channel could be used to enable two cellular phones to interact with each other. In an embodiment, an interactive game is provided which allows two players to play against each other using their respective cellular phones with data being transmitted between the cellular phones using the acoustic data channel. For example, the interactive game could be a chess game which has the advantage that only a small amount of data need be transmitted between the two cellular phones.

In the ninth and tenth embodiments, the control signals are used to activate corresponding routines within the electronic device. However, those skilled in the art will appreciate that the control signals could themselves convey the routines which are implemented by the electronic device. For example, the control signal could convey information enabling a speech synthesiser located within the electronic device to produce a desired sound, for example a word or phrase.

In the ninth and tenth embodiments, the control signals emitted by the cellular phone are used to control a toy. Those skilled in the art will appreciate that the control signals could control devices other than toys. For example, the cellular phone could be used as a remote control device so that by inputting instructions into the cellular phone, acoustic control signals are output for controlling a television, a home entertainment system, an airconditioning unit or another home appliance.

The cellular phone can also be used to store credits, in which case a portion of either the RAM or NVRAM is dedicated to storing a value indicative of the number of credits held by the user of the cellular phone. These credits can be downloaded into the cellular phone either via the conventional cellular communications network or via the acoustic data channel. The cellular phone can then output, via the acoustic data channel, control signals to vending appliances in order to purchase goods. The credits stored in the cellular phone could be accrued on a loyalty basis. For example, each time a user of the cellular phone goes to a particular cinema chain, a device within the cinema sends, via the acoustic data channel, a credit to the cellular phone, which in response increments the number of stored credits by one. When the number of credits stored in the cellular phone reaches a predetermined number the cellular phone can emit a control signal, via the acoustic data channel, which reduces the price of a cinema ticket.

The cellular phone could be used to store an electronic boarding card for an airflight. Alternatively, the cellular phone could receive electronic tickets, via the acoustic data channel, for other public transport systems such as rail or coach. The cellular phone could also emit a signal, via the acoustic data channel, which controls ticket barriers provided in a public transport system when the cellular phone is storing an electronic ticket.

The cellular phone could also interact via the acoustic data channel with a network device connected to a network other than a cellular communications network, for example a Bluetooth network. In this way, the cellular phone can communicate with remote devices via networks other than the cellular communications network.

In some of the above embodiments, SMS messages are used to convey data to or from the cellular phone. Other alternative RF data transmission techniques could be used, for example EMS messaging and MMS messaging.

Those skilled in the art will appreciate that the novel encoding and decoding techniques described in the first to tenth embodiments could also be used in applications which do not involve a telephone. For example, the described encoding and decoding techniques could be used in a toy system such as that described in International Patent Publication WO 01/10065, the contents of which are hereby incorporated by reference. FIG. 37 shows the main components of such a toy system. In FIG. 37, the television broadcast system is identical to that of the first embodiment and has therefore been referenced using the same numerals as in the first embodiment. Further, the electronic toy is identical to that of the ninth and tenth embodiments and has therefore been referenced using the same numerals as in the ninth and tenth embodiments. In this toy system, the data signal F(t) is a control signal for the electronic toy 425 and, on detecting the acoustic signal conveying the control signal, the electronic toy 425 alters its expression and outputs an associated sound.

In another embodiment, the electronic toy 425 further includes a user interface, for example a keyboard, via which a user can input information into the electronic toy. This allows the user to interact with a television programme or the like via the electronic toy. For example, the television programme may be a quiz show and when a question is broadcast, the answer could be digitally encoded within the audio track corresponding to the question so that it can be decoded by the decoder within the electronic toy. The user then enters an answer to the question into the electronic toy, via the user interface, and the electronic toy compares the user's answer with the answer recovered from the audio track. The electronic toy then responds in dependence upon whether the user's answer is correct or not by, for example, smiling if the answer is correct and frowning if the answer is not.

Preferably, the electronic toy is able to send the user's answer to a question to the programme maker of the quiz show via a telecommunications network. For example, if the television programme is broadcast on a digital network the user's answer can be directly sent over the same network as used for broadcasting the television programme. If the electronic toy includes a timer for timing how long the user took to enter the answer, then details of this time could be sent to the programme maker of the quiz show which could then award a prize to the person who responds the quickest with the correct answer. It will be appreciated that for this type of three-way interaction (i.e. between a television programme, an electronic toy and a user), the electronic toy could be replaced by any object having suitable circuitry for decoding data sent using the acoustic data channel and for processing the data received via the acoustic data channel and the user interface.

Although hardware encoders are used in the described embodiments, those skilled in the art will appreciate that the function of these hardware encoders could also be performed by a computer apparatus running appropriate software. Similarly, the function of the software decoder of the first to sixth embodiments could be implemented in a hardware decoder and the function of the hardware decoder of the seventh to tenth embodiments could be implemented by a software decoder.

The invention therefore also extends to computer programs, particularly computer programs on or in a carrier, adapted for putting the invention into practice. The program may be in the form of source code, object code, a code intermediate source and object code such as in partially compiled form, or in any other form suitable for use in the implementation of the processes according to the invention.

The carrier may be any entity or device capable of carrying the program. For example, the carrier may comprise a storage medium such as a ROM, for example a CD-ROM or a semiconductor ROM, or a magnetic recording medium, for example a floppy disk or hard disk. Further, the carrier may be a transmissible carrier such as an electrical or optical signal which may be conveyed via electrical or optical cable or by radio or other means.

When the program is embodied in a signal which may be conveyed directly by a cable or other device or means, the carrier may be constituted by such cable or other device or means. Alternatively, the carrier may be an integrated circuit in which the program is embedded, the integrated circuit being adapted for performing, or for use in the performance of, the relevant processes.

Those skilled in the art will appreciate that the invention can be applied to cellular phones which do not conform with the GSM specification. Further, web page data can be retrieved using protocols other than the Wireless Application Protocol.

The first to seventh embodiments describe seven different encoders. Those skilled in the art will appreciate that any of these seven encoders could be used in the above described further embodiments and applications.

In an embodiment, the data signal generator and the encoder are in physically separated units, and the data signal is input to an input port of the encoder unit. In an alternative embodiment, the encoder and the decoder could be housed in the same unit (i.e. share a common housing).

Those skilled in the art will appreciate that the wavelet transforms used in the second embodiment can replace the Fourier transforms used in the third to tenth embodiments.

In the third embodiment, the carrier frequency used in the modulator is varied so that the centre frequency of the spread data signal is positioned in a relatively high energy portion of the audio track. In particular, the energy in 2048 frequency sub-bands is monitored and the carrier frequency of the modulator varied accordingly. In an alternative embodiment, the number of frequency sub-bands could be reduced, for example to eight, in order to reduce the amount of processing required.

In the decoder for the third embodiment, the received audio track is analysed to determine the carrier frequency used in the modulator in the encoder. However, if the encoder uses a small number of frequency sub-bands, and therefore only a small number of carrier frequencies are possible, then in an alternative embodiment the demodulator in the decoder passes the received audio track through a number of separate channels with each channel using a respective one of the possible carrier frequencies, and subsequently determines which channel provides the strongest signal in order to recover the data signal. This has the advantage over determining the carrier frequency from the received audio track that if the audio track is altered by the communication channel between the encoder and the decoder then the data signal is still correctly recovered.

In the fourth embodiment, a linear predictive coding (LPC) algorithm is used to separate the audio track into a tonal part, whose values are determinable from each other, and a noise part, whose values are apparently random. Alternatively, other auto-regressive algorithms could be used to isolate a random part of the audio track which can be at least partially replaced by a shaped spread spectrum signal. Further, the frequency spectrum of the audio track could be analysed to identify tonal components which are subsequently removed to separate the tonal part and the noise part.

In the fifth embodiment, the tonality of the audio track is determined by analysing the frequency spectrum of the audio track. Alternatively, the tonality could be determined by applying a time series model, for example an LPC model, having a fixed number of coefficients and determining the power in the modelled signal corresponding to the coefficients.

In the sixth embodiment, the number of LP coefficients, the level of the psycho-acoustic encoding and the gain factor G used in the variable combiner are selected by a user. Alternatively, one or two or all three of these variables could be automatically set by the encoder. For example, the number of LP coefficients used could be determined from the tonality of the audio track.

In the sixth embodiment, the noise part N(t) and the shaped signal S(t) are input to a variable combiner, and the output of the variable combiner is added to the tonal part P(t) to form the modified audio track. Alternatively, the original audio track could be input to the variable combiner instead of the noise part N(t), as in the fourth embodiment, so that the output of the variable combiner forms the modified audio track and the LPC analysis is only used for shaping the modulated signal G(t). In other words, the modulated signal G(t) is shaped to approximate the noise part N(t) of an audio track to form a shaped signal S(t), and then the shaped signal S(t) is added directly to the audio track in a variable combiner. In an embodiment, the gain factor G for the variable combiner is automatically set so that the signal to noise ratio of the data signal in the modified audio track is within a predetermined range, for example between −10 and −15 dB. The signal to noise ratio can be calculated by inputting the shaped data signal S(t) into a first power monitor, inputting the audio track into a second power monitor, and then dividing the power in the shaped data signal by the total power level obtained by adding the power in the audio track and the power in the shaped data signal. Alternatively, the signal to noise ratio could be calculated by dividing the power in the shaped data signal by the power in the audio track.

Those skilled in the art will appreciate that for some applications the described shaping techniques for shaping the data signal to reduce the obtrusiveness of the data signal in the modified audio track are not required because it is not essential for the audio track to be reproduced at high quality.

In addition, the encoder of the sixth embodiment could be modified to remove the variable combiner, in which case the signal shaped using the psycho-acoustic algorithm is added directly to the tonal part of the audio track.

For automated encoders which do not require a user input, the encoding can be carried out in real-time and therefore is suitable for, for example, real-time addition to television broadcasts or public address announcements.

In the seventh embodiment, the encoder separates a single data signal into one or more data streams dependent upon the ability of the audio track to hide the data signals. In particular, in the seventh embodiment the additional data streams are sent in parallel with the bit rate of each data stream being the same regardless of the number of data streams.

Alternatively, the data rate could be varied by increasing the bit rate for a single data stream while maintaining the same chip rate so that fewer chips are used per bit. In an embodiment, for higher data rate transmission the bit rate is doubled and only the first half of the pseudo-noise code sequences PN0 and PN1 of the seventh embodiment is used to spread the data bits. This has the advantage that a high data rate decoder could be provided which, although it would only be able to decode data transmitted at the higher data rate, only needs to store the first half of each of the pseudo-noise codes PN0 and PN1.

In another embodiment, for higher data rate transmission the bit rate is doubled and for each sequence of two bits one is represented by the first half of one of the pseudo-noise codes sequences PN0 and PN1 and the other is represented by the second half of one of the pseudo-noise code sequences PN0 and PN1. This has the advantage that the pseudo-noise codes are sequentially repeated over their maximal length rather than having to be reset for every new bit.

In applications where an electronic device responds to the data signal encoded within the modified audio track, if the response of the electronic device is required to be synchronised with the audio track then the variable data rate techniques described above could disrupt this synchronisation. In order to allow the decoder to recover synchronisation of the data signal and the audio track, the encoder could encode timing data in the data signal indicative of the required synchronisation. An embodiment of such an encoder will now be described with reference to FIG. 38 which illustrates an alternative data rate determining unit 571 to replace the data rate determining unit 235 of the seventh embodiment. In FIG. 38 components which are identical to corresponding components in the seventh embodiment have been referenced with the same numerals.

As shown in FIG. 38, in the data rate determining unit 571 the audio track is input to a spectrum analyser 573 which monitors the power of the audio track within the frequency range of 1 to 5 kHz. In particular, the average power level in the monitored frequency band over a time period of five seconds is determined. The spectrum analyser 573 outputs a signal which varies in accordance with the determined average power level to a timing encoder 575 and the output generator 265. The modified data stream M'(t) is input to the timing encoder 575 via the FIFO memory 261.

If the average power level output by the spectrum analyser 573 is high, then the data rate determining unit 571 uses the opportunity to send as much data as possible and therefore time synchronisation between the data signal and the audio track is lost. However, the timing encoder 575 determines, using the average power level output by the spectrum analyser 573, the amount of this synchronisation loss and encodes timing data within the modified data signal M'(t) which enables a decoder to retrieve time synchronisation between the data signal and the audio track. The output generator then outputs either one, two or three data streams as described in the seventh embodiment.

The operation of the data rate determining unit 571 will now be explained with reference to FIGS. 39A to 39C. FIG. 39A shows an audio track having a large first peak 577a followed by a small second peak 577b and then a large third peak 577c. FIG. 39B shows a data signal which is synchronised with the audio track illustrated in FIG. 39A and has a series of three peaks 578a to 578b. The first and third data signal peaks 578a, 578c coincide with the large first and third audio track peaks 577a, 577c which effectively mask by the first and third data signal peaks 578a, 578c. However, the second data signal peak 578b coincides with the small second audio track peak 577b which cannot effectively mask the second data signal peak 578b. Therefore, as illustrated in FIG. 39C which shows the data signal output by the data rate determining unit 571, the data for the second data signal peak 578b is output at the same time as the data for the first data signal peak 578a, in a first peak 579a, along with timing data to enable a decoder to recover timing synchronisation between the data signal and the audio track. When combined with the audio track, the first peak 579a is masked by the first audio signal peak 577a.

In an alternative embodiment, synchronisation between the data signal and the audio track is maintained using timing data as described above, but the acoustic signal only conveys a single data stream whose chip rate is constant but whose volume is varied in dependence on the audio track.

Decoding is more straightforward if the chip rate is maintained constant for the different data rates because it is easier to maintain synchronisation between the received chip sequence and the pseudo-noise codes generated in the decoder. However, the chip rate could be varied in order to vary the bandwidth of the spread signal so that it is better masked by the audio track.

In an embodiment, the encoder varies the chip rate in accordance with the tonality of the audio track. If the audio track is very tonal then the encoder uses a low chip rate and varies the carrier frequency used during modulation, as described in the third embodiment, so that the spread data signal is masked within the tonal region of the audio track, while if the audio track has a broader frequency spectrum then the encoder uses a high chip rate. In this embodiment, the encoder determines the chip rate and carrier frequency used by analysing the audio track. Alternatively, in the decoder the received audio track could be passed through a number of channels with a respective different one of the possible chip rates being used in each channel, with the decoder then determining which channel provides the largest signal.

In the encoder of the tenth embodiment, the electronic toy 425 outputs a sound and alters its facial expression in accordance with a data signal encoded within the audio track of a television signal predominantly in the frequency range 0 to 4 kHz. This frequency range was chosen because nearly all loudspeakers work well in this frequency range. However, many loudspeakers work well up to much higher frequencies.

An alternative encoder 581 will now be described with reference to FIG. 40 in which only the data for controlling the sound output by the electronic toy 425 is centred in the frequency range 0 to 4 kHz, and the data for controlling the facial expression of the electronic toy 425 is centred in the frequency range 4 to 8 kHz. This is advantageous if, for example, the audio track is particularly quiet and is therefore unable to hide data for both controlling the facial expression and the output sound in the 0 to 4 kHz frequency band. In FIG. 40, components which are identical to corresponding components in FIG. 2 have been referenced with the same numerals.

As shown in FIG. 40, a first data signal $F_1(t)$ for controlling the sound output by the electronic toy 425 and a second data signal $F_2(t)$ for controlling the facial expression of the electronic toy 425 are input to respective channels of the encoder. The first data signal $F_1(t)$ is modified by a first FEC unit 51a, spread using first and second pseudo-noise codes PN0, PN1, and then modulated using a carrier frequency of 2 kHz by a first modulator 57 to form a first modulated signal $G_1(t)$. Similarly, the second data signal $F_2(t)$ is modified by a second FEC unit 51b, spread using third and fourth pseudo-noise codes PN2, PN3, and then modulated using a carrier frequency of 6 kHz by a second modulator 583 to form a second modulated signal $G_2(t)$. The first and second modulated signals are then added by an adder 585 before being input to the shaping unit 61.

When the modified audio track output by the encoder 581 illustrated in FIG. 40 is converted into an acoustic signal by a loudspeaker, if the loudspeaker works satisfactorily up to 7 kHz then the electronic toy will both output a sound and alter its facial expression. However, if a lower quality loudspeaker is used then the electronic toy will only output a sound because it is unable to decode the data signal for altering the facial expression.

Those skilled in the art will appreciate that the encoder 581 shown in FIG. 40 is particularly useful in applications where the first data signal $F_1(t)$ is a main data signal, which conveys the most important information, and the second data signal $F_2(t)$ is an auxiliary data signal, which conveys optional information. In this way the main data signal is reliably decoded even if the auxiliary data signal is not. Further, this concept can be extended to three or more information channels. For example, information could be transmitted in three separate frequency bands centred on 2 kHz, 5.5 kHz and 9 kHz respectively. If plural information channels are used, then the decoder could include a switch which determines which of the information channels is decoded.

In an alternative embodiment, N data signals are input to an encoder. The encoder analyses the audio track to determine its ability to hide data, and based on this analysis encodes M data signals (where M is less than or equal to N) of the N data signals within the audio track, with the number M varying as the ability of the audio track to hide data varies.

Those skilled in the art will also appreciate that the alternative decoding techniques described in WO 01/10065 can be used in the first to tenth embodiments.

In the described embodiments, the data signal F(t) is continuously added to the audio track. Alternatively, the encoder could identify the portions of the audio track which are better suited to hiding the data signal and then only encode data in those identified portions. In an embodiment, the audio track is input to a spectrum analyser which determines the tonality of the audio track (for example the spectrum analyser 201 of the fifth embodiment) and only adds the data signal in the portions of the audio track for which the tonality is below a predetermined level. In another embodiment, the encoder determines which portions are better suited to hide the data signal based on the power of the audio track, while in yet another embodiment the encoder determines the portions based on a combination of the power and tonality.

As described above, in some applications control data for synchronising an operation of a cellular phone with a broadcast audio signal, for example for a television program or a radio program, is encoded within the audio signal and the acoustic wave corresponding to the audio signal is detected by a cellular phone which decodes the control data and responds with the required synchronisation. A problem with such synchronised systems is that sometimes the audio track at the moment the response by the cellular phone is required is too quiet to hide the control data effectively. This problem can be alleviated by sending the control data in advance during a louder portion of the audio track along with timing data indicating the timing when the cellular phone should respond in accordance with the control data. Then, in the quieter portion of the audio track when the response takes place, no data need be transmitted.

The timing data need not be transmitted simultaneously with control data, but could be transmitted separately. For example, at the beginning of a data signal conveying a sequence of control data, timing data could be transmitted indicating that the response to each item of control data is to be delayed for a preset period of time. Although the time delay is not optimised for each item of control data, sending timing data in this way reduces the total amount of data which needs to be sent.

In the described embodiments, the data signal is spread over audible frequencies using DSSS encoding. As those skilled in the art will appreciate, signals encoded using DSSS encoding can be decoded in two main ways. In one way, the encoded signal is synchronously multiplied by the same pseudo-noise code which was used to encode the signal, a technique commonly referred to as coherent detection. In the other way, a correlator such as a matched filter is used to correlate the encoded signal with the pseudo-noise code which was used to encode the signal, a technique commonly referred to as incoherent detection.

In the described embodiments, a data bit whose value is "0" is represented by a pseudo-noise code PN0 and a data bit whose value is "1" is represented by a pseudo-noise code PN1. Those skilled in the art will appreciate that if coherent decoding is used, then the pseudo-noise code PN0 can be the inverse of pseudo-noise code PN1.

In an embodiment, a first plurality of pseudo-noise codes are provided for representing a data bit whose value is "0" and a second plurality of pseudo-noise codes are provided for representing a data bit whose value is "1". The choice of which pseudo-noise code is used to encode a data bit can then be based upon which pseudo-noise code produces a data signal which is the least perceptible when added to an audio track. Subsequently, the decoder could either analyse the audio track to determine which pseudo-noise code had been used or decode the received audio track using all possible pseudo-noise codes. Decoding using all possible pseudo-noise codes has the advantage that the decoding is more robust if the audio track is altered by the communication channel between the encoder and the decoder. However, if there are a large number of pseudo-noise codes then analysing the audio track to determine which pseudo-noise code was used requires less processing power.

The described embodiments utilise a SYNC bit which is added to the data signal to help the decoder decode the data signal. Preferably, the SYNC bit is added to the audio track with a higher signal level than the other data bits of the data signal to improve the ability of the decoder to decode the data signal. Further, if the signal level of the SYNC bit is increased, the decoder is able to reduce the number of chips within the chip sequence corresponding to the SYNC bit which are being monitored to achieve synchronisation. Those skilled in the art will appreciate that the signal level of the SYNC bit could be increased by requiring the signal-to-noise ratio of the data signal in the modified audio track to be greater for a portion of the data signal corresponding to a SYNC bit than for the rest of the data signal.

In some of the described embodiments, the signal level of the data within the audio track is varied, for example by varying the number of data streams or by amplifying the SYNC bits. In these embodiments, preferably the signal level is smoothly or gradually varied, for example following a Gaussian function, because this reduces the obtrusiveness of the data within the audio track.

The energy of a data signal can be spread over a wide range of frequencies by using techniques other than DSSS encoding. For example, an Orthogonal Frequency Division Modulation (OFDM) technique can be used in which, for example, 256 narrow-band orthogonal carriers carry identical data. These 256 narrow-band carriers are evenly distributed in the frequency range of 1 to 5 kHz and thus spreading of the energy of the data signal is achieved. The original data signal can then be reconstructed by demodulating the recombining each of the narrow-band signals.

It will be appreciated by a person skilled in the art that still further techniques could be used to spread the energy of the data signal. For example, frequency hopping could be used in which the frequency of the modulated data signal is changed in a random manner.

Although spread spectrum encoding is preferred because it reduces the noticeability of the acoustic data channel to a listener, it is not an essential feature of the invention. The acoustic data channel could also be formed, for example, by using a dedicated narrow frequency range. Alternatively, a data signal could be encoded within an audio track by systematically modifying either frequency or time information within the audio track. For example, an echo modulation scheme could be used in which an echo signal is added with a time delay which is varied in accordance with a data signal. Alternatively, a critical band encoding technique could be used in which each data value is associated with a respective set of narrow-band frequencies.

In another embodiment, the acoustic data channel uses an ultrasonic link which has the advantage that it is not audible to the user of the cellular phone.

In the first to eighth embodiments, phase shift keying is used to modulate the spread data signal. Those skilled in the art will appreciate that other modulation schemes, for example frequency shift keying or quadrature amplitude modulation, could be used instead.

For ease of explanation, the data signal in the described embodiments has been encoded within a single channel audio track. However, the data signal could also be encoded within a stereo audio track having two or more channels. The data signal can be added synchronously to more than one channel of the stereo audio track or with a time offset of, for example, 150 ms between the channels. Introducing a time offset has the advantage of adding an additional level of time diversity, thereby enabling a more robust regeneration of the data signal because there is less chance of losing data due to background noise (i.e. noise which is not the modified audio track). Alternatively, two different broadband signals could be generated with each one being added to a respective channel of the stereo audio track.

Alternatively, for a multi-channel audio track, the data signal need not ne encoded in every channel of the audio track. For example, for a television programme in which one channel of the audio track carries voice data and another channel of the audio track carries background music data, the data signal could be added only to the channel carrying background music data.

In some embodiments, a psycho-acoustic algorithm is used to reduce the obtrusiveness of the data signal within the modified audio track. However, a psycho-acoustic algorithm is not essential and could be replaced by a simpler algorithm which requires less processing power.

Those skilled in the art will appreciate that conventional equalisation techniques, for example using a rake receiver, can be applied in the decoder to improve the bit error rate in the presence of multi-path components or frequency response impairments. Further, an automatic gain control circuit could be included at the input of the decoder.

The precise values of the bit rates, chip rates, sampling rates and modulation frequencies described in the detailed embodiments are not essential features of the invention and can be varied without departing from the invention. Further, while in the described embodiments the data signal is a binary signal, the data signal could be any narrow band signal, for example a modulated signal in which frequency shift keying has been used to represent a "1" data bit by a first frequency and a "0" data bit as second different frequency. Further, those skilled in the art will appreciate that the order in which the spreading, modulating and shaping is performed in the encoder can be varied. Although digital signal processing techniques have been described as the preferred implementation of the invention, analogue processing techniques could be used instead.

As those skilled in the art will appreciate, the sampling rate of 22.05 kHz matches that used for one channel of a compact disc and therefore the encoders and decoders described for these embodiments are suitable for use in systems where a data signal is conveyed by an audio track recorded on a compact disc. A sampling rate of 44.1 kHz could also be used for recording the data signal on a compact disc, and a sampling rate of 48 kHz could be used for recording a data signal on a DVD.

It will be appreciated that the term audio track refers to an electrical signal which is intended to be reproduced as a corresponding acoustic signal by a loudspeaker in the audible range of frequencies, which typically spans from 20 Hz to 20,000 Hz. The duration of the audio track can be short, for example the ring tone of a cellular phone or doorbell, or long, for example the soundtrack to a movie.

The cellular phone used in the above embodiment could be replaced by a different cellular communication device such as a pager. Further, the cellular phone could be replaced by a different mobile internet device, such as a laptop computer, a portable web browser or a personal digital assistant (PDA).

The invention claimed is:

1. An apparatus for shaping a data signal for embedding within an audio signal, the apparatus comprising:
   a first receiver operable to receive the data signal;
   a second receiver operable to receive the audio signal;
   a time series modeler operable to apply a time series model to the audio signal in order to generate a plurality of coefficients indicative of the audio signal;
   a synthesizer operable to synthesize a time domain tonal signal using the generated coefficients;
   a subtractor operable to difference the synthesized tonal signal and the audio signal to generate a time domain residual signal; and
   a shaper operable to shape the spectrum of the data signal in dependence upon the residual signal to form a shaped data signal.

2. An apparatus according to claim 1, wherein the time series modeler is operable to perform linear predictive coding in order to generate said coefficients.

3. An apparatus according to claim 1, further comprising a modifier operable to modify the time series model in order to vary the number of coefficients generated by said time series modeler.

4. An apparatus according to claim 3, in which the modifier comprises a user interface, wherein the modifier is operable to vary the number of generated coefficients in accordance with a user signal received via the user interface.

5. An apparatus according to claim 3, in which the modifier comprises a tonality determiner operable to determine a level of tonality of the audio signal, wherein the modifier is operable to vary the number of generated coefficients in dependence upon the determined level of tonality.

6. An apparatus according to claim 1, wherein the data signal has a data signal spectrum and the shaper comprises:
   a spectrum analyser operable to analyse the spectrum of the residual signal to generate a plurality of frequency-dependent coefficients;
   a scaling factors generator operable to generate a plurality of scaling factors using the plurality of frequency-dependent coefficients; and
   an adjuster operable to adjust the data signal spectrum using the plurality of scaling factors to generate the shaped data signal.

7. An apparatus according to claim 6, wherein the spectrum analyser is a first spectrum analyser and is operable to generate a first plurality of frequency-dependent coefficients, and the adjuster comprises:
   a second spectrum analyser operable to analyse the spectrum of the data signal to generate a second plurality of frequency-dependent coefficients;
   a scaler operable to scale the second plurality of frequency-dependent coefficients using the plurality of scaling factors to generate a plurality of scaled coefficients; and
   a synthesizer operable to synthesize the shaped data signal using the plurality of scaled coefficients.

8. An apparatus according to claim 7, wherein the first and second spectrum analysers are operable to perform a Fourier transform.

9. An apparatus according to claim 7, wherein the first and second spectrum analysers are operable to perform a wavelet transform.

10. An apparatus according to claim 7, wherein the scaling factors generator is operable to perform a psycho-acoustic analysis of the first plurality of frequency dependent coefficients.

11. An apparatus according to claim 10, wherein the scaling factors generator comprises a psycho-acoustic filter for performing the psycho-acoustic analysis.

12. An apparatus according to claim 11, wherein the psycho-acoustic filter has a variable bandwidth, and wherein said scaling factors generator comprises an adjuster operable to vary the variable bandwidth of the psycho-acoustic filter.

13. An apparatus according to claim 12, wherein said adjuster comprises a user interface and a setter operable to set the bandwidth of the psycho-acoustic filter in accordance with a user input received via the user interface.

14. An apparatus according to claim 12, wherein the adjuster comprises:
   a tonality determiner operable to determine a level of tonality of the residual signal; and
   an adjuster operable to set the bandwidth of the psycho-acoustic filer in dependence upon the determined level of tonality.

15. An apparatus according to claim 1, wherein the data signal has a data signal spectrum, the residual signal has a residual signal spectrum, and the shaper is arranged to shape the data signal spectrum to match the residual signal spectrum.

16. An apparatus according to claim 1, wherein the shaper is arranged to shape the data signal so that the temporal profile of the shaped data signal substantially matches the temporal profile of the residual signal.

17. An apparatus according to claim 1, further comprising a data spreader operable to spread the data signal to generate a spread data signal having a spread spectrum,
   wherein the shaper is operable to shape the spread spectrum in dependence upon the residual signal to form the shaped data signal.

18. An apparatus according to claim 17, in which the data spreader comprises a first pseudo-noise code generator operable to generate a first pseudo-noise code,
   wherein the data spreader is operable to perform direct sequence spread spectrum encoding using the first pseudo-noise code.

19. An apparatus according to claim 18, wherein the data signal comprises a sequence of data symbols, and wherein the data spreader is operable to combine each data symbol of the data signal with at least part of the first pseudo-noise code.

20. An apparatus according to claim 18, wherein the data signal comprises a sequence of data symbols,
   wherein the data spreader further comprises a second pseudo-noise code generator operable to generate a second pseudo-noise code which is different from the first pseudo-noise code, and
   wherein the data spreader is operable to represent each data symbol of the data signal by a code sequence from either the first pseudo-noise code or the second pseudo-noise code in dependence upon the value of the data element.

21. An apparatus according to claim 20, wherein the second pseudo-noise code generator is operable to generate a second pseudo-noise code which is substantially orthogonal to the first pseudo-noise code.

22. An apparatus for embedding a data signal within an audio signal, the apparatus comprising:
- a first receiver operable to receive the data signal;
- a second receiver operable to receive the audio signal;
- a time series modeler operable to apply a time series model to the audio signal in order to generate a plurality of coefficients indicative of the audio signal;
- a synthesizer operable to synthesize a time domain tonal signal using the generated coefficients;
- a subtractor operable to difference the synthesized tonal signal and the audio signal to generate a time domain residual signal;
- a sharper operable to shape the spectrum of the data signal in dependence upon the residual signal to form a shaped data signal; and
- a signal combiner operable to combine the shaped data signal and the audio signal to generate a modified audio signal.

23. An apparatus according to claim 22, wherein the signal combiner comprises an adder operable to add the shaped data signal and the audio signal to form the modified audio signal.

24. An apparatus according to claim 23, wherein the adder comprises a weighted adder operable to perform a weighted addition in accordance with at least one weighting factor.

25. An apparatus according to claim 24, wherein the signal combiner further comprises an adjuster operable to vary the at least one weighting factor.

26. An apparatus according to claim 25, wherein the adjuster comprises:
- a first power monitor operable to determine a power level of the audio signal;
- a second power monitor operable to determine a power level of the shaped data signal; and
- a setter operable to set the at least one weighting factor in dependence upon the determined power levels of the audio signal and the shaped data signal.

27. An apparatus according to claim 26, wherein the setter is operable to set the at least one weighting factor so that, after weighting, the ratio of the power level of the shaped data signal and the power level of the audio signal is above a predetermined value.

28. An apparatus according to claim 26, wherein the setter is operable to set the at least one weighting factor so that, after weighting, the ratio of the power level of the shaped data signal and the power level of the modified audio signal is above a predetermined value.

29. An apparatus according to claim 25, wherein the adjuster comprises a user interface for receiving a user signal indicative of the at least one weighting factor.

30. An apparatus according to claim 22, wherein the signal combiner comprises:
- a first adder operable to add the shaped data signal and the residual signal to form a modified residual signal; and
- a second adder operable to add the modified residual signal and the audio signal to form the modified audio signal.

31. An apparatus according to claim 30, wherein the first adder comprises a weighted adder operable to perform a weighted addition of the shaped data signal and the residual signal in dependence upon at least one weighting factor.

32. An apparatus according to claim 31, wherein the first adder further comprises an adjuster operable to vary the at least one weighting factor.

33. An apparatus according to claim 32, wherein the adjuster comprises a user interface for receiving a user signal indicative of the at least one weighting factor.

34. An apparatus according to claim 32, wherein the adjuster comprises:
- a tonality monitor operable to determine a level of tonality of the audio signal; and
- a setter operable to set the at least one weighting factor in dependence upon the determined level of tonality of the audio signal.

35. An apparatus according to claim 32, wherein the adjuster comprises:
- a first power level monitor operable to determine a power level of the residual signal;
- a second power level monitor operable to determine a power level of the shaped data signal; and
- a setter operable to set the at least one weighting factor in dependence upon the determined power levels of the audio signal and the shaped data signal.

36. An apparatus according to claim 35, wherein the setter is arranged to set the at least one weighting factor so that the ratio of the power level of the shaped data signal and the power level of the residual signal is above a predetermined value.

37. An apparatus for embedding a data signal within an audio signal, the apparatus comprising:
- a first receiver operable to receive the data signal;
- a second receiver operable to receive the audio signal;
- a processor operable to process the audio signal to generate a residual signal representative of a difference between a tonal component of the received audio signal and the received audio signal;
- a shaper operable to shape the spectrum of the data signal in dependence upon the residual signal to form a shaped data signal; and
- a signal generator operable to generate a tonal signal representative of the tonal component of the received audio signal; and
- a signal combiner operable to combine the shaped data signal and the tonal signal to generate a modified audio signal.

38. An apparatus according to claim 37, wherein the signal combiner comprises an adder operable to add the shaped data signal and the tonal signal to form the modified audio signal.

39. An apparatus according to claim 37, wherein the signal combiner comprises:
- a first adder operable to add the shaped data signal and the residual signal to form a modified residual signal; and
- a second adder operable to add the modified residual signal and the tonal signal to form the modified audio signal.

40. An apparatus according to claim 39, wherein the first adder comprises a weighted adder operable to perform a weighted addition of the shaped data signal and the residual signal in dependence upon at least one weighting factor.

41. An apparatus according to claim 40, wherein the first adder further comprises and adjuster operable to vary the at least one weighting factor.

42. An apparatus according to claim 41, wherein the adjuster comprises a user interface for receiving a user signal indicative of the at least one weighting factor.

43. An apparatus according to claim 41, wherein the adjuster comprises:
- a tonality monitor operable to determine a level of tonality of the residual signal; and
- a setter operable to set the at least one weighting factor in dependence upon the determined level of tonality of the audio signal.

44. An apparatus according to claim 41, wherein the adjuster comprises:
- a first power monitor operable to determine a power level of the residual signal;

means for determining a power level of the shaped data signal; and a setter operable to set the at least one weighting factor in dependence upon the determined power levels of the audio signal and the shaped data signal.

45. An apparatus according to claim 44, wherein the setter is arranged to set the at least one weighting factor so that the ratio of the power level of the shaped data signal and the power level of the residual signal is above a predetermined value.

46. An apparatus according to claim 37, wherein said tonal signal and said audio signals are time domain signals that are combined by said combiner.

47. An apparatus according to claim 37, comprising a time series modeler operable to apply a time series model to the audio signal in order to generate a plurality of coefficients indicative of the audio signal;

wherein said signal generator is operable to generate said tonal signal using the generated coefficients; and further comprising a subtractor operable to difference the generated tonal signal and the audio signal to generate a time domain residual signal.

48. A method of shaping a data signal for embedding within an audio signal, the method comprising:

receiving the data signal;

receiving the audio signal;

applying a time series model to the audio signal in order to generate a plurality of coefficients indicative of the audio signal;

synthesising a time domain tonal signal using the generated coefficients;

differencing the synthesized tonal signal and the audio signal to generate a time domain residual signal; and shaping the data signal in dependence upon the residual signal to form a shaped data signal.

49. A storage device storing instructions including instructions for causing a programmable processing apparatus to shape a data signal for embedding within an audio signal, the instructions comprising:

instructions for receiving the data signal;

instructions for receiving the audio signal;

instructions for applying a time series model to the audio signal in order to generate a plurality of coefficients indicative of the audio signal;

instructions for synthesising a time domain tonal signal using the generated coefficients;

instructions for differencing the synthesized tonal signal and the audio signal to generate a time domain residual signal; and instructions for shaping the data signal in dependence upon the residual signal to form a shaped data signal.

* * * * *